(12) United States Patent
Niioka et al.

(10) Patent No.: US 9,217,872 B2
(45) Date of Patent: Dec. 22, 2015

(54) LIQUID CRYSTAL DISPLAY ELEMENT, IMAGE DISPLAY APPARATUS, METHOD FOR DRIVING IMAGE DISPLAY APPARATUS, AND PORTABLE DEVICE

(71) Applicant: NLT Technologies, Ltd., Kanagawa (JP)

(72) Inventors: Shinya Niioka, Kanagawa (JP); Koji Shigemura, Kanagawa (JP)

(73) Assignee: NLT TECHNOLOGIES, LTD., Kanagawa (JP)

( * ) Notice: Subject to any disclaimer, the term of this patent is extended or adjusted under 35 U.S.C. 154(b) by 81 days.

(21) Appl. No.: 14/038,846

(22) Filed: Sep. 27, 2013

(65) Prior Publication Data

US 2014/0292732 A1   Oct. 2, 2014

(30) Foreign Application Priority Data

Sep. 27, 2012   (JP) .................. 2012-214416

(51) Int. Cl.
*G02B 27/22* (2006.01)
*G02F 1/1343* (2006.01)
(Continued)

(52) U.S. Cl.
CPC .............. *G02B 27/22* (2013.01); *G02B 27/225* (2013.01); *G02F 1/134336* (2013.01);
(Continued)

(58) Field of Classification Search
CPC .............. G02B 27/22; G02B 27/2228; G02B 27/2207; G02B 27/2264; G02B 27/26; G02B 27/225; H04N 13/00; H04N 13/04; H04N 13/0404; G02F 1/133526; G02F 1/134336; G02F 2001/134345; G09G 2310/06; G09G 2310/0267; G09G 3/3614; G09G 3/3629; G09G 3/3648; G09G 2300/0478
See application file for complete search history.

(56) References Cited

U.S. PATENT DOCUMENTS 7,982,820 B2 * 7/2011 Mimura et al. ................. 349/62
8,810,567 B2   8/2014 Niioka et al.
(Continued)

FOREIGN PATENT DOCUMENTS

EP   2432242   3/2012
JP   10-026767   1/1998
(Continued)

OTHER PUBLICATIONS

Nikkei Electronics, Jan. 6, 2003, No. 838, pp. 26-27 (with English Abstract and a partial translation).
(Continued)

*Primary Examiner* — Jonathan Boyd
*Assistant Examiner* — Sardis Azongha
(74) *Attorney, Agent, or Firm* — Young & Thompson

(57) ABSTRACT

A display apparatus includes: a liquid crystal display element in which a plurality of display units including at least a pixel that displays an image for a first eyepoint and a pixel that displays an image for a second eyepoint are arranged in a matrix shape; an optical unit which distributes light emitted from the pixel that displays the image for the first eyepoint and light emitted from the pixel that displays the image for the second eyepoint in mutually different directions; a first control electrode and a second control electrode disposed on each pixel in the display units; and a plurality of domain regions of which the orientation is controlled by a diagonal electric field or a lateral electric field formed by the first control electrode and the second control electrode and which have different liquid crystal molecule orientation states.

25 Claims, 30 Drawing Sheets

(51) Int. Cl.
  *H04N 13/04*  (2006.01)
  *G09G 3/36*  (2006.01)
  *G02F 1/1335*  (2006.01)

(52) U.S. Cl.
  CPC ....... *G02F 1/134363* (2013.01); *G09G 3/3648* (2013.01); *H04N 13/0404* (2013.01); *G02F 1/133526* (2013.01); *G02F 2001/134345* (2013.01); *G02F 2001/134372* (2013.01); *G09G 2300/0478* (2013.01); *G09G 2310/0267* (2013.01); *H04N 13/0452* (2013.01)

(56) References Cited

U.S. PATENT DOCUMENTS

2006/0077324 A1* 4/2006 Ahn .............................. 349/114
2007/0225096 A1 9/2007 Fujita
2009/0096726 A1* 4/2009 Uehara et al. ................... 345/84
2009/0096943 A1* 4/2009 Uehara et al. ................... 349/37
2011/0102713 A1* 5/2011 Hashimoto et al. ............. 349/99
2011/0304601 A1* 12/2011 Niioka et al. ................. 345/209

FOREIGN PATENT DOCUMENTS

| JP | 10-186294 | 7/1998 |
| JP | 2005-208567 | 8/2005 |
| JP | 2007-248999 | 9/2007 |

OTHER PUBLICATIONS

European Search Report dated Oct. 27, 2015 in corresponding European Patent Application No. 13186403.5.

* cited by examiner

FIG. 6
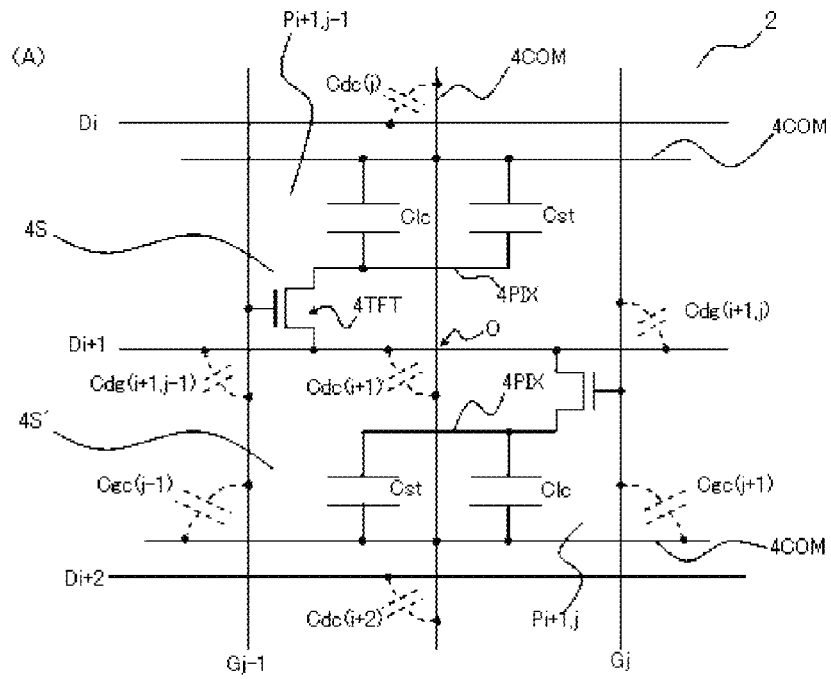
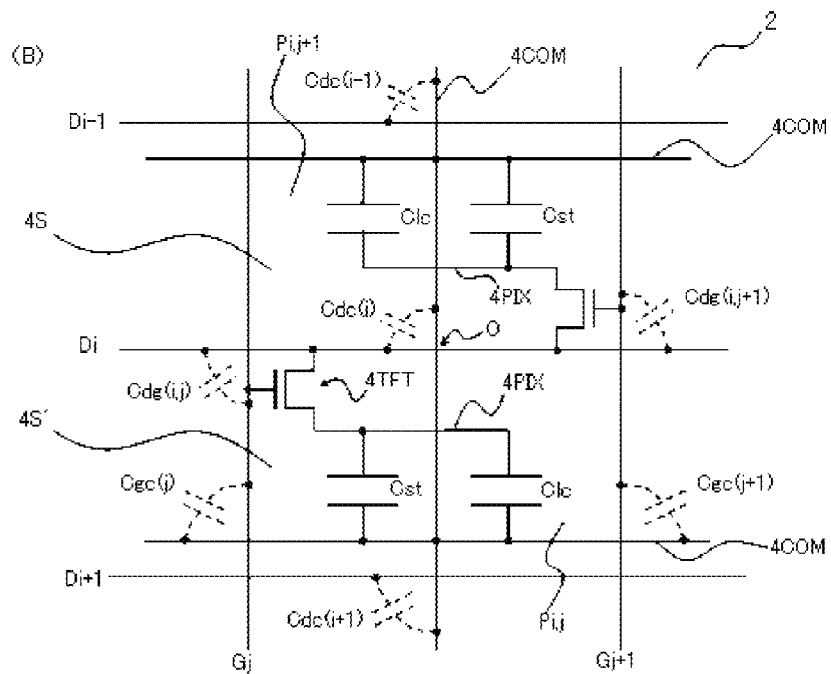

(A) ODD-NUMBERED FRAME

|    | G1 | G2 | G3 | G4 | G5 | G6 | G7 |
|----|----|----|----|----|----|----|----|
| D1 | +  | −  | +  | −  | +  | −  | +  |
| D2 | −  | +  | −  | +  | −  | +  | −  |
| D3 | +  | −  | +  | −  | +  | −  | +  |
| D4 | −  | +  | −  | +  | −  | +  | −  |
| D5 | +  | −  | +  | −  | +  | −  | +  |
| D6 | −  | +  | −  | +  | −  | +  | −  |
| D7 | +  | −  | +  | −  | +  | −  | +  |
| D8 | −  | +  | −  | +  | −  | +  | −  |
| D9 | +  | −  | +  | −  | +  | −  | +  |
| D10| −  | +  | −  | +  | −  | +  | −  |
| D11| +  | −  | +  | −  | +  | −  | +  |
| D12| −  | +  | −  | +  | −  | +  | −  |
| D13| +  | −  | +  | −  | +  | −  | +  |

(B) EVEN-NUMBERED FRAME

|    | G1 | G2 | G3 | G4 | G5 | G6 | G7 |
|----|----|----|----|----|----|----|----|
| D1 | −  | +  | −  | +  | −  | +  | −  |
| D2 | +  | −  | +  | −  | +  | −  | +  |
| D3 | −  | +  | −  | +  | −  | +  | −  |
| D4 | +  | −  | +  | −  | +  | −  | +  |
| D5 | −  | +  | −  | +  | −  | +  | −  |
| D6 | +  | −  | +  | −  | +  | −  | +  |
| D7 | −  | +  | −  | +  | −  | +  | −  |
| D8 | +  | −  | +  | −  | +  | −  | +  |
| D9 | −  | +  | −  | +  | −  | +  | −  |
| D10| +  | −  | +  | −  | +  | −  | +  |
| D11| −  | +  | −  | +  | −  | +  | −  |
| D12| +  | −  | +  | −  | +  | −  | +  |
| D13| −  | +  | −  | +  | −  | +  | −  |

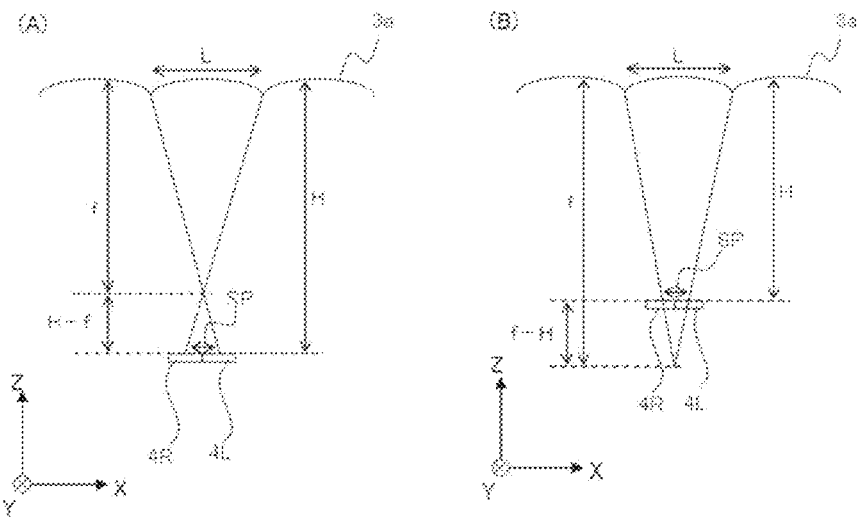

FIG. 27
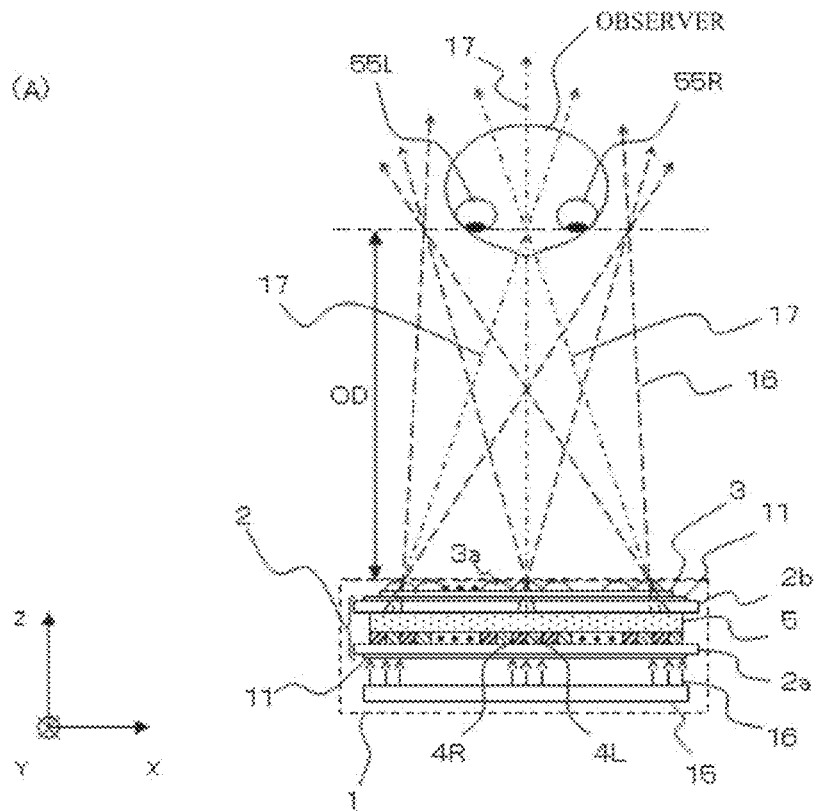
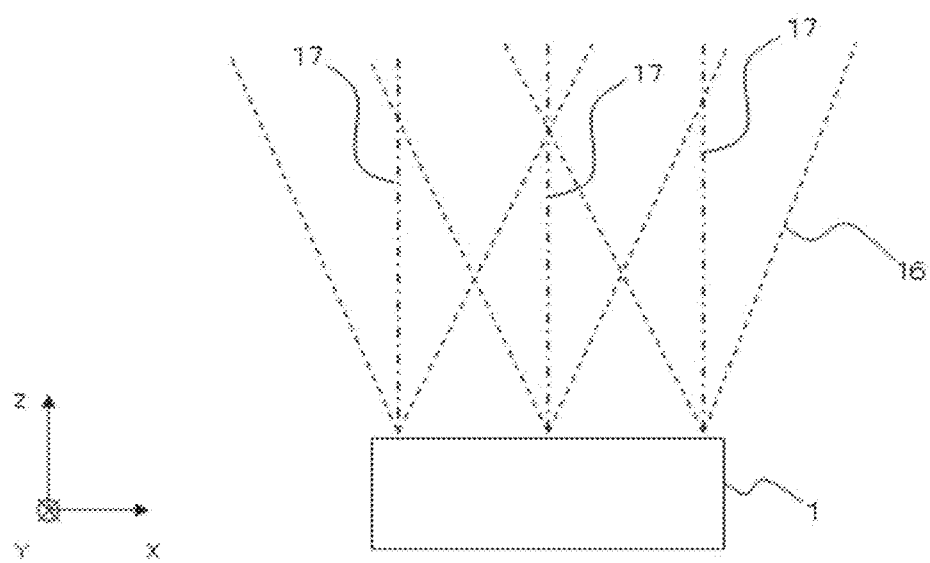

FIG. 31
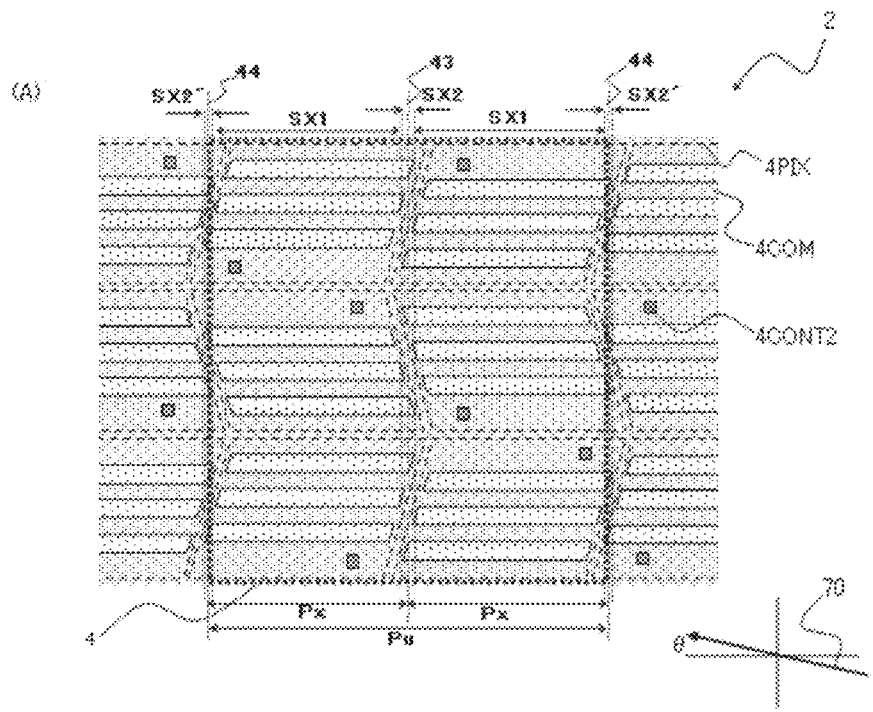
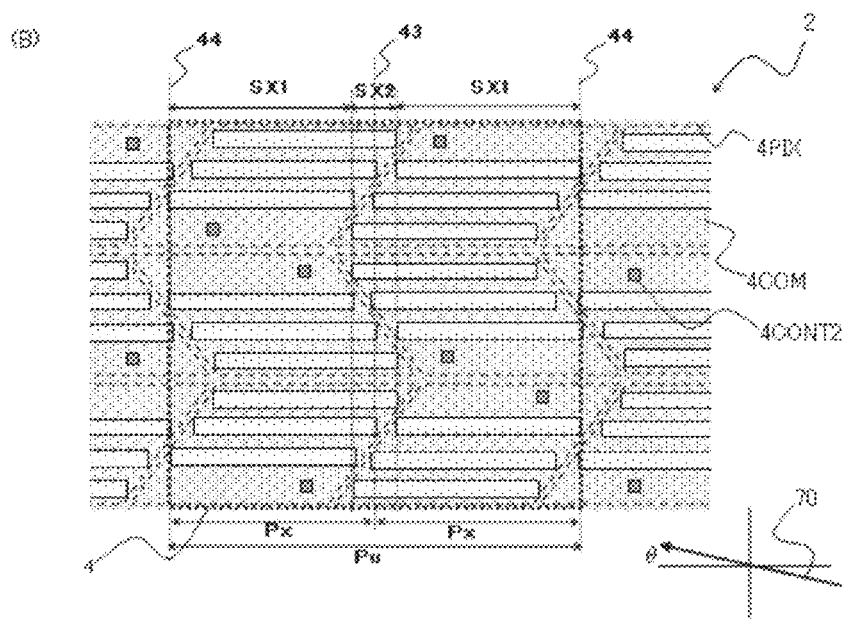

LIQUID CRYSTAL DISPLAY ELEMENT, IMAGE DISPLAY APPARATUS, METHOD FOR DRIVING IMAGE DISPLAY APPARATUS, AND PORTABLE DEVICE

BACKGROUND OF THE INVENTION

1. Field of the Invention

The present invention relates to a liquid crystal display panel preferable for use for displaying various kinds of information; an image display apparatus; a method for driving an image display apparatus; and a terminal apparatus.

2. Description of the Related Art

Currently, image display apparatuses carrying liquid crystal display panels are widely used in liquid crystal televisions, displays for personal computers, portable electronic devices, and the like.

As methods for applying an electric field to the liquid crystal layer of a liquid crystal display panel, methods in longitudinal electric field modes and lateral electric field modes are known. In liquid crystal display panels in the longitudinal electric field modes, an electric field in a generally longitudinal direction is applied to liquid crystal molecules by a pair of electrodes disposed across a liquid crystal layer. As such liquid crystal display panels in the longitudinal electric field modes, those in a TN (Twisted Nematic) mode, a VA (Vertical Alignment) mode, a MVA (Multi-domain Vertical Alignment) mode, and the like are known. In the liquid crystal display panels in the lateral electric field modes, a pair of control electrodes was disposed, to be insulated from each other, on the inner surface side of one of a pair of substrates disposed across a liquid crystal layer, and an electric field in a generally lateral direction is applied to liquid crystal molecules. As such liquid crystal display panels in the lateral electric field modes, those in an IPS (In-Plane Switching) mode in which a pair of electrodes does not overlap in two-dimensional view and in a FFS mode in which a pair of electrodes overlaps in two-dimensional view are known.

As illustrated in FIG. 37, in the liquid crystal display panel in the IPS mode, a pair of electrodes including pixel and common electrodes is formed in a comb shape to be engaged in the state of being electrically insulated from each other and an electric field is applied to a liquid crystal in a lateral direction between the pixel and common electrodes. The electric field in the lateral direction causes to liquid crystal molecules to rotate in an in-plane direction to enable the adjustment of the amount of transmitted light. The liquid crystal display panel in the IPS mode has the advantage of having a wider viewing angle than that of the liquid crystal display panel in the longitudinal electric field mode.

In the liquid crystal display panel in the IPS mode, a lateral electric field is generated between comb electrodes and a longitudinal electric field is generated on the comb electrodes. As a result, since lateral electric field components become small on the comb electrodes, it is impossible to sufficiently rotate liquid crystal molecules and transmittance on the electrodes is decreased. Further, it is known that the way of applying an electric field is changed on the ends of the comb electrodes, a domain in the state of orientation of the liquid crystal molecules that are normally rotated and a domain in the state of being rotated in the reverse direction (reverse rotation domain) are therefore generated, and a region having poor orientation called disclination is generated in the boundary between both domains. The boundary between the domains becomes the factor of deterioration of display quality or reliability because of having low transmittance and being in an unstable orientation state. Against such a problem, a comb electrode structure in which the electric field on the electrode ends is controlled to stabilize the reverse rotation domain is proposed (Japanese Patent Laid-Open No. 10-026767 (U.S. Pat. No. 2,973,934) (Patent Literature 1)).

In the liquid crystal display panel in the FFS mode, a pair of electrodes including common and pixel electrodes is disposed on different layers via an insulating film, a slit-shaped opening is formed in the common or pixel electrode on a liquid crystal layer side, and a fringe electric field is applied to the liquid crystal layer through the slit-shaped opening. The liquid crystal display panel in the FFS mode has been often used in recent years because of having the effect of being able to obtain a wide viewing angle and being able to improve its transmittance to improve image contrast. Examples of the known the liquid crystal display panel in the FFS mode are: a liquid crystal display panel in which common and pixel electrodes are formed on substantially the same plane as that of a thin film transistor TFT (Thin Film Transistor) as a switching element; and a liquid crystal display panel in which both common and pixel electrodes are disposed above TFT.

As illustrated in FIG. 38, in the liquid crystal display panel in the FFS mode in which both common and pixel electrodes are disposed above TFT, the surface of TFT or the like is coated with an interlayer resin film, and a lower-layer electrode (herein referred to as a first control electrode) and an upper-layer electrode having a slit-shaped opening (herein referred to as a second control electrode) are formed on the surface of the interlaminar resin film. The upper-layer and lower-layer electrodes are composed across an inter-electrode insulating film, and both electrodes include transparent electrodes. Both of the upper-layer and lower-layer electrodes can be operated as any of pixel and common electrodes.

Such a reverse rotation domain as mentioned above is also generated in the FFS mode. Further, the FFS mode has a problem that an electric field generated from one electrode in a subpixel influences an adjacent subpixel to unnecessarily move liquid crystal molecules in the adjacent subpixel.

As illustrated in FIG. 38, a pixel structure in which the number of slits is reduced to reduce the influence of the reverse rotation domain and a spacing between the slits of subpixels adjacent to each other is increased to suppress the influence of an electric field from an adjacent pixel is proposed (Japanese Patent Laid-Open No. 2007-248999 (Patent Literature 2)).

In recent years, mobile phones and information terminals carrying liquid crystal display panels in such a lateral electric field mode have been widely used, and the miniaturization and higher definition of image display apparatuses have proceeded with the advance of mobile phones and information terminals.

On the other hand, an image display apparatus that enables an observer to observe a different image depending on an observation position, i.e., an image display apparatus capable of observing different respective images from a plurality of eyepoints; and a three-dimensional image display apparatus that enables an observer to three-dimensionally observe images that are each different, as parallax images, have received attention as image display apparatuses having new added value.

As the mode of providing the different respective images to the plural eyepoints, there has been known the mode of synthesizing image data for respective eyepoints to display the data on a display panel, separating the displayed synthetic image by optical separation means including a lens or a barrier (light shielding plate) having slits, and providing images to the respective eyepoints. The principle of the image separation is based on limitation of visible pixels in each eyepoint direction by using the optical means such as a barrier having slits or a lens. As the image separation means, there is generally used a parallax barrier including barriers having a large number of banded slits or a lenticular lens in which cylindrical lenses unidirectionally having a lens effect are arranged.

The three-dimensional image display apparatus employing the optical image separation means is suitable for being carried by a terminal apparatus such as a mobile phone in terms of eliminating the need for wearing special glasses and saving the inconvenience of wearing glasses. A mobile phone carrying the three-dimensional image display apparatus including the liquid crystal display panel and the parallax barrier has been already commercialized (for example, see Nikkei Electronics, Jan. 6, 2003, No. 838, pp. 26-27 (Non Patent Literature 1)).

However, in the above-described mode, i.e., in the three-dimensional image display apparatus which provides the different respective images to the plural eyepoints using the optical separation means, a boundary between images may look dark when the eyepoint position of the observer moves to change an image to be observed. The boundary between the images changed due to each eyepoint is referred to as an optical principal axis of the image separation means. Decrease in luminance occurring in the optical principal axis is caused by observing non-display regions (light shielding sections generally referred to as black matrices in the liquid crystal display panel) between pixels for the respective eyepoints. The above-described phenomenon caused by the movement of the eyepoint of the observer does not occur in general three-dimensional image display apparatuses without any optical separation means. Therefore, the observer feels a sense of incongruity or deterioration in display quality in the above-described phenomenon occurring in the multi-view three-dimensional image display apparatus or the three-dimensional image display apparatus including the optical separation means.

This luminance fluctuation is a phenomenon generally called 3D moire. The 3D moire is the periodic unevenness of luminance (also may be referred to as color unevenness) caused by displaying different images in different angular directions. Further, the 3D moire is a luminance angular fluctuation, and three-dimensional vision is unfavorably affected when the luminance angular fluctuation is high.

In general, a fringe pattern generated by interference of structures each having different periodicities is referred to as a "moire fringe". Since the moire fringe is an interference fringe generated depending on the periodicity or pitch of a structure while the 3D moire is luminance unevenness occurring due to the image formation property of image separation means, the moire fringe and the 3D moire are distinguished from each other and applied in the present specification.

In order to solve the above-described problems caused by the optical separation means and the light shielding section, three-dimensional image display apparatuses prepared by devising the shapes and arrangement of pixel electrodes and light shielding sections in display panels to suppress deterioration in display quality are proposed (e.g., Japanese Patent Laid-Open No. 2005-208567 (U.S. Pat. No. 4,371,012) (Patent Literature 3) and Japanese Patent Laid-Open No. 10-186294 (U.S. Pat. No. 3,525,995) (Patent Literature 4)).

FIG. 39 is a plan view that illustrates a display panel in a display apparatus disclosed in Japanese Patent Laid-Open No. 2005-208567 (U.S. Pat. No. 4,371,012) (Patent Literature 3). In the display panel illustrated in FIG. 39, the proportion of light shielding sections (wiring lines 1070 and light shielding sections 1076) to openings is substantially constant, when the cross section of the display panel is presumed in a longitudinal direction 1011 perpendicular to the direction of arranging cylindrical lenses 1003a, at any point in a lateral direction 1012. FIG. 39(A) illustrates an example in which a subpixel has a trapezoid shape while FIG. 39(B) illustrates an example in which a subpixel has a parallelogram shape.

In the display panel illustrated in FIG. 39, the proportion of light shielding sections to be observed is substantially constant even when an observer moves an eyepoint in the lateral direction 1012 which is the direction of separating an image to change an observation direction. In other words, the observer does not observe only light shielding sections from a specific direction and display does not look dark. Thus, deterioration in display quality caused by a light shielding region can be prevented.

The display panel illustrated in FIG. 39(B) is a liquid crystal display panel in a lateral electric field mode to which an IPS mode is applied. Each subpixel is formed in a parallelogram shape, and a comb electrode pair disposed on each subpixel tilts toward a direction different from the longitudinal direction 1011 and is disposed along the oblique side of the parallelogram. The direction of the oblique side of the parallelogram is changed every one line, and the oblique side becomes a meandering oblique side which meanders in the longitudinal direction 1011. The comb electrodes are disposed in their drawing directions that are mutually different between subpixels adjacent to each other in the longitudinal direction 1011.

FIG. 40 is a view that schematically illustrates pixels in a three-dimensional image display apparatus disclosed in Japanese Patent Laid-Open No. 10-186294 (U.S. Pat. No. 3,525, 995) (Patent Literature 4). FIG. 40(A) is a plan view that illustrates pixel arrangement in the three-dimensional image display apparatus described in Japanese Patent Laid-Open No. 10-186294 (U.S. Pat. No. 3,525,995) (Patent Literature 4) while FIG. 40(B) is an enlarged view of the pixels. The three-dimensional image display apparatus disclosed in Japanese Patent Laid-Open No. 10-186294 (U.S. Pat. No. 3,525, 995) (Patent Literature 4) continuously provides substantially uniform luminance in a horizontal direction and is capable of maintaining substantially constant luminance over the whole since the total size of pixels adjacent over an overlapping region 1013 in a vertical direction is constant and is equal to the size of a rectangular region B in a vertical direction. Accordingly, luminance in the case in which the eyes of an observer cross the boundary between subpixels can be therefore maintained at a constant level when the same image is output to adjacent pixel columns.

In Japanese Patent Laid-Open No. 2005-208567 (U.S. Pat. No. 4,371,012) (Patent Literature 3) or Japanese Patent Laid-Open No. 10-186294 (U.S. Pat. No. 3,525,995) (Patent Literature 4), the width of the pixel overlapping region becomes a crosstalk region in which light emitted from a pixel 4R for the left eye and light emitted from a pixel 4L for the right eye overlap each other without being able to be separated by optical means. In the pixel structures in the related art, it is necessary to form at least the crosstalk region in order to set an opening width in the longitudinal direction 1011 at a constant level in an X direction and, as a result, the leakage of the image of one of the right and left eyes to the other, called a 3D crosstalk during three-dimensional display, occurs. Since there is a potential for the 3D crosstalk to result in less of three-dimensional feeling and to exert an influence such as eye fatigue on an observer at the increased value thereof, it is desirable to set the amount of the 3D crosstalk at a predetermined level or less.

CITATION LIST

Patent Literature

[Patent Literature 1] Japanese Patent Laid-Open No. 10-026767 (U.S. Pat. No. 2,973,934)
[Patent Literature 2] Japanese Patent Laid-Open No. 2007-248999
[Patent Literature 3] Japanese Patent Laid-Open No. 2005-208567 (U.S. Pat. No. 4,371,012)
[Patent Literature 4] Japanese Patent Laid-Open No. 10-186294 (U.S. Pat. No. 3,525,995)

Non Patent Literature

[Non Patent Literature 1] Nikkei Electronics, Jan. 6, 2003, No. 838, pp. 26-27

Since it is impossible to control the uniform orientation of liquid crystal molecules in a subpixel, as described above, in the liquid crystal display panel in the lateral electric field mode such as the IPS or FFS mode in the related art, it is difficult to uniformalize the transmittance distribution of a liquid crystal layer in a display region, and 3D moire is generated in the three-dimensional display apparatus including the image separation means due to the transmittance distribution of the liquid crystal layer and the image separation means. The transmittance distribution generated in the lateral electric field mode in the related art is enlarged as luminance fluctuation and luminance unevenness in an image separation direction by the image separation means, and image quality is significantly deteriorated in comparison with liquid crystal display panels without any image separation means.

In the liquid crystal display panel, to which the IPS mode is applied, as illustrated in FIG. 39(B), a transmittance distribution with light and shade in the direction of arranging comb electrodes is generated due to decrease in the transmittance of a liquid crystal layer on an electrode as described above. In the case of substantial coincidence of the direction of the arrangement of the light and the shade in the transmittance and the direction of arranging the cylindrical lenses 3a, the light and the shade in the transmittance are enlarged by the cylindrical lenses 1003a to generate 3D moire.

The present inventors found a problem described below in the liquid crystal display panel illustrated in FIG. 39(B). In conventional liquid crystal display panels subjected to orientation treatment by rubbing, the initial orientation direction of liquid crystal molecules is generally made to be a uniaxial direction. Therefore, the longitudinal direction 1011 becomes the initial orientation direction of the liquid crystal molecules in the liquid crystal display panel illustrated in FIG. 39(B). In the display panel to which such an IPS mode is applied, the 3D moire caused by the transmittance distribution of the liquid crystal layer is reduced to a certain extent by increasing a tilt angle with respect to the longitudinal direction 1011 of the comb electrode pair. However, when the tilt angle of the comb electrode pair is increased, the angle between the initial orientation direction and the electric field direction between the comb electrodes is increased, torque for moving the liquid crystal molecules between the comb electrodes is therefore decreased, and the liquid crystal molecules are not sufficiently rotated to decrease the transmittance. In other words, it was found that the pixels to which the conventional lateral electric field mode is applied result in the trade-off relationship between the 3D moire and the transmittance to make it impossible to achieve both of reduction in 3D moire and improvement in transmittance and result in deterioration in display quality.

As described above, in the related art disclosed in Japanese Patent Laid-Open No. 2005-208567 (U.S. Pat. No. 4,371,012) (Cited Literature 3) or Japanese Patent Laid-Open No. 10-186294 (U.S. Pat. No. 3,525,995) (Cited Literature 4), the 3D moire is generated due to the local fluctuation of transmittance when unevenness occurs in the transmittance distribution by driving a lateral electric field even in the pixel structure in which the opening widths in the longitudinal direction are made to be constant in the image separation direction.

In the structure that suppresses reverse domains, disclosed in Japanese Patent Laid-Open No. 10-026767 (U.S. Pat. No. 2,973,934) (Cited Literature 1), it is impossible to sufficiently reduce 3D moire since light shielding regions are increased by electrodes for controlling an electric field although the structure has the effect of fixing/stabilizing the disclination to reduce the reverse rotation domain regions. Further, it is difficult to compose pixels in which the fluctuation of opening widths in a direction perpendicular to an image separation direction, i.e., in a longitudinal direction is made to be constant in the image separation direction, as in the case of the conventional example, since design freedom is greatly compromised by the light shielding sections when domain boundaries and regions in which liquid crystal orientation is unstable are shaded to stabilize a display state.

In the pixel structure disclosed in Japanese Patent Laid-Open No. 2007-248999 (Cited Literature 2), a slit spacing is increased to reduce the influence of an adjacent pixel, regions with low transmittance between pixels adjacent to each other are increased, and design freedom is therefore compromised, so that it is difficult to compose pixels in which longitudinal openings are made to be constant in an image separation direction as in the case of the conventional example.

The present invention is accomplished with respect to such problems and is directed at suppressing problems caused by the above-described local fluctuation of transmittance and at realizing good three-dimensional display characteristics in a display apparatus capable of displaying respective images toward a plurality of eyepoints.

SUMMARY OF THE INVENTION

In order to achieve the above-described objects, there is provided an image display apparatus according to the present invention, including: a liquid crystal display element in which a plurality of display units including at least a pixel that displays an image for a first eyepoint and a pixel that displays an image for a second eyepoint are arranged in a matrix shape; optical means which distributes light emitted from the pixel that displays the image for the first eyepoint and light emitted from the pixel that displays the image for the second eyepoint in mutually different directions; a first control electrode and a second control electrode disposed on each pixel in the display units; and a plurality of domain regions of which the orientation is controlled by a diagonal electric field or a lateral electric field formed by the first control electrode and the second control electrode and which have different liquid crystal molecule orientation states, wherein, assuming that one of the directions of the light distributed by the optical means is a first direction and a direction orthogonal to the first direction is a second direction, the optical principal axis of the optical means effectively passes through the center points of the display units and extends in the second direction; each pixel in the display units is disposed along the first direction; overlapping regions which overlap each other in the second direction are formed on each pixel adjacent to the first direction; and the display units arranged in the second direction in the overlapping regions include different electric field structures which are formed depending on the display units, and respective domain regions disposed according to the electric field structures are disposed along the optical principal axis.

In accordance with the present invention, local reduction in transmittance in an image separation direction can be compensated to reduce 3D moire and achieve higher transmittance by composing the plural domain regions in the different liquid crystal molecule orientation states on the principal axis of the image separation means and placing the respective domain regions to coexist on the optical principal axis of the image separation means. Further, high reliability can be obtained without disrupting a liquid crystal orientation state during operation since each domain region is controlled by the stable electric field formed by the first control electrode and the second control electrode.

BRIEF DESCRIPTION OF THE DRAWINGS

FIG. 6 is an equivalent circuit diagram of pixels in the display panel carried by the image display apparatus according to the first embodiment of the present invention, in which (A) is an equivalent circuit diagram that illustrates a pixel pair of a subpixel Pi+1, j−1 and a subpixel Pi+1, j; and (B) is an equivalent circuit diagram that illustrates a pixel pair of a subpixel Pi, j and a subpixel Pi, j+1;

in FIG. 16(B) or (C), the dotted line is a line along a meandering direction A or a meandering direction B which is the direction of drawing a gate line G and each dotted line is orthogonal to the line segment B-B' or the line segment C-C'; and in (D), since pixel electrodes 4PIX disposed adjacently along the direction of a wiring line on the trapezoidal pixel base are shielded by and placed away from a common electrode 4COM, no electric field is generated in a direction orthogonal to a wiring line direction between the pixel electrodes 4PIX;

FIG. 22 is a cross-sectional view that illustrates an optical model in the case of application of defocusing, for determining the minimum value of a curvature radius range in the range in which separation action is present, as illustrated in (A), and for determining the maximum value in the range in which the separation action is present, as illustrated in (B);

FIG. 23 is a schematic view that illustrates the distribution of the polarities of an image observed by each of the right and left eyes in the image display apparatus according to the first embodiment of the present invention, in which (A) illustrates the distribution of polarities output to a pixel for the right eye in a certain frame timing; and FIG. 23(B) illustrates the distribution of polarities output to a pixel for the left eye in the same frame timing as that in FIG. 23(A);

FIG. 27 is a conception diagram that schematically illustrates an optical model in a light condensing mode or a space mode, in which (A) illustrates a line indicating the central axis of image separation in a cross section (in X-Z plane) at a certain position in the Y axis; and (B) is a conception diagram of a mode called a space image mode, a space image reconstruction mode, a space image reproduction mode, a space image formation mode, or the like;

FIG. 31 is a plan view of enlarged pixels in a display panel according to the third embodiment of the present invention, in which (A) is a plan view of enlarged pixels in a display panel according to the third embodiment of the present invention; and (B) is a plan view of enlarged pixels in a display panel according to a first variation of the third embodiment of the present invention;

FIG. 39(B) illustrates an example in which a subpixel has a parallelogram shape.

DETAILED DESCRIPTION OF THE PREFERRED EMBODIMENTS

[First Embodiment]

Figure 1:
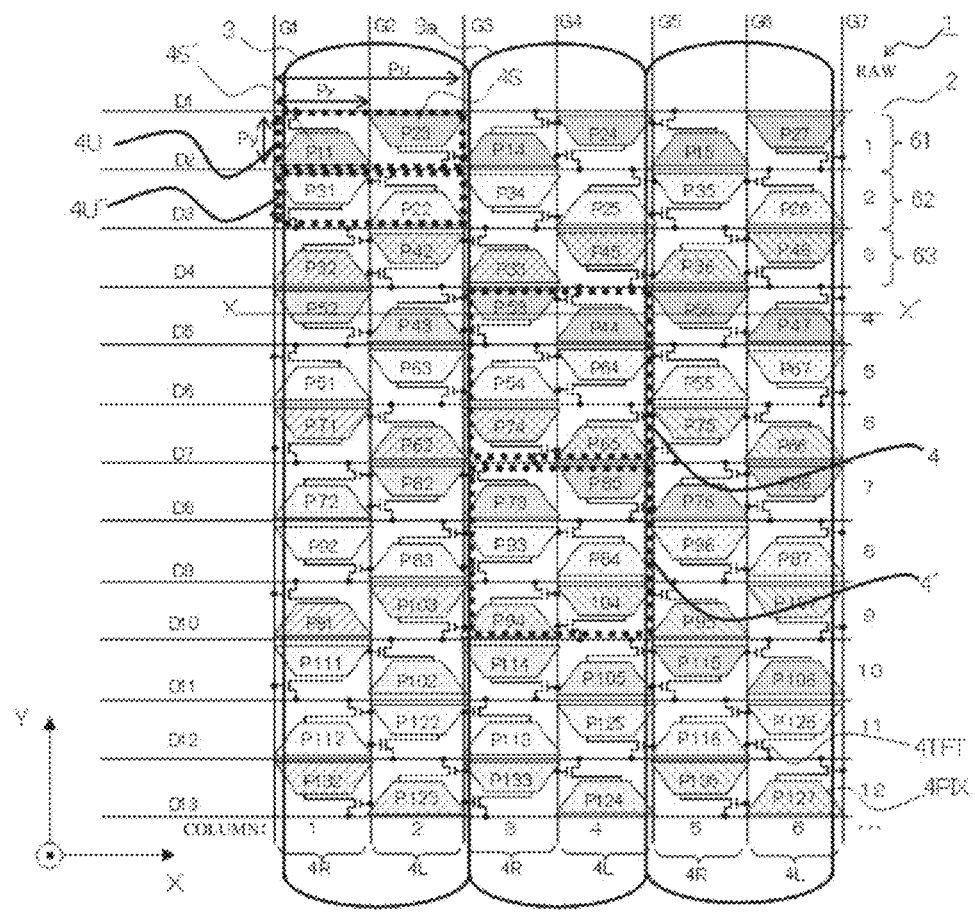
FIG. 1 is a plan view that illustrates an image display apparatus according to a first embodiment of the present invention.

Image display apparatuses according to embodiments of the present invention will be specifically described below with reference to the drawings. There will now be described an image display apparatus according to a first embodiment of the present invention, a display panel carried by the image display apparatus, and a method for driving the image display apparatus. In the drawings below, the size and reduced scale of each component are appropriately changed and described for securing the visibility of the drawings.

Figure 2:
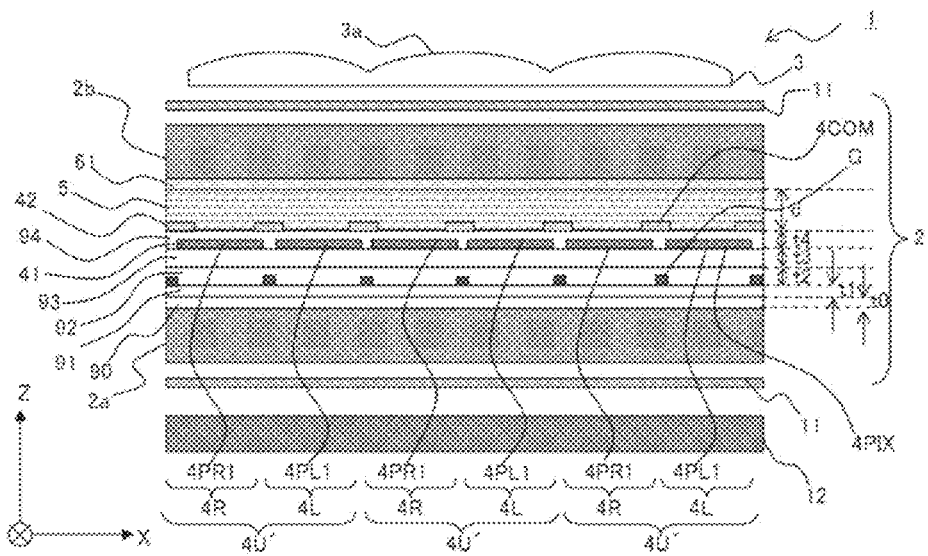
FIG. 2 is a cross-sectional view of the image display apparatus according to the first embodiment of the present invention in the direction of the X-axis.

FIG. 1 is a plan view that illustrates the display of the image display apparatus according to the first embodiment while FIG. 2 is a cross-sectional view of the display of FIG. 1, taken along the line segment X-X'. As illustrated in FIG. 1 and FIG. 2, a pixel display apparatus 1 according to the first embodiment is an image display apparatus for three-dimensional display, including: a display panel 2, in which liquid crystal molecules are utilized, as an electro-optical element; a lenticular lens 3, and a backlight 12. The lenticular lens 3 is disposed on the display surface side, i.e., the user side of the display panel 2. The backlight 12 is disposed on the side, opposite to the lenticular lens 3, of the display panel 2.

As illustrated in FIG. 1 and FIG. 2, the display panel 2 is a liquid crystal display element for three-dimensional display, including a pixel that displays an image for a first eyepoint and a pixel that displays an image for a second eyepoint and having two eyepoints. In the present embodiment, the pixel for the first eyepoint is a pixel 4L for the left eye and the pixel for the second eyepoint is a pixel 4R for the right eye. In other words, the display panel 2 is a display panel in which a pixel pair including one pixel 4L for the left eye and one pixel 4R for the right eye, i.e., each of a display unit 4U and a display unit 4U' is disposed in a matrix shape. Further, the display panel unit 4U or 4U' is composed of subpixels 4S and 4S'. When attention is paid to each pixel composing the display unit 4U or 4U', the pixel is referred to herein as "subpixel". Each of the subpixels 4S and 4S' is a drive pixel of a minimum unit, driven by a first control wiring line to which one data signal is input and a second control wiring line to which one gate signal is input, and is composed in a different pixel shape. The first control wiring line and the second control wiring line are referred to herein as a data wiring line D and a gate line G, respectively.

Figure 3:
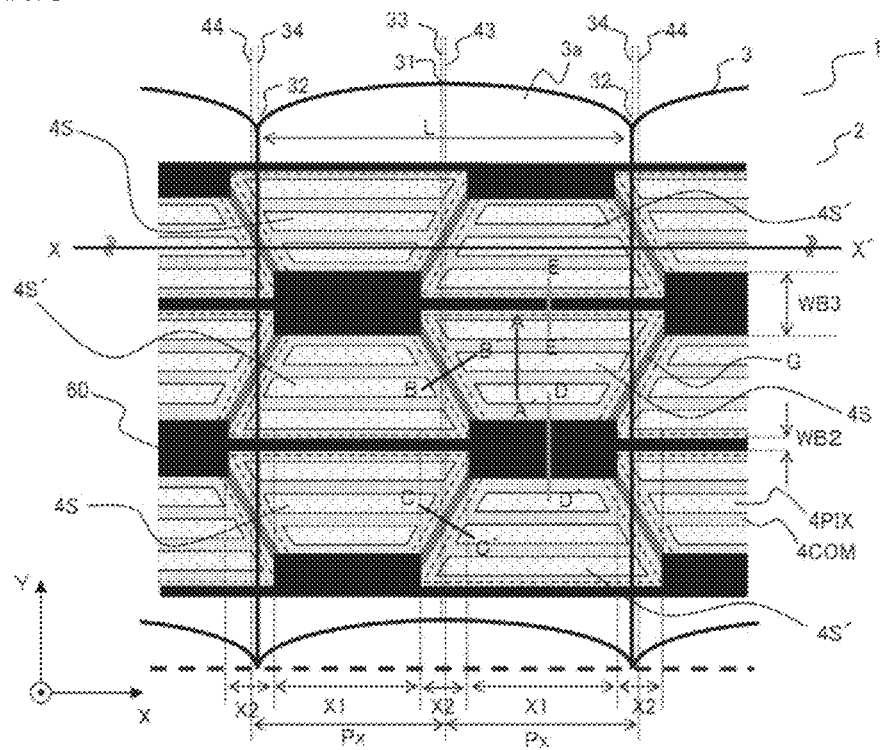
FIG. 3 is a plan view that illustrates pixels in a display panel carried by the image display apparatus according to the first embodiment of the present invention.

FIG. 3 is a plan view that illustrates the pixels in the display panel according to the first embodiment of the present invention. The subpixel 4S and the subpixel 4S' illustrated in FIG. 1 have structures, of which the outer shapes are different from each other, and are each composed in the combinations of the different connection relations of the gate line G, the data line D, and a pixel transistor 4TFT. However, since the connections of the pixel transistor 4TFT, the gate line G, and the data line D are shaded by a black matrix 60 as illustrated in FIG. 3, it is not necessary to consider each connection relation. In other words, the subpixel 4S and the subpixel 4S' are expressions that indicate the difference of their outer shapes in the state of two-dimensional view and do not indicate the distinction of the connection relations and colors of the gate line, the data line, and the pixel transistor. The same also applies to a pixel 4 and a pixel 4'.

The subpixel 4S and the subpixel 4S' are disposed alternately every line. Each of the subpixel 4S and the subpixel 4S' is a subpixel corresponding to each of the eyepoints of the right eye pixel 4R and the pixel 4L for the left eye and composes the display unit 4U or 4U'. The right eye pixel 4R and the pixel 4L for the left eye, which are composed to have outer shapes that are symmetrical to each other, are optically equivalent. Therefore, the subpixel 4S and the subpixel 4S' are generically called a subpixel 4S when it is not necessary to optically distinguish and explain the subpixel 4S and the subpixel 4S'. Similarly, the display unit 4U and the display unit 4U' are also generically called a display unit 4U when it is not necessary to optically distinguish and explain the display unit 4U and the display unit 4U'. In particular, when configuration or operation related to three-dimensional display is explained, the subpixel 4S is also referred to as "eyepoint pixel".

As illustrated in FIG. 1, the lenticular lens 3 has a lens array in which a large number of cylindrical lenses 3a are arranged one-dimensionally in a first direction. The cylindrical lens 3a is a one-dimensional lens having a convex section with a semicylindrical shape. The drawing direction, i.e., the longitudinal direction thereof is a second direction, which is a direction orthogonal to an arrangement direction in a display surface. The cylindrical lenses 3a do not have any lens effect in the drawing direction but have a lens effect only in the arrangement direction which is the orthogonal direction thereof. As a result, the lenticular lens 3 has a one-dimensional lens array having the lens effect only in the arrangement direction of the cylindrical lenses 3a. In addition, the arrangement direction of the cylindrical lenses 3a is set in the direction in which the pixels 4L for the left eye and the pixels 4R for the right eye are repeatedly arranged. Further, the cylindrical lenses 3a are disposed to correspond to the above-mentioned display units 4U and 4U'.

The cylindrical lenses 3a have the lens effect only in the direction orthogonal to the drawing direction thereof, as described above. In addition, in the present embodiment, the direction providing the lens effect coincides with the direction of repeatedly arranging the pixels 4L for the left eye and the pixels 4R for the right eye. As a result, the cylindrical lenses 3a act as light ray separation means capable of separating light from the pixel 4L for the left eye and light from the pixel 4R for the right eye in different directions. Thus, the lenticular lens 3 can separate an image displayed by the pixel 4L for the left eye in each display unit and an image displayed by the pixel 4R for the right eye in each display unit in different directions. In other words, the lenticular lens 3 is an optical member that acts as image separation means or image distribution means. In the present embodiment, the focal distance of each cylindrical lens 3a is set at a distance between the principal point of each cylindrical lens 3a, i.e., the vertex of the lens, and a pixel surface, i.e., a surface on which the pixel 4L for the left eye or the pixel 4R for the right eye is disposed, but is not limited thereto, and may be appropriately set in the range in which the separation performance of the optical separation means can be obtained.

Herein, an XYZ orthogonal coordinate system is set as described below. In the direction of repeatedly arranging the pixels 4L for the left eye and the pixel 4R for the right eye, the direction from a pixel 4R for the right eye to a pixel 4L for the left eye in one display unit is a +X direction while the reverse direction thereof is a −X direction. The +X direction and the −X direction are generically called an X-axis direction. Further, the direction that is orthogonal to the X-axis direction and in which the pixels 4R for the right eye and the pixels 4L for the left eye are arranged is a Y-axis direction. Furthermore, the direction orthogonal to both of the X-axis direction and the Y-axis direction is a Z-axis direction. In the Z-axis direction, a direction from a surface, on which the pixels 4L for the left eye or the pixels 4R for the right eye are disposed, to the lenticular lens 3 is a +Z direction while the reverse direction thereof is a −Z direction. The +Z direction is a direction toward the front, i.e., an observer. The observer observes the +Z-side surface of the display panel 2. In addition, the +Y direction is a direction in which a right-handed coordinate system is established. In other words, when the thumb and index finger of the right hand of a human are directed at the +X direction and the +Y direction, respectively, the middle finger thereof is directed at the +Z direction.

Herein, the first direction is the X-axis direction while the second direction is the Y-axis direction, and the following description is given with the application of the XYZ orthogonal coordinate system. Unless otherwise specified, the explanation is given based on the presumption that an image separation direction is a lateral direction while an in-plane direction perpendicular to the image separation direction is a longitudinal direction in two-dimensional view on the X-Y plane.

When the XYZ orthogonal coordinate system is set as mentioned above, the arrangement direction of the cylindrical lenses 3a is the X-axis direction while the longitudinal direction of the cylindrical lenses 3a is the Y-axis direction. As a result, an image for the left eye and an image for the right eye are separated along the X-axis direction. Further, the display units 4U including the pixels 4L for the left eye and the pixels 4R for the right eye are arranged in a single column in the Y-axis direction. The arrangement cycle of the pixel pairs in the X-axis direction is substantially equal to the arrangement cycle of the cylindrical lenses. A column in which display units 4U are arranged in the Y-axis direction is disposed in correspondence with one cylindrical lens 3a.

As used herein, a line segment that extends to the direction perpendicular to the image separation direction in a boundary between subpixels that are disposed in a display unit and are adjacent to each other in the image separation direction is referred to as a boundary line 43 between eyepoint pixels. Further, a line segment that extends to the direction perpendicular to the image separation direction in a boundary between display units is referred to as a boundary line 44 between display units.

As illustrated in FIG. 3, in the lenticular lens 3, optical principal axes set depending on the structures of the cylindrical lenses 3a are defined as described below. A convex surface directed at a user side in the cylindrical lens 3a is referred to as a lens convex section 31 while a valley between adjacent cylindrical lenses 3a is referred to as a lens concave section 32. In addition, a virtual line that extends through the lens convex section 31 along the longitudinal direction of the cylindrical lens 3a is referred to as a first principal axis 33 while a virtual line that extends through the lens concave section 32 along the longitudinal direction of the cylindrical lens 3a is referred to as a second principal axis 34. The first principal axis 33 is disposed in correspondence with the boundary line 43 between eyepoint pixels disposed in a display unit while the second principal axis 34 is disposed in correspondence with the boundary line 44 between display units.

In the following description, "display" which means the whole image plane region of the display panel and "display region" which means a display operation region in one subpixel 4S are distinguished and used.

As illustrated in FIG. 1, the display panel 2 is an active matrix type liquid crystal display panel having a thin film transistor (TFT). A pixel transistor 4TFT acts as a switch for transmitting a display signal to each pixel. The switch is operated by a gate signal flowing through the gate line G connected to the gate of each switch. Gate lines G1 to G7 which extend in a column direction, i.e., in the Y-axis direction, are disposed on the surface, closer to the liquid crystal layer 5, of a main substrate 2a, i.e., the +Z-direction side surface. Hereinafter, the gate lines G1 to G7 are generically referred to as a gate line G. Furthermore, data lines D1 to D13 which extend in a row direction, i.e., in the X-axis direction, are disposed on the same surface of the main substrate 2a. Hereinafter, the data lines D1 to D13 are generically referred to as a data line D. The number of data lines D or gate lines G is not limited to the number described above but may be appropriately set depending on the number of the pixels of the display panel.

As illustrated in FIG. 1, a subpixel 4S is disposed in a region surrounded by data lines D and gate lines G and is provided with a pixel electrode 4PIX, a common electrode 4COM, and a pixel transistor 4TFT. In other words, one subpixel 4S (pixel 4L for left eye or pixel 4R for right eye) is disposed in the vicinity of a point of intersection of a gate line G and a data line D.

In FIG. 1, a subpixel connected to a data line Di and a gate line Gj is expressed as Pij (i and j are integers) in order to clarify the connection relations between a subpixel and a gate line, a data line, and a pixel transistor. In other words, a character i following P is a numeral indicating the number of a connected data line while a character j further following the character i is a numeral indicating the number of a connected gate line. For example, the subpixel connected to the data line D3 and the gate line G2 can be expressed as P32. When an explanation is given with attention to the connection relations between a subpixel and data and gate lines, the expression is applied.

The arrangement structure of the pixels 4 and 4' is described. The pixels 4 and 4' are composed collectively of a plurality of display units. The pixels 4 and 4' are composed of a combination of the display units 4U and 4U', and each display unit is provided with a color filter having a desired color. As illustrated in FIG. 1, the pixel 4 has a structure in which the display units 4U', 4U, and 4U' are sequentially arranged in the Y-axis direction, while the pixel 4' has a structure in which the display units 4U, 4U', and 4U are sequentially arranged in the Y-axis direction.

As illustrated in FIG. 1, the pixels 4 and the pixels 4' are regularly disposed on the display of the display panel 2. The pixel 4 or 4' is repeatedly arranged in the X-axis direction, while the pixels 4 and the pixels 4' are alternately arranged in the Y-axis direction. Although the present embodiment provides the structure in which the pixels 4 and 4' are disposed in the array of 4 rows×3 columns, the number of pixels is not limited thereto, but the predetermined number of pixels may be disposed depending on the number of the pixels of the display panel.

In the present embodiment, one pixel is composed of three display units 4U and 4U' arranged in the Y-axis direction, each display unit is provided with a color filter RED 61, GREEN 62, or BLUE 63, and a color is arranged on each display unit. Each color filter RED 61, GREEN 62, or BLUE 63 is consecutively extended without a break in the X-axis direction while RED 61, GREEN 62, and BLUE 63 are repeatedly arranged in a stripe shape in the +Y direction. The line of RED 61, GREEN 62, and BLUE 63, which is extended in the +Y direction, is referred to as a pixel line. The order of the colors of the color filters is not limited thereto. Further, the kinds of the colors are not limited thereto, but color filters composed of M colors which are three or more colors may also be repeatedly arranged in a stripe shape. Although the color filters and the black matrix are disposed on the surface, closer to the liquid crystal layer 5, of the opposite substrate 2b in the present embodiment, without limitation thereto, they may also be disposed on the surface closer to the main substrate 2a.

As illustrated in FIG. 1, the display units 4U and 4U' are alternately arranged in the Y-axis direction, and each display unit having the same shape is therefore disposed every two lines. Further, RED 61, GREEN 62, and BLUE 63 are disposed every three lines, and each display unit having the same shape and the same color is therefore disposed in a cycle of every 6 lines in the Y-axis direction.

Assuming that the number of the colors of display units 4U and 4U' disposed in a pixel 4 is M and the number of eyepoint pixels is N, the pixel 4 is composed of a square including subpixels of M rows×N columns. In other words, assuming that the pixel of one pitch is Pu, the pitch of a subpixel in the X-axis direction is Px, and the pitch of a subpixel in the Y-axis direction is Py, the following relational expression (1) is established.

[Expression 1]

$$Pu = M \times Py = N \times Px \qquad (1)$$

The pixel 4 according to the present embodiment has M=3 and N=2 and is composed of a square including subpixels of 3 rows×2 columns.

The pixel structure of the display panel 2 carried by the image display apparatus 1 is described below. FIG. 3 is a plan view of the enlarged pixels 4 of the image display apparatus 1 and is a schematic view that illustrates the pixels 4 corresponding to subpixels P53, P54, P74, P44, P64, and P65 in FIG. 1, as an example.

Figure 4:
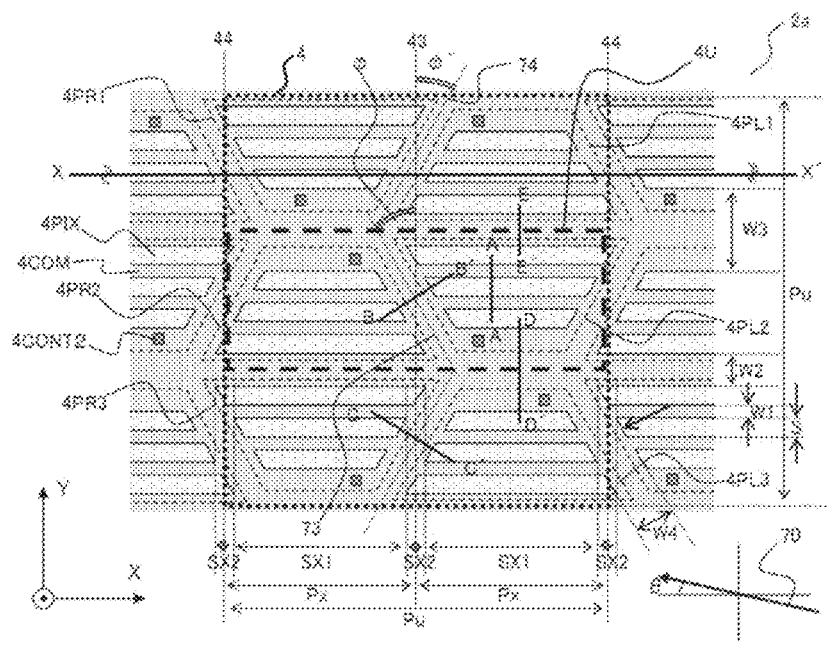
FIG. 4 is a plan view that illustrates the pixels in the display panel carried by the image display apparatus according to the first embodiment of the present invention.

FIG. 4 is a plan view that illustrates the substrate 2a and is a schematic view that illustrates pixel electrodes 4PIX and a common electrode 4COM disposed on a main substrate 2a side.

Figure 5:
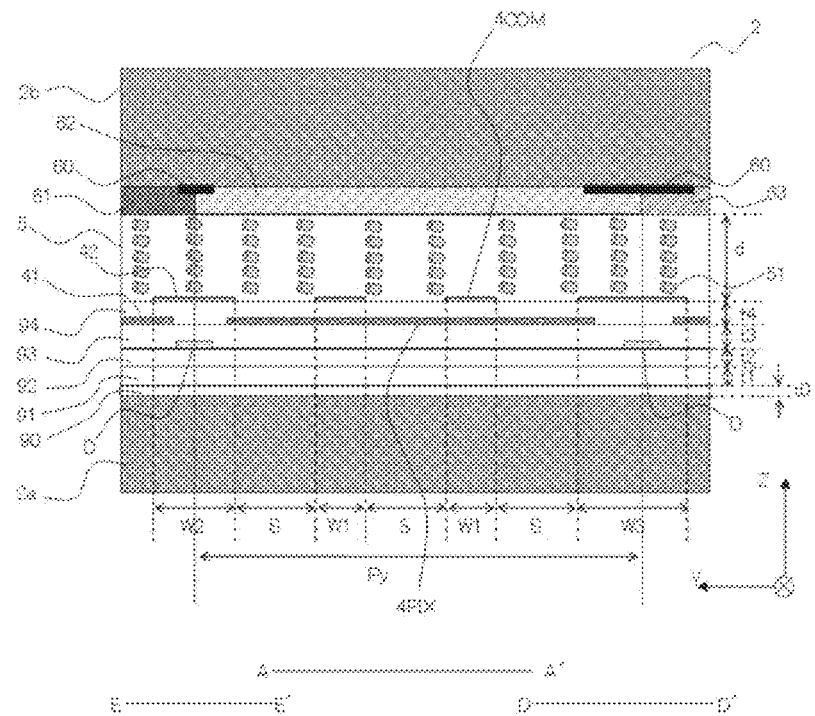
FIG. 5 is a cross-sectional view of the display panel carried by the image display apparatus according to the first embodiment of the present invention in the direction of the Y-axis.

FIG. 5 is a cross-sectional view of a subpixel 4S of FIG. 3 in the Y direction. The line segment A-A' is a line segment indicating a slit electrode section disposed in the opening of a trapezoidal pixel. Further, the line segment E-E' is a line segment indicating the region of the common electrode 4COM disposed on the lower base section of the trapezoid, while the line segment D-D' is a line segment indicating the region of the common electrode 4COM disposed on the upper base section of the trapezoid. FIG. 5 is a cross-sectional view that illustrates the cross-sectional structure of the sections and corresponds to one subpixel.

As illustrated in FIG. 4, any of three colors is arranged on each of pixels 4R for the right eye and pixels 4L for the left eye disposed in a pixel 4 in the Y-axis direction. A pixel electrode 4PIX is disposed in each subpixel in the pixel 4, and each pixel electrode 4PIX is referred to as 4PR1, 4PR2, 4PR3, 4PL1, 4PL2, or 4PL3 when such pixel electrodes are individually explained.

As illustrated in FIG. 2 and FIG. 5, the main substrate 2a and the opposite substrate 2b are disposed to set a minute gap in the display panel 2, and the liquid crystal layer 5 is disposed in the gap. A first control electrode including a first control electrode layer 41 and a second control electrode including a second control electrode layer 42 are disposed on the side, closer to the liquid crystal layer 5, of the main substrate 2a. The second control electrode having slits is disposed on the upper layer of the first control electrode, and a control electrode pair including the first control electrode and the second control electrode is disposed in each subpixel. An insulating layer 94 is disposed between the first control electrode and the second control electrode, and the orientation of liquid crystal molecules 51 in the liquid crystal layer 5 is controlled by an electric field formed by a potential difference between the first control electrode and the second control electrode.

As illustrated in FIG. 2 and FIG. 5, no pixel electrode 4PIX is disposed on the upper layer of a data line or a gate line, but the data and gate lines are covered with the common electrode COM. In the present embodiment, the first control electrode including the first control electrode layer 41 is a pixel electrode 4PIX while the second control electrode including the second control electrode layer 42 is a common electrode 4COM.

As illustrated in FIG. 3, each gate line G is disposed in each gap between pixel electrodes 4PIX in the two-dimensional view of a pixel. Each gate line G is bent but are extended in the Y-axis direction while being bent at several times. The plural gate lines G are arranged in the X-axis direction. Further, each data line D is covered with the black matrix 60. The plural data lines D are arranged in the Y-axis direction (not illustrated). Each data line D may also be connected to a pixel transistor while being bent in the lower layer of the black matrix and be extended in the X-axis direction while being bent at several times.

Herein, the tilt angles of each wiring line in counterclockwise and clockwise directions are defined as plus and minus angles, respectively, assuming that the +Y direction is a zero-degree axis in the X-Y plane. Each gate line G tilts at an angle φ or φ' in a direction different from the image separation direction in each subpixel and connects subpixels arranged in the Y-axis direction. The directions of tilting at the angles φ and φ' are referred to as meandering directions A and B, respectively. In the present embodiment, tilt angles in a meandering direction A73 and a meandering direction B74 have the relationship of φ=−φ', and the gate lines G have a structure in which each wiring line that extends in the meandering direction A73 and each wiring line that extends in the meandering direction B74 are alternately arranged in the Y-axis direction in each subpixel.

As illustrated in FIG. 3 and FIG. 4, the common electrode 4COM is provided with a plurality of slits which greatly extend in the X-axis direction in each subpixel. In other words, the slits are disposed so that the arrangement direction of the slits and the arrangement direction of the cylindrical lenses 3a are orthogonal to each other.

Since the opening width of each slit in the X-axis direction is greater than that in the Y-axis direction and the slit opening width in the X-axis direction is set depending on a meandering wiring line A or a meandering wiring line B, the respective slits formed in each subpixel have structures with different sizes. Although the three slits are formed in each subpixel according to the present embodiment, without limitation thereto, the number of slits may be appropriately set depending on the pitch of each subpixel.

The black matrix 60 illustrated in FIG. 3 is a light shielding section that covers the pixel transistor 4TFT and the data lines D. In the present embodiment, a material having the function of preventing light emitted from the backlight 12 from passing through an observer side and of shielding the light is expressed as "light shielding section", but the light shielding section is not particularly limited to the black matrix 60 but refers to a section through which light is not passed. Each data line D or each gate line G employs a metallic material with low resistance and both lines include a material through which light incident from the backlight is not passed. In the region other than the black matrix, each data line D or each gate line G functions as a light shielding section. In each subpixel 4S, the regions other than the light shielding sections are defined as openings. Since the pixel electrodes 4PIX and the common electrode 4COM are transparent electrodes, regions having trapezoidal shapes depending on the pixel electrodes 4PIX are the openings of the subpixels.

In this first embodiment, the opening regions other than the above-mentioned light shielding sections have generally trapezoidal shapes. Hereinafter, a pixel having a generally trapezoidal shape formed by the light shielding sections is referred to as "trapezoid pixel". The shape of each opening is not limited to a trapezoidal shape, but a parallelogram, polygonal, oval, or semicircular shape is also applicable.

In the case of using the expression "vertical" in the X-Y plane, a vertical direction refers to a direction parallel to the Y-axis direction, and an upper side is a +Y direction while a lower side is a −Y direction. Since the shape of each subpixel 4S can be regarded as a generally trapezoidal shape in consideration of the shapes of the regions other than the light shielding sections as mentioned above, for explanation, each subpixel is referred to as a trapezoidal pixel, and longer and shorter bases are expressed as lower and upper bases, respectively.

In the present embodiment, in order to simply indicate the widths of each opening in each subpixel 4S in the X-axis direction and the Y-axis direction, the opening width of each subpixel 4S in the Y-axis direction is referred to as a longitudinal opening width and the ratio of the longitudinal opening width per subpixel pitch in the Y-axis direction is referred to as a longitudinal opening ratio. In consideration of a transmittance distribution in the Y-axis direction in the Y-Z cross section of each subpixel, the average transmittance thereof in the Y-axis direction is referred to as longitudinal transmittance and is defined as described below. The average transmittance in the Y-axis direction is defined as a value obtained by integrating transmittance at each Y-axis position in the range of a certain Y-axis distance at a certain X position and dividing the integrated transmittance by the range of the Y-axis distance.

As illustrated in FIG. 3, in the display panel 2, the columns of the pixels 4R for the right eye and the pixels 4L for the left eye, including subpixels having trapezoidal shapes, are arranged with the oblique sides of the trapezoids alternately facing each other in the image separation direction, i.e., in the X-axis direction. In the present embodiment, the openings of the pixels 4R for the right eye and the pixels 4L for the left eye are composed of "opening overlapping regions X2" in which the openings overlap each other in the Y-axis direction and "opening non-overlapping regions X1" in which the openings do not overlap each other.

As illustrated in FIG. 3, the length of the upper base of each opening in each trapezoidal pixel is X1, while the width, in the X-axis direction, of a region in which openings having generally trapezoidal shapes overlap each other in subpixels adjacent to each other in the X-axis direction is X2.

As illustrated in FIG. 4, the plural slits having trapezoidal shapes corresponding to the oblique sides of the generally trapezoidal pixels, i.e., the meandering wiring lines A or the meander wiring lines B, are disposed in the common electrode 4COM. In the present embodiment, each slit region in the common electrode 4COM is referred to as a slit opening. When attention is paid to slits in the display unit, the slit openings of each pixel 4R for the right eye and each pixel 4L for the left eye are composed of "slit overlapping regions SX2" in which the slit openings overlap each other in the Y-axis direction and "slit non-overlapping regions SX1" in which the slit openings do not overlap each other.

Thus, as for the pitch Px of subpixels in the X-axis direction, the following relational expression (2) is established.

[Expression 2]

$$Px=X1+X2=SX1+SX2 \quad (2)$$

As illustrated in FIG. 5, in each subpixel, the common electrode 4COM is provided with a plurality of slits. In the subpixel openings, an electrode width between slits in the Y-axis direction is W1 and is referred to as a slit electrode width W1. Further, the opening width of each slit in the Y-axis direction is S and is referred to as a slit opening width S. Further, the electrode width of the common electrode 4COM in the Y-axis direction in the lower base section of each trapezoidal pixel is W2 and is referred to as a base electrode width W2. Further, the electrode width of the common electrode 4COM in the upper base section of each trapezoidal pixel in the Y-axis direction is W3 and is referred to as an upper base electrode width W3. Thus, as for the pitch Py of a subpixel, of which the number of the slits is z, in the Y-axis direction, the following relational expression (3) is established.

[Expression 3]

$$Py=z \times S+(z-1) \times W1+W2/2+W3/2 \quad (3)$$

As illustrated in FIG. 5, the second control electrode layer 42 is disposed on the upper layer of the first control electrode layer 41 via the fourth insulating layer 94. In the present embodiment, the pixel electrodes 4PIX are composed of the first control electrode layer 41 while the common electrode 4COM is composed of the second control electrode layer 42. The pixel electrodes 4PIX are electrodes that are individually disposed in each subpixel while the common electrode 4COM is provided with a slit pattern on the upper layer of the pixel electrodes 4PIX in each pixel electrode. The pixel electrodes 4PIX can be independently driven in each subpixel. The common electrode 4COM is a common electrode that electrically connects the respective subpixels and has a common potential in all the subpixels.

The black matrix 60 is disposed as a light shielding section for pixels on the surface, closer to the liquid crystal layer 5, of the opposite substrate 2b. Further, the color filters are disposed on the surface, closer to the liquid crystal layer 5, of the opposite substrate 2b. An oriented film is disposed between the color filters and the liquid crystal layer (not illustrated). An overcoat having a flattening function may be disposed between the color filters and the oriented film.

The pixel electrodes 4PIX and the common electrode 4COM are composed of conductive transparent electrodes. In the common electrode 4COM, the plural slits extending in the X-axis direction are arranged and disposed in the Y-axis direction, the ends of the slits are disposed along the meandering direction A or the meandering direction B. In other words, in the present embodiment, the ends of the slits of the common electrode 4COM have the structure of being disposed along the gate lines G bent every row in the meandering direction A and the meandering direction B. Further, the shape of each slit end is an unrectangular shape which is processed diagonally along the meandering direction A or the meandering direction B. Further, between subpixels adjacent to each other in the X-direction, slit ends in the mutual subpixels shifts in the Y-axis direction. The tilting sections of the slit ends are disposed to face each other in the direction orthogonal to the meandering direction A or the meandering direction B between the subpixels adjacent to each other in the X direction.

The main substrate 2a is disposed on the −Z direction side of the display panel 2 while the opposite substrate 2b is disposed on the +Z direction side. Further, polarizing plates 11 are affixed to the −Z side of the main substrate 2a and the +Z side of the opposite substrate 2b.

FIG. 6 is an equivalent circuit diagram of pixels in the display panel carried by the image display apparatus according to the first embodiment. FIG. 6(A) is an equivalent circuit diagram that illustrates a pixel pair of a subpixel Pi+1, j−1 and a subpixel Pi+1, j while FIG. 6(B) is an equivalent circuit diagram that illustrates a pixel pair of a subpixel Pi, j and a subpixel Pi, j+1. The subscripts i and j are integers indicating the numbers of a data line Di and a gate line Gj connected to the pixel transistor 4TFT.

FIG. 6(A) is the equivalent circuit diagram corresponding to the subpixels P93 and P94 illustrated in FIG. 1 as an example while FIG. 6(B) is the equivalent circuit diagram corresponding to the subpixels P85 and P84 illustrated in FIG. 1 as an example. The connection relations of the data lines D, the gate lines G, and the pixel transistors 4TFT illustrated in FIGS. 6(A) and (B) are arranged in a diagonal direction while shifting every row of the data lines. The subpixels 4S and 4S' are spread on the display of the display panel 2 by alternately disposing the two pixel pairs. In other words, the display panel 2 illustrated in FIG. 1 is composed of the two pixel pairs illustrated in the equivalent circuit diagram of FIG. 6(A) or FIG. 6(B).

As illustrated in FIG. 6, a pixel transistor 4TFT connected to a pixel electrode 4PIX, a gate line G for controlling the pixel transistor 4TFT, a data line D for inputting an image signal to the pixel electrode through the pixel transistor 4TFT, and a common electrode 4COM are disposed in each subpixel. The subpixels 4S and 4S' illustrated in FIG. 6 form a pixel pair connected to a common data line. The pair of the two subpixels disposed across the one data line in the Y-axis direction is referred to as "vertical adjacent pixel pair". Respective switching means included by the two subpixels 4S and 4S' composing the vertical adjacent pixel pair are connected in common to the data line sandwiched by the two subpixels and are controlled by the different gate lines.

It is desirable to dispose the respective subpixels composing the vertical adjacent pixel pair in the relationship of being mutually point-symmetric with respect to the center point O of the vertical adjacent pixel pair. A pixel layout has the pixel layout structure of being point-symmetric with respect to the center point of the display unit and the center point of the vertical pixel pair as in the case of the display panel 2 illustrated in FIG. 3. Further, the pixel layout is line-symmetric with respect to a line segment parallel to the X axis through the center point of the display unit and a line segment parallel to the Y axis through the center point of the vertical pixel pair.

As illustrated in FIG. 6, a storage capacity Cst is disposed between a pixel electrode 4PIX and a common electrode 4COM in each subpixel, and the pixel capacity Clc is formed on the side closer to the liquid crystal layer 5. In other words, the storage capacity Cst is a capacity that is formed through the insulating layer 94 between the pixel electrodes 4PIX and the common electrode 4COM and plays the role of maintaining the orientation state of the liquid crystal molecules of which the orientation is controlled by an electric field between the pixel electrodes 4PIX and the common electrode 4COM. The pixel capacity Cst may be set depending on the liquid crystal capacity Clc and can be appropriately adjusted by changing the area of superimposing of the pixel electrodes and the common electrode, the thickness of the interlayer film between the pixel electrodes and the common electrode, and a dielectric constant.

Figure 7:
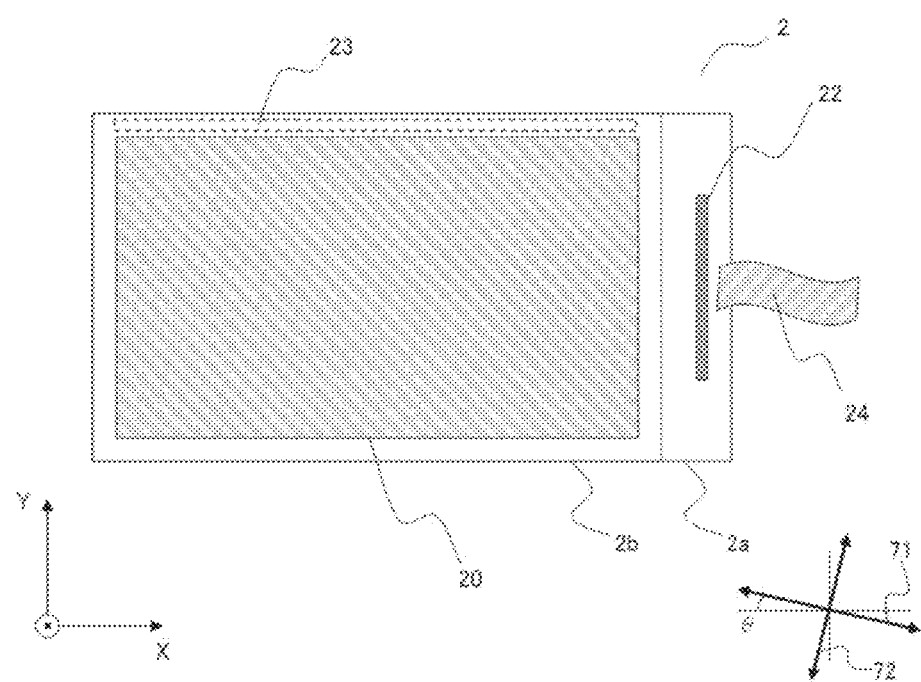
FIG. 7 is a plan view of the display panel carried by the image display apparatus according to the first embodiment of the present invention.

FIG. 7 is a plan view of the display panel 2 carried by the image display apparatus according to the first embodiment. Each data line D is connected to a data driver 22, and a display signal output from the data drivers 22 is supplied to each data line D at predetermined timing (not illustrated). Further, each gate line G is connected to a gate driver 23, and a gate signal is supplied at predetermined timing. The data driver 22 and the gate driver 23 play the role of synchronizing the display signal and the gate signal and supplying the signals to each pixel disposed on the display image plane 20.

The pixel transistor 4TFT is an MOS-type thin film transistor, in which one of a source electrode and a drain electrode is connected to each data line D through a contact hole 4CONT1 and the other is connected to each pixel electrode 4PIX through another contact hole 4CONT2 (not illustrated). The present invention specifies that an electrode to which each pixel electrode is connected is referred to as the source electrode and an electrode connected to each data line D as the drain electrode. In addition, the gate electrode of the pixel transistor 4TFT is connected to each gate line G.

(Structure of Cross Section of Element)

As the pixel transistor 4TFT, there is used a polysilicon thin film transistor in which polycrystalline silicon is used as a semiconductor. Polycrystalline silicon is a P-type semiconductor containing a very small amount of boron, as an example. In other words, although the pixel transistor 4TFT is a PMOS-type thin film transistor which becomes in a conduction state between the source electrode and the drain electrode when the potential of the gate electrode is lower than the potential of the source electrode or the drain electrode, without limitation thereto, an NMOS-type thin film transistor is also similarly applicable.

The polysilicon layer of the polysilicon pixel transistor 4TFT is formed, for example, by forming a silicon oxide layer as an undercoat film 90 on the TFT substrate 2a, subsequently forming an amorphous silicon layer, and polycrystallizing the amorphous silicon layer. As a method for polycrystallizing amorphous silicon, a thermal annealing method or a laser annealing method is used. In particular, the laser annealing method using a laser such as an excimer laser allows increase in the temperature of a glass substrate to be minimized to heat and polycrystallize only a silicon layer. Therefore, alkali-free glass with a low melting point or the like can be used by using the laser annealing method. As a result, cost reduction is enabled and, therefore, a material referred to as low-temperature polysilicon is often used. In the present embodiment, the scanning direction of an excimer laser to a glass substrate is the Y-axis direction. An amorphous silicon thin film transistor can be realized by omitting the annealing step.

Then, a silicon oxide layer is formed as the first interlayer film 91 to be a gate insulation layer on the polysilicon layer and is appropriately patterned. In this process, the region other than a portion used as the semiconductor layer of the silicon thin film is preferably doped with ions to make a conductor. As a patterning technique, a light patterning technique using a photosensitive resist is applicable. As an example, a photosensitive resist is spin-coated, thereafter partially irradiated with light by an exposure machine such as a stepper, and subjected to a development step, to make a photosensitive resist film remain only on a portion on which a pattern remains. Then, a silicon layer on a region where the photosensitive resist film does not remain is removed by dry etching or the like, and the photosensitive resist film is finally peeled.

Then, an amorphous silicon layer and a tungsten silicide layer are formed and patterned to form a gate electrode and the like. At this time, a gate line to which the gate electrode is connected, a storage capacity electrode, and a storage capacity line may also be similarly formed. Then, a silicon oxide layer and a silicon nitride layer are formed as second interlayer films 92 and are appropriately patterned, followed by forming an aluminum layer and a titanium layer to form a source electrode and a drain electrode. At this time, a data line may also be formed simultaneously.

Then, a silicon nitride layer or an organic flattening film layer is formed as a third interlayer film 93 and is appropriately patterned, and a transparent conductive film such as ITO (Indium Tin Oxide) is thereafter formed as the first control electrode layer 41 and is patterned. The first control electrode layer 41 becomes a pixel electrode 4PIX by the patterning.

Then, an insulating film such as a silicon nitride film or an organic flattening layer is formed as a fourth interlayer film 94 and is appropriately patterned, and a transparent conductive film such as ITO (Indium Tin Oxide) is thereafter formed as the second control electrode layer 42 and is patterned. The second control electrode layer 42 becomes a common electrode 4COM by the patterning.

As a result, the pixel structure having the thin film transistor can be formed. A circuit that drives a gate line, a data line, and a storage capacity line can also be simultaneously formed using the thin film transistor.

As illustrated in FIG. 5, the undercoat film 90 is an insulator with an average film thickness of t0, the first interlayer film 91 is an insulator with an average film thickness of t1, the second interlayer film 92 is an insulator with an average film thickness of t2, the third interlayer film 93 is an insulator with an average film thickness of t3, and the fourth interlayer film 94 is an insulator with an average film thickness of t4.

As illustrated in FIG. 2, the capacity generated between the gate lines G and the common electrode 4COM is formed through the second interlayer film 92, the third interlayer film 93, and the fourth interlayer film 94, and the distance between the gate lines G and the common electrode 4COM is t2+t3+t4. Further, as illustrated in FIG. 5, the capacity generated between the data lines D and common electrode 4COM is formed through the third interlayer film 93 and the fourth interlayer film 94, and the distance between the data lines D and the common electrode 4COM is t3+t4. In other words, the comparison between the capacities per unit area generated between the common electrode 4COM and the respective wiring lines reveals the structure in which the capacity Cgc per unit area formed between the common electrode 4COM and the gate lines G is set to be lower than the capacity Cdc per unit area formed between the common electrode 4COM and the data lines D and the load capacity of the gate lines G is reduced. In particular, in the display panel 2 according to the present embodiment, the number of the gate lines is set according to the number of eyepoints, and the period of one scan therefore tends to be shorter due to increase in the number of the gate lines. In such a display panel having a plurality of eyepoints, it is important to reduce the load capacity of the gate lines G.

As illustrated in FIG. 2, FIG. 3, and FIG. 5, each data line D is disposed between adjacent pixel electrodes 4PIX and is placed so that the data line D and the pixel electrodes 4PIX do not overlap each other in two-dimensional view. The same also applies to the gate lines G. As a result, a capacitive coupling generated between the gate lines G, the data lines D, and the pixel electrodes 4PIX can be reduced. Furthermore, the film thickness of the third interlayer film 93 is desirably increased in order to reduce the capacitive coupling between the gate lines G, the data lines D, and the pixel electrodes 4PIX. It is necessary to set the storage capacity at a predetermined level or more in order to maintain the pixel capacity Clc present between the pixel electrodes 4PIX and the common electrode 4COM, and it is desirable to reduce the film thickness of the fourth interlayer film 94 in order to increase the storage capacity. In other words, the reduction in capacitive coupling and the securing of the pixel capacity can be simultaneously realized by making the film thickness t3 of the third interlayer film 93 larger than the film thickness t4 of the fourth interlayer film 94. A flattening function may be provided by using an organic interlayer film in the third interlayer film 93. The flattening enables the initial orientation state of liquid crystal molecules to be improved to reduce a leak of light during black view and to improve display performance.

Figure 8:
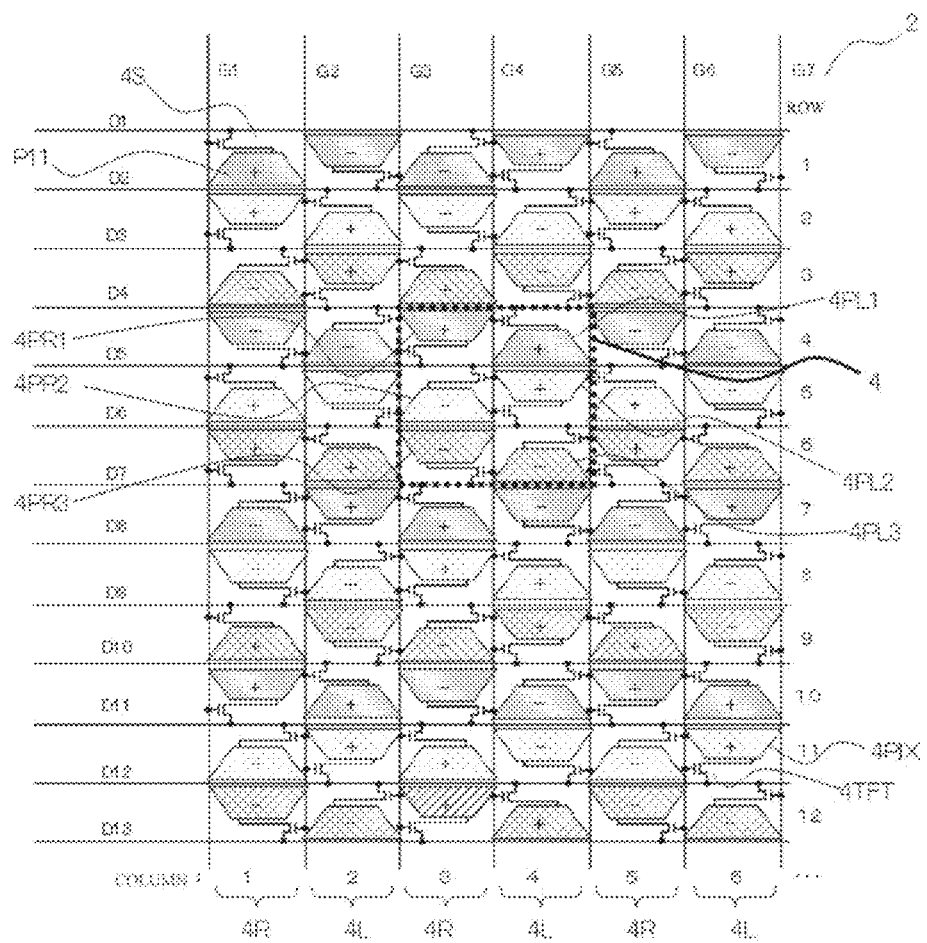
FIG. 8 is a plan view that illustrates the driving polarities of the display panel carried by the image display apparatus according to the first embodiment of the present invention.
Figures 9, 10:
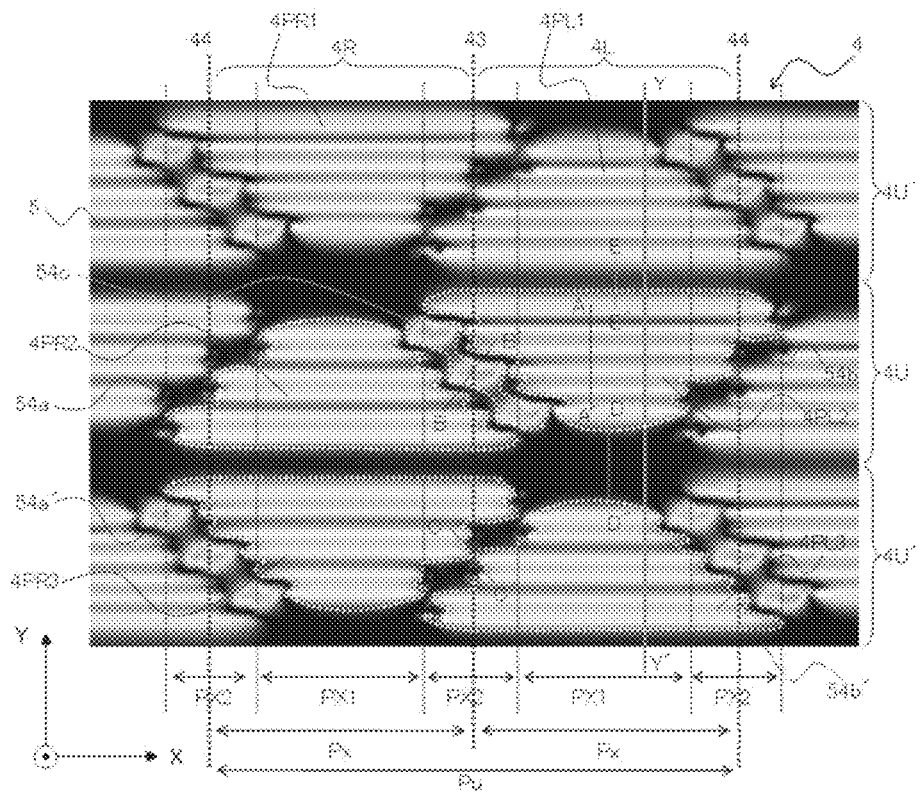
FIG. 9 is a plan view that illustrates the driving polarities of data signals input into the image display apparatus according to the first embodiment of the present invention, in which (A) illustrates the driving polarities in an odd-numbered frame; and (B) illustrates the driving polarities in an even-numbered frame.
FIG. 10 is a simulation result that illustrates a transmittance distribution in a liquid crystal layer in the X-Y plane.

A method for driving the image display apparatus according to the present embodiment, composed as mentioned above, particularly a polarity during the driving, is described below. FIG. 8 is a plan view that illustrates the polarity of each pixel in the image display apparatus according to the present embodiment. In the present embodiment, an input signal to the image display apparatus 1 is driven using dot reversion driving as illustrated in FIG. 9. FIG. 9(A) illustrates the driving polarities in an odd-numbered frame while FIG. 9(B) illustrates the driving polarities in an even-numbered frame.

As illustrated in FIG. 9, the dot reversion driving is a driving method by which the polarity of each display data transmitted every one data line is reversed with respect to a reference potential, the polarity of each display data transmitted through each data line every one gate line is reversed, and the polarity is reversed in each frame. The dot reversion driving is also referred to as 1H1V reversion driving. This is because the polarity is reversed every one data line arranged in the horizontal direction (H direction) or every one gate line arranged in the vertical direction (V direction).

A specific explanation is given with reference to FIG. 8, which illustrates the polarity of each pixel realized as a result of the dot reversion driving in a certain frame. First, when the gate line G1 is selected, display data having a positive polarity is transmitted to the data line D1 and a voltage having a positive polarity is written in the pixel P11. Further, display data having a negative polarity is transmitted to the data line D2. Similarly, display data having a positive polarity is transmitted to the data lines D3, D5, D7, D9, D11, and D13, while display data having a negative polarity is transmitted to the data lines D4, D6, D8, D10, and D12. Subsequently, when the gate line G2 is selected, all the polarities of the data lines are reversed. In other words, display data having a negative polarity is transmitted to the data lines D1, D3, D5, and D7, while display data having a positive polarity is transmitted to the data lines D2, D4, and D6. After that, the case of selecting the gate lines G3, G5, and G7 is similar to the case of selecting the gate line G1, while the case of selecting the gate lines G4, G6, and G8 is similar to the case of selecting the gate line G2. When this frame is completed, polarities are further reversed in the next frame. In other words, when the gate lines G1, G3, G5, and G7 are selected, display data having a negative polarity is transmitted to the data lines D1, D3, D5, D7, D9, D11, and D13 while display data having a positive polarity is transmitted to the data lines D2, D4, D6, D8, D10, and D12. Further, when the gate lines G2, G4, and G6 are selected, display data having a positive polarity is transmitted to the data lines D1, D3, D5, D7, D9, D11, and D13 while display data having a negative polarity is transmitted to the data lines D2, D4, D6, D8, D10, and D12.

As illustrated in FIG. 8, a pixel group composed of pixels 4R for the right eye has a polarity distribution in which a two-line dot reversion (2H1V dot reversion) effect is obtained. In addition, the same applies to a pixel group composed of pixels 4L for the left eye. As a result, the polarities are seen to be reversed every two data lines arranged in the horizontal direction (H direction) and every one gate line arranged in the vertical direction (V direction) in the polarity distribution of an image observed by one eye.

In the present embodiment, the fluctuation of the potential of the common electrode 4COM can be suppressed when display data is written in each pixel. This is because not only a pixel in which display data having a positive polarity is written but also a pixel in which display data having a negative polarity is written is connected to the common electrode 4COM in a certain gate selection period. Further, when attention is paid to a column corresponding to a certain eyepoint, one polarity of positive and negative polarities is written in subpixels half columns corresponding to the certain eyepoint in one gate selection period. In the next gate selection period, the other polarity different from the polarity written in the former gate selection period is written in the remaining pixels. As a result, the potential of a storage capacity line can be inhibited from fluctuating towards one polarity, and crosstalk or the like occurring the direction of extending the storage capacity line can be reduced to realize display of high quality. In the structure according to the present embodiment, a two-line dot reversion effect and the potential fluctuation suppression effect of each storage capacity line can be realized using general dot reversion driving, and high image quality display can be realized at a low cost.

As illustrated in FIG. 8, subpixels adjacent to each other in the Y-axis direction in the lower base section of a trapezoid have the same polarity. Since the subpixels adjacent to each other in the Y-axis direction have the same polarity as each other, the leak of an electric field to adjacent pixels can be reduced. The pixels adjacent to each other in the Y-axis direction are pixels with different colors and a color boundary is disposed in the base moiety section of each trapezoid. Therefore, display colors can be prevented from being mixed by reducing the leak of an electric field to the adjacent pixels with the different colors.

The positive polarity and the negative polarity indicate the potential of each pixel electrode with respect to the reference potential Vcom of the common electrode 4COM. Examples of the reference potential in the dot reversion driving include a potential near a ground potential. However, strictly speaking, in order to reduce the influence of the feedthrough of a thin film transistor, a DC offset is often applied to a common electrode potential and may be appropriately adjusted.

As illustrated in FIG. 5, the liquid crystal layer 5 is pinch-held between the main substrate 2a and opposite substrate 2b of the display panel 2. The liquid crystal layer 5 is a liquid crystal material including the positive liquid crystal molecules 51 with positive dielectric anisotropy and is homogeneously oriented when the difference between the potentials of each pixel electrode 4PIX and the common electrode 4COM is zero. Although the operation-effect of the structure to which the liquid crystal material with the positive dielectric anisotropy is applied is explained in the present embodiment, a liquid crystal material with negative dielectric anisotropy also provides a similar effect.

The orientation state of the positive liquid crystal molecules 51 is subjected to orientation treatment so that the longitudinal direction of each liquid crystal molecule is a direction of being rotated at an angle of $+(90-\theta)$ degrees with respect to the Y axis in the initial state in which there is no potential difference between each pixel electrode 4PIX and the common electrode 4COM (see the bottom right-hand corner of FIG. 4). In other words, the angle between the slit drawing direction of the common electrode 4COM and the direction of initial orientation is $\theta$. The initial orientation direction is referred to as a θLC direction. As an example, the angle θ is set at 8 degrees. One (first polarizing plate) of the two polarizing plates described above, disposed on both sides of the liquid crystal display device 1, is disposed so that its absorption axis coincides with the longitudinal direction of each liquid crystal molecule, and the other polarizing plate is disposed so that its absorption axis is orthogonal to that of the first polarizing plate (see the bottom right-hand corner of FIG. 1). In other words, the display panel 2 is a normally black liquid crystal display panel.

A gap between the main substrate 2a and the opposite substrate 2b, i.e., the thickness d of the liquid crystal layer 5 including the positive liquid crystal molecules 51 is set to 4 µm as an example. In the present embodiment, the thickness of the liquid crystal layer 5 including the liquid crystal molecules 51 is referred to as a cell gap. The cell gap may be appropriately set depending on a retardation Δnd.

The slit electrode width W1 of the common electrode 4COM in the Y-axis direction is set to 3 µm while the slit opening width S in the Y-axis direction is set to 5 µm. As mentioned above, the cell gap according to the present embodiment is set to 4 µm. In other words, in the present embodiment, there is made the structure in which the cell gap d is more than the slit electrode width W1 and less than the slit opening width S and the relationship of W1<d<S is satisfied. Further, the pitch of the slit electrode width and the slit opening width, i.e., a slit pitch S+W1, is 8 µm and is set to S+W1=2×d.

When the slit pitch becomes large, it is impossible to efficiently generate a fringe electric field, an electric field on an electrode upper layer becomes low, and the transmittance fluctuation in the direction of arranging the slits is therefore increased in the transmittance distribution of the liquid crystal layer. The intensive moving of the liquid crystal molecules in the interface side of the main substrate 2a is needed for efficiently utilizing the fringe electric field. The slit pitch in the range of d<S+W1<3×d is desired for homogeneously moving the liquid crystal molecules in the vicinity of the interface of the main substrate 2a.

As illustrated in FIG. 4, the widths in the Y-axis direction of the common electrode 4COM disposed on the boundary between subpixels adjacent to each other in the Y-axis direction are defined as electrode widths W2 and W3. The electrode width W2 indicates the width of the common electrode 4COM disposed in the lower base section of the trapezoid, while the electrode width W3 indicates the width of the common electrode 4COM disposed in the upper base section of the trapezoid. The electrode width W2 and the electrode width W3 are set to be greater than the cell gap. The electrode width W2 of the common electrode 4COM disposed in the lower base section of each trapezoidal pixel is 8 µm, while the electrode width W3 of the common electrode 4COM disposed in the upper base section of each trapezoidal pixel is 20 µm. In other words, W2=2×d and W3=5×d are satisfied.

As illustrated in FIG. 4, a slit end is disposed along a meandering wiring line section on the boundary between subpixels adjacent to each other in the X-axis direction. The slit end has oblique sides along the direction of drawing each meandering wiring line, and the oblique sides are disposed to face each other between the subpixels adjacent to each other in the X-axis direction. The distance between the oblique sides is defined as a common electrode width W4 between the subpixels adjacent to each other in the X-axis direction. The electrode width W4 of the common electrode 4COM is set to be greater than the cell gap. In the present embodiment, the electrode width W4 of the common electrode 4COM disposed in the oblique side section of the trapezoid is 6 µm.

When the bulk of the liquid crystal molecules is transformed depending on an electric field, elastic force acts according to a splay elastic constant K11, a twist elastic constant K22, and a bend elastic constant K33 with respect to respective distortions of splay, twist, and bend.

The positive liquid crystal molecules 51 have physical property values of a refractive index anisotropy Δn of 0.1 at a wavelength of 550 nm, a dielectric anisotropy Δ∈ of 13.4, a dielectric constant of 17.3 in a direction parallel to the directors of liquid crystals, and elastic constants K11=12.1 [pN] (pico-Newton), K22=6.6 [pN], and K33=18.1 [pN], as an example. The liquid crystal molecules have the twist elastic constant K22 which is less than the bend elastic constant K33, so that twist transformation is easy.

The behavior and electric field distribution of the liquid crystal molecules were investigated using a commercially available liquid crystal molecular orientation simulator. Not only two-dimensional simulation but also three-dimensional simulation is needed for calculation of the orientation of the liquid crystal layer in the present embodiment, and there was used LCD-MASTER (manufactured by Shintech) which is one of simulators capable of three-dimensional orientation calculation.

FIG. 10 illustrates a transmittance distribution diagram in the X-Y plane, calculated by a liquid crystal molecular orientation simulator. A voltage value applied to each pixel electrodes 4PIX of the pixel 4 was set according to the driving polarity distribution illustrated in FIG. 8. In other words, in the pixel electrodes of the pixel 4 illustrated in FIG. 4, the pixel electrodes 4PR1, 4PL1, and 4PL2 have a positive polarity while the pixel electrodes 4PR2, 4PR3, and 4PL3 are in the state of a negative polarity. The reference potential Vcom of the common electrode 4COM is set at 0 [V]; and the negative and positive polarities are set at applied voltages of Vn=−4 [V] and Vp=+4 [V], respectively. In FIG. 10, a whiter portion indicates a region with higher transmittance while a blacker portion indicates a region with lower transmittance. Each calculation is a result calculated in a certain polarity state in one frame period; however, since a polarity is reversed in each frame period as in the case of the above-mentioned driving method, transmitted light averaged in the odd-numbered and even-numbered frames is observed during actual driving.

The simulation results are described in detail below.

Figure 11:
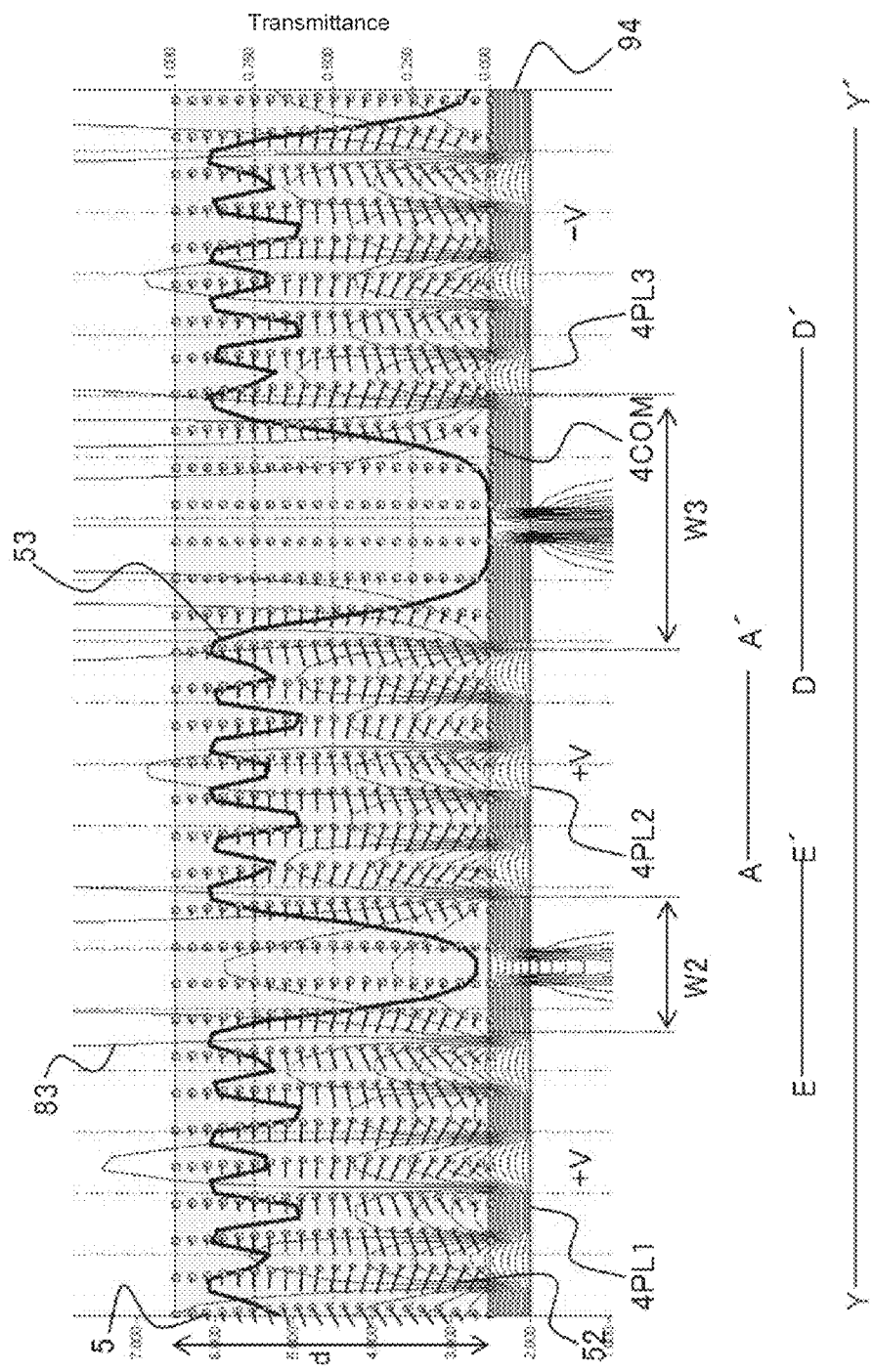
FIG. 11 is a simulation result that illustrates the orientation and transmittance distribution of liquid crystal directors in the cross section taken along the line segment Y-Y'.
Figure 14:
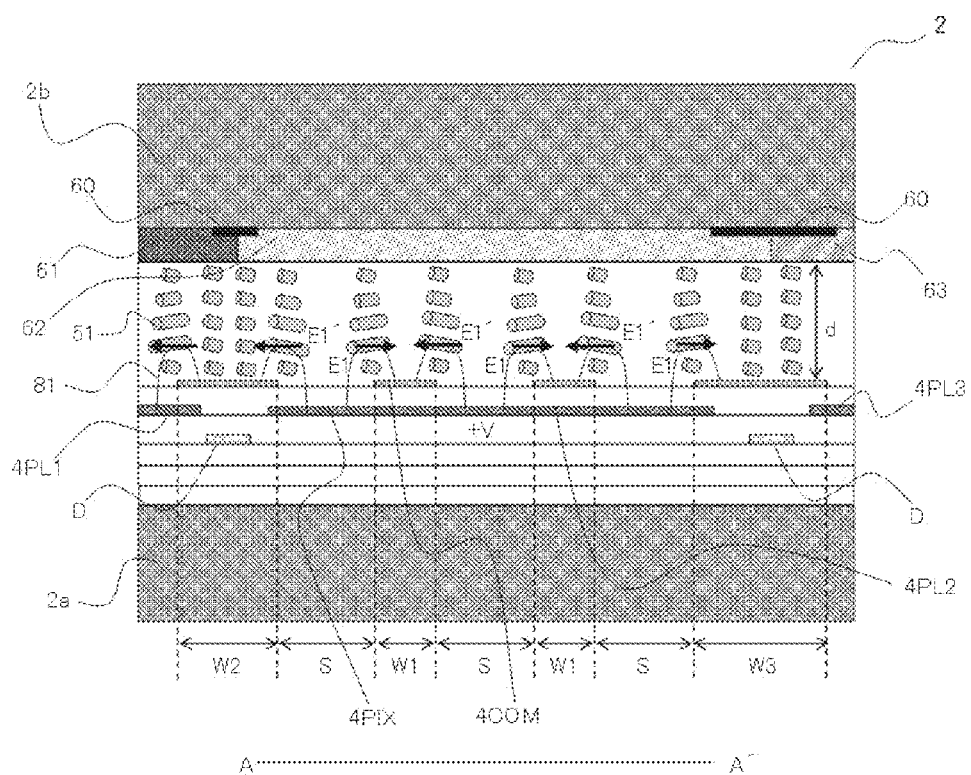
FIG. 14 is a schematic view that illustrates movement of liquid crystal molecules in the cross section taken along the line segment A-A' of the display panel carried by the image display apparatus according to the first embodiment of the present invention.
Figure 16:
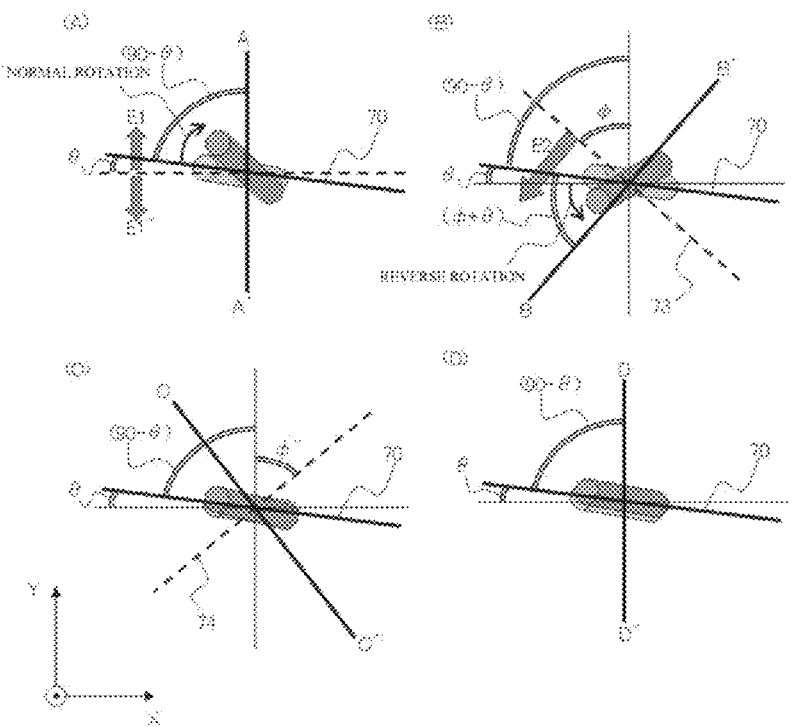
FIG. 16 is a schematic view that illustrates the direction of moving liquid crystal molecules in the line segment A-A', the line segment B-B', the line segment C-C', or the line segment D-D' in the X-Y plane, in which, in (A), the dotted line is a line along the direction of drawing a data line D and is orthogonal to the line segment A-A'.

FIG. 11 is a simulation result that illustrates the orientation and transmittance distribution of liquid crystal directors in the cross section taken along the line segment Y-Y' and is a view that schematically illustrates the cross sections taken along the line segments E-E', A-A', and D-D'. FIG. 14 is a schematic view that illustrates movement of liquid crystal molecules in the cross section taken along the line segment A-A' of the display panel carried by the image display apparatus according to the first embodiment of the present invention;

FIG. 16 is a schematic view that illustrates the rotation direction of moving liquid crystal molecules in the center of each of the line segment A-A', the line segment B-B', the line segment C-C', and the line segment D-D' in the X-Y plane. In FIG. 16(A), the dotted line is a line along the direction of drawing a data line D and is orthogonal to the line segment A-A'. In FIG. 16(B) or (C), the dotted line is a line along a meandering direction A or a meandering direction B which is the direction of drawing a gate line G and each dotted line is orthogonal to the line segment B-B' or the line segment C-C'. A bar-shaped liquid crystal molecule 51 is illustrated at the center point of intersection of each dotted line and each line segment, and its longitudinal direction is illustrated. Further, in the longitudinal direction of each liquid crystal molecule, each initial orientation direction 70 and the rotation direction of each liquid crystal molecule depending on the direction of each electric field are illustrated.

In FIG. 16(A), electric field components E1 and E1' parallel to a substrate surface are generated in the direction orthogonal to the longitudinal direction of the slit by the fringe electric field between each pixel electrode and the common electrode. In FIG. 16(B), an electric field E2 is generated in the direction orthogonal to the direction of the meandering wiring line between the pixel electrodes 4PIX with different polarities which are adjacently disposed along the direction of the meandering wiring line. In FIG. 16(C), the pixel electrodes 4PIX adjacently disposed along the direction of the meandering wiring line have the same polarity and, therefore, any electric field component in the lateral direction is not generated in the direction orthogonal to the direction of meandering wiring line. In FIG. 16(D), the pixel electrodes 4PIX adjacently disposed along the wiring line direction in the base section of the trapezoidal pixel are shielded by and placed away from the common electrode 4COM and, therefore, any electric field is not generated in the direction orthogonal to the direction of the wiring line between the pixel electrodes 4PIX.

As illustrated in FIG. 11, the orientation of liquid crystal directors 52 is changed depending on an electric field distribution by an equipotential line 83, the retardation of the liquid crystal layer can be varied, and a transmittance distribution 53 is obtained. As an incident light source, a standard light source D60 is applied. Further, the polarizing plate on the main substrate 2a side is disposed so that its absorption axis coincides with the longitudinal direction of each liquid crystal director 52 in the initial orientation state, while the polarizing plate on the opposite substrate 2b side is disposed so that its absorption axis us orthogonal to that of the polarizing plate on the main substrate 2a side (see the bottom right-hand corner of FIG. 7).

As illustrated in FIG. 14, a fringe electric field 81 is generated due to the potential difference between the pixel electrode 4PL2 and the common electrode 4COM. Electric field components E1 and E1' in the fringe electric field 81 are electric field components parallel to the substrate surface. The electric field components act as torque for rotating the liquid crystal molecules 51 in the in-plane direction to move the liquid crystal molecules. Since the fringe electric field 81 contains electric field components in the Z direction, liquid crystal molecules 51 near the substrate interface stand up in the Z direction.

An electric field component parallel to the substrate surface is referred to as a lateral electric field, while an electric field component in a diagonal direction from the direction perpendicular to the substrate surface in the fringe electric field components is referred to as a diagonal electric field. Although the orientation of the liquid crystal molecules is controlled mainly by the lateral electric field as described above, the orientation is also controlled by the diagonal electric field.

As illustrated in FIG. 11, although the standing up in the Z-axis direction somewhat occurs in a portion in the vicinity of the common electrode 4COM of the main substrate 2a, the thickness of the liquid crystal layer in the portion is 2 µm, i.e., in the range equal to or less than half of the cell gap.

As illustrated in FIG. 16(A), the rotation direction of the liquid crystal molecules 51 moved by the electric field E1 or E1' is a clockwise rotation direction, i.e., a negative rotation direction. The rotation direction is referred to as a normal rotation direction. In contrast, as illustrated in FIG. 16(B), the rotation direction of the liquid crystal molecules 51 moved by the electric field E2 is a counterclockwise direction, i.e., a positive rotation direction. The rotation direction is referred to as a reverse rotation direction.

Figure 12:
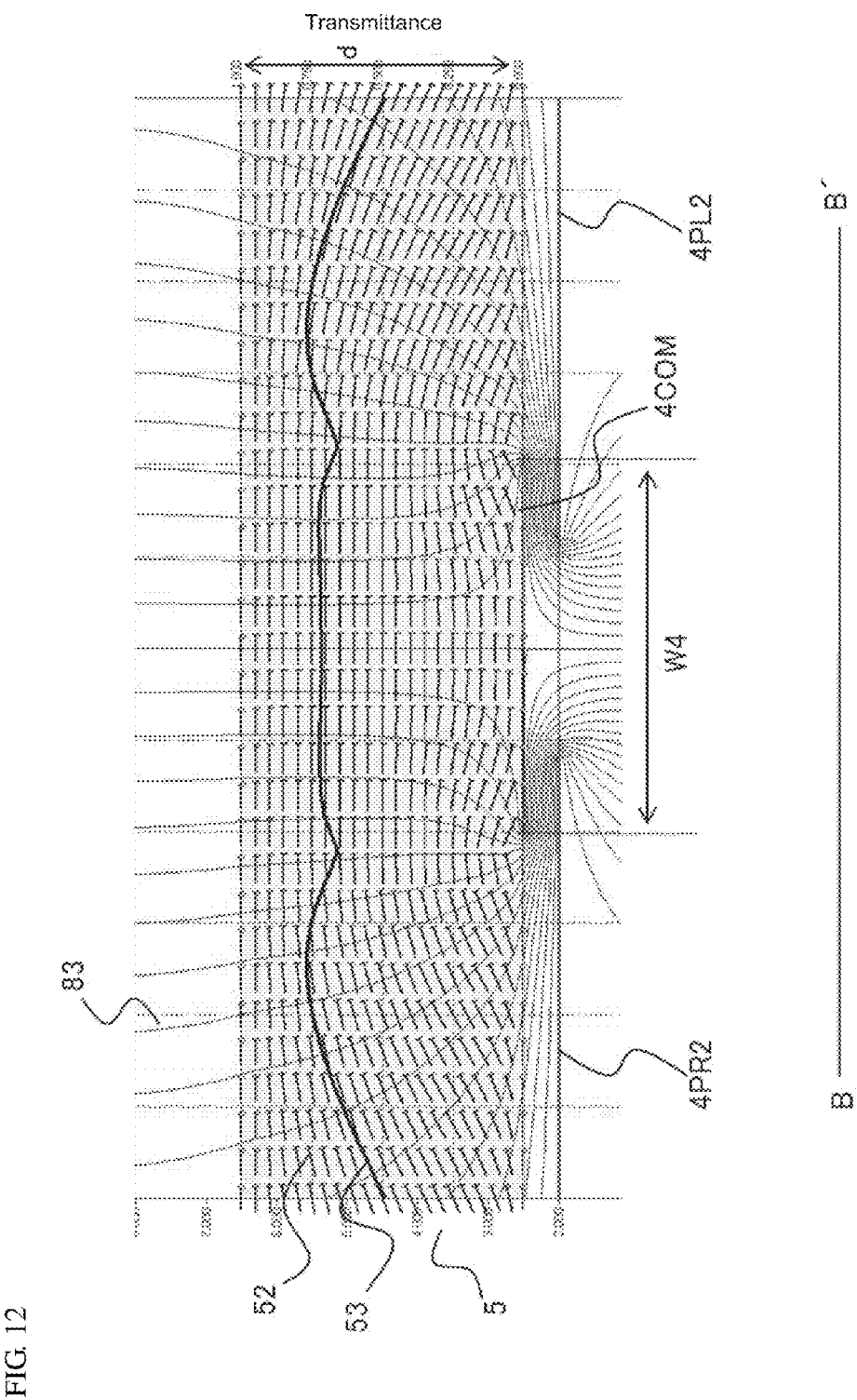
FIG. 12 is a simulation result that illustrates the orientation and transmittance distribution of the liquid crystal directors in the cross section taken along the line segment B-B'.
Figure 13:
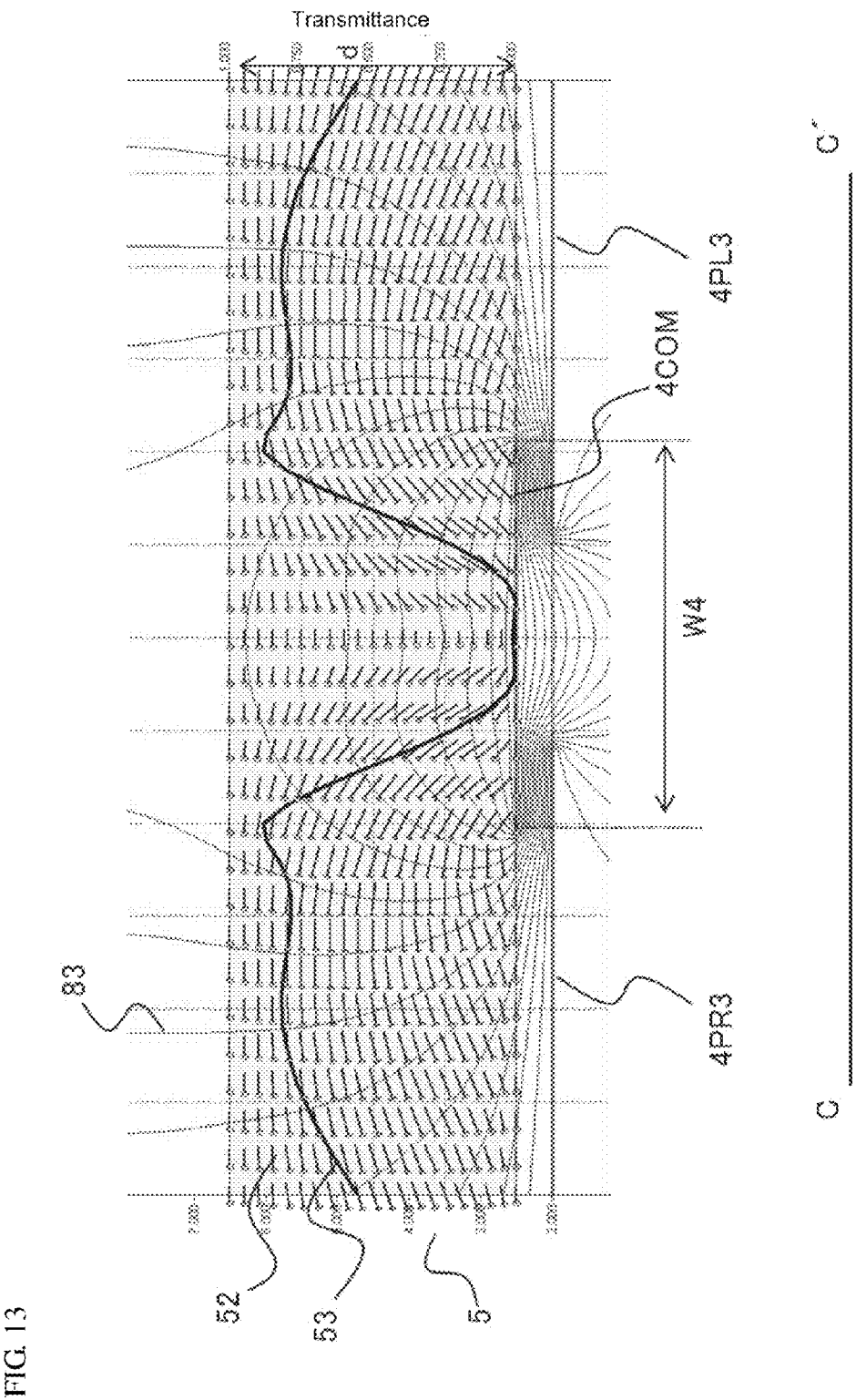
FIG. 13 is a simulation result that illustrates the orientation and transmittance distribution of the liquid crystal directors in the cross section taken along the line segment C-C'.
Figure 15:
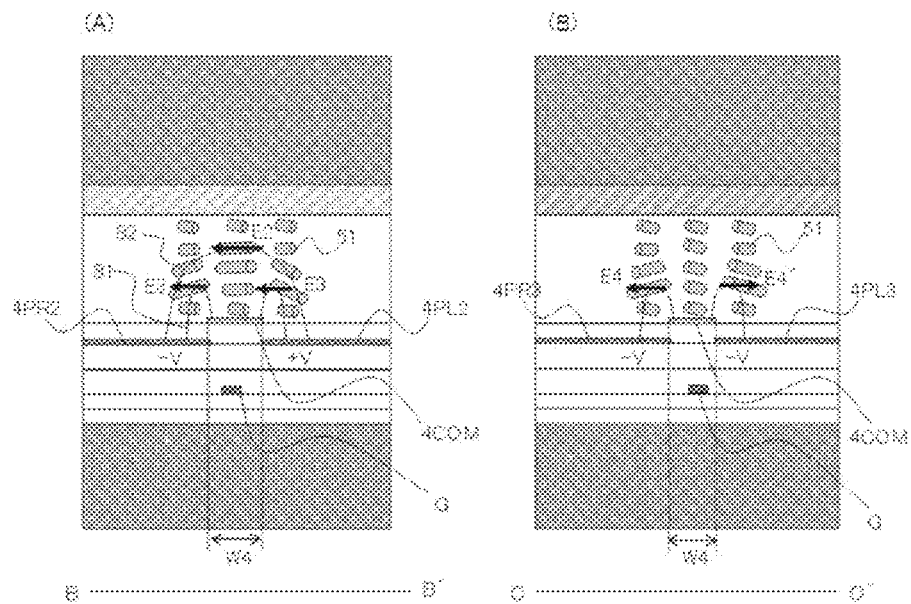
FIG. 15 is a schematic view that illustrates movement of liquid crystal molecules in the cross sections taken along the line segment B-B' and the line segment C-C' of the display panel carried by the image display apparatus according to the first embodiment of the present invention, in which (A) is a schematic view that illustrates the cross section of B-B' during display operation in the display panel according to the first embodiment; and (B) illustrates the cross section of C-C' during display operation in the display panel according to the first embodiment.

FIG. 12 is a simulation result that illustrates the orientation and transmittance distribution of the liquid crystal directors in the cross section taken along the line segment B-B', while FIG. 13 is a simulation result that illustrates the orientation and transmittance distribution of the liquid crystal directors in the cross section taken along the line segment C-C'. FIG. 15(A) is a schematic view that illustrates the cross section of B-B' during display operation in the display panel according to the first embodiment, while FIG. 15(B) illustrates the cross section of C-C' during display operation in the display panel according to the first embodiment.

As illustrated in FIG. 15(A), a fringe electric field is generated between the common electrode 4COM and the pixel electrode 4PR2 in the region of B-B' to form an electric field component E3 in the in-plane direction. In the same manner, a fringe electric field E3' is generated between the common electrode 4COM and the pixel electrodes 4PL2. Since the pixel electrode 4PR2 and the pixel electrode 4PL2 have different positive and negative polarities, a lateral electric field is generated between the pixel electrode 4PR2 and the pixel electrode 4PL2 to move liquid crystal molecules on the common electrode 4COM by the electric field component E2 in the in-plane direction. The lateral electric field component E2 has an electric field structure in which a lateral electric field crossing the upper layer of the common electrode 4COM is generated since the electrode width W2 of the common electrode 4COM is small and the dielectric anisotropy $\Delta\in$ of the liquid crystal molecules is high. The lateral electric field enables the liquid crystal molecules on the common electrode 4COM to be moved to greatly increase transmittance on the common electrode 4COM.

As illustrated in FIG. 16(B), the rotation direction of the liquid crystal molecules 51 moved by the electric field E2 is a counterclockwise direction, i.e., a positive rotation direction. The rotation direction is the reverse rotation direction with respect to the rotation direction of the liquid crystal molecules 51 taken along the line segment A-A'.

As illustrated in FIG. 15(B), fringe electric fields are generated between the common electrode 4COM and the pixel electrodes 4PR3 and 4PL3 in the region of C-C', and the liquid crystal molecules are moved by the electric field components E4 and E4' in the in-plane direction. The pixel electrode PR3 and the pixel electrode 4PL3 have the same polarity and an electric field structure in which any lateral electric field formed between the pixel electrodes 4PIX having the different polarities as illustrated in FIG. 15(A) is not generated.

In other words, the line segment C-C' and the line segment B-B' differ in that, as described above, the liquid crystal molecules located above the common electrode are hardly driven in the line segment C-C' whereas the liquid crystal molecules 51 on the common electrode are driven by the lateral electric field E2 in the line segment B-B'. In the line segment B-B', the fringe electric fields E3 and E3' are formed, and the liquid crystal molecules moved by the fringe electric fields E3 and E3' and the liquid crystal molecules 51 moved by the lateral electric field E2 are oriented to follow each other and are rotated in the same direction. Therefore, the liquid crystal molecules 51 moved in the reverse rotation direction in the line segment B-B' are sufficiently rotated and moved to improve transmittance. Further, the domain region is larger than the wiring line width of the gate line G and can function as a part of the display region in the subpixel.

In the vicinity of the common electrode 4COM disposed in a boundary between subpixels adjacent to each other in the Y-axis direction, liquid crystal molecules driven by a fringe electric field concentrate in the end of the common electrode to make an electric field structure in which a lateral or diagonal electric field is hardly generated in the upper layer of the central portion of the common electrode 4COM. In this case, the liquid crystal layer of the central portion of the common electrode 4COM remains substantially in the state of initial orientation, transmittance is decreased in this region, and the leak of light to the adjacent pixels can be therefore reduced. Since the subpixels adjacent to each other in the Y-axis direction particularly become the boundary of colors, deterioration in display due to mixing of colors can be reduced by reducing the influence of an electric field entering the adjacent pixels.

As illustrated in FIG. 11, the electrode width of the common electrode 4PIX disposed in the line segment E-E' in the Y-axis direction is W2 while the electrode width of the common electrode 4PIX disposed in the line segment D-D' is W3. The pixel electrode 4PL1 and the pixel electrode 4PL2 are pixel electrodes to which voltages with the same polarity are applied and are adjacent to each other in the Y-axis direction across the common electrode in the line segment E-E'. Further, the pixel electrode 4PL2 and the pixel electrode 4PL3 are pixel electrodes to which voltages different from each other are applied and are adjacent to each other in the Y-axis direction across the common electrode in the line segment D-D'. The width W3 of the common electrode is set to be more than W2. In other words, the width W2 of the common electrode 4COM disposed between the pixel electrodes with the same polarity is set to be less than the width W3 of the common electrode disposed between the pixel electrodes with the different polarities.

As illustrated in FIG. 11, the pixel electrodes adjacent to each other in the line segment D-D' have the polarities different from each other. Further, in the line segment D-D', the electrode width W3 of the common electrode 4COM is set to be more than the electrode width W2 and the thin film transistor and the data wiring lines are disposed in the lower layer of the common electrode width W3. As a result, an electric field leaked from the pixel transistor and the data lines can be shielded. Further, in the line segment D-D', the influence of the electric field on the pixels adjacent to each other can be mutually reduced by increasing the width of the common electrode 4COM even when the pixels adjacent to each other have different polarities. As described above, the liquid crystal molecules 51 are not moved but remain substantially in the state of initial orientation on the common electrode 4COM in the line segments D-D'. In contrast, the pixel electrodes adjacent to each other have the same polarity as each other in the line segment E-E'. The electrode width W2 of the common electrode 4COM in the line segment E-E' is set to be less than the common electrode width W3, and only the data wiring lines are disposed in the lower layer of the common electrode width W2. In the line segment E-E', the influence of an electric field on the pixels adjacent to each other can be reduced since the polarities of the pixels adjacent to each other are the same although the width of the common electrode 4COM is small. As a result, the liquid crystal molecules 51 are not moved but remain substantially in the state of initial orientation on the common electrode 4COM. Accordingly, by the structure of the common electrode 4COM in the line segment D-D' and the line segment E-E', an electric field leaked from the pixel thin film transistor or the data wiring lines can be shielded, the influence of the electric field on the pixels adjacent to each other in the Y-axis direction can be mutually reduced, and a higher opening ratio can be intended by an effective layout.

Attention is paid to the operation of the liquid crystal directors to give an explanation about it. The liquid crystal directors remain substantially in the state of initial orientation on the common electrode in the line segments E-E' and D-D' illustrated in FIG. 11, and transmittance on the common electrode remains low. Since the common electrode in the line segment E-E' is sandwiched between the picture electrodes having the same polarity, a fringe electric field is predominantly generated in the end of a slit disposed in the vicinity of the common electrode 4COM, and only a slight longitudinal electric field due to the fringe electric field is generated on the common electrode 4COM. Since the common electrode 4COM in the line segment D-D' is sandwiched between the picture electrodes having the different polarities, a slight lateral electric field is generated on the electrode but does not have such strength that the orientation of the liquid crystal directors 52 is transformed. As a result, the liquid crystal directors on the common electrode 4COM are not substantially moved from the initial orientation, and transmittance is low.

Further, the above-described structure can be represented as described below. The width in which the pixel electrodes and the common electrode overlap each other in the Y-axis direction is increased to obtain a storage capacity while an electric field generated from the pixel electrode of one subpixel is set so as not to influence the other adjacent subpixel between the pixel electrodes having the different polarities. Further, the width in which the pixel electrodes and the common electrode overlap each other in the Y-axis direction is reduced to intend a higher opening ratio between the pixel electrodes having the same polarity.

In the line segment B-B' and the line segment C-C', the common electrode 4COM is disposed on the upper layer of the G lines, and electric fields from the G lines can be shielded by the common electrode 4COM and the pixel electrodes 4PIX.

(Explanation of Electric Field Distribution in X-Y Plane)

Figure 17:
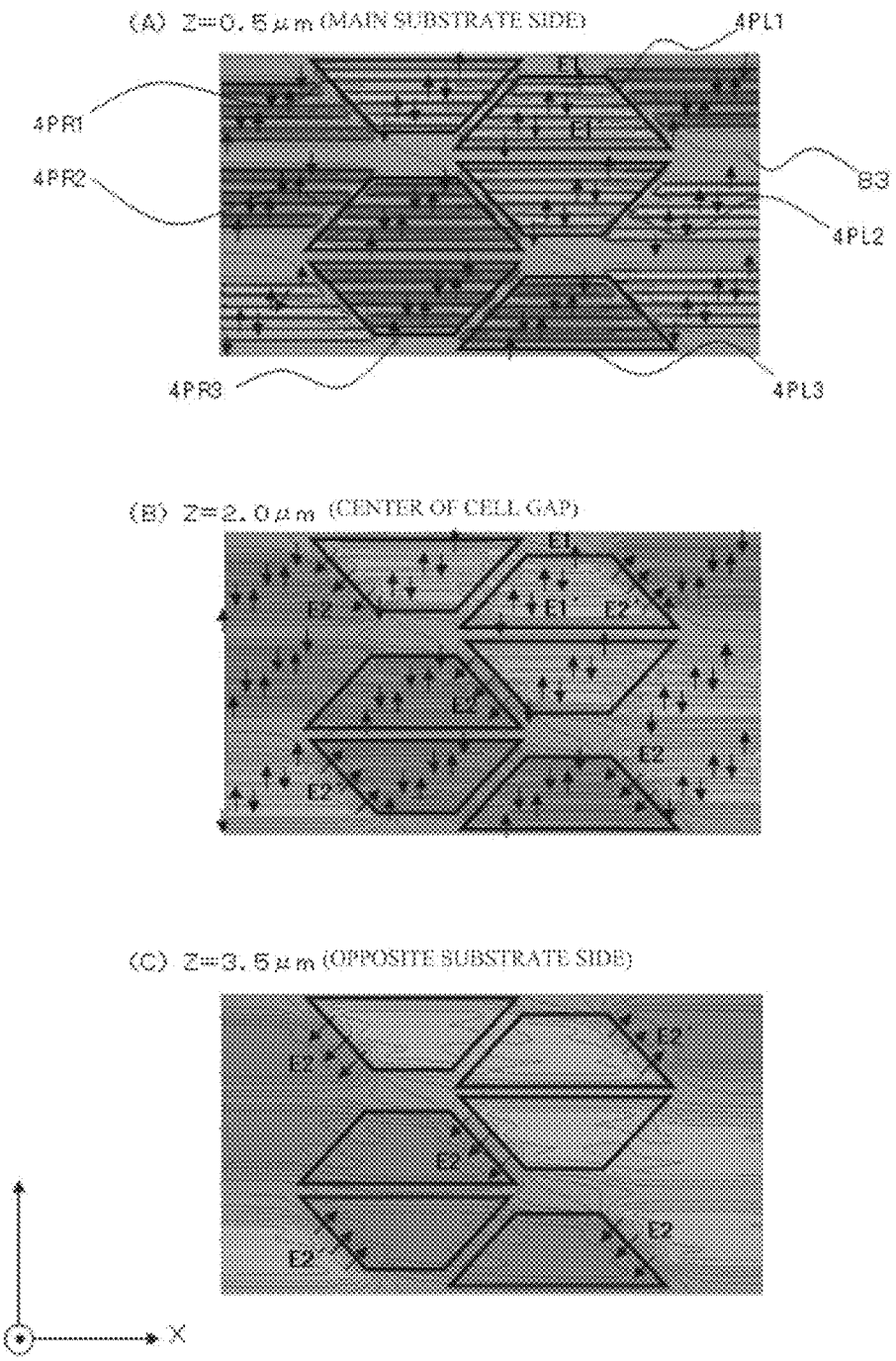
FIG. 17 is a simulation result that illustrates an electric field distribution in the X-Y plane in the liquid crystal layer away from a substrate interface, in which each plan view illustrates the equipotential distribution in the X-Y plane in (A) Z=0.5 μm, (B) Z=2.0 μm, or (C) Z=3.5 μm.

FIG. 17 illustrates an electric field distribution in the X-Y plane at a predetermined distance from the interface of the main substrate 2a in the Z-axis direction. The interface of the opposite substrate 2b has Z=4.0 µm assuming that the interface of the main substrate 2a has Z=0 µm. Each plan view illustrates an equipotential distribution in the X-Y plane in (A) Z=0.5 µm, (B) Z=2.0 µm, or (C) Z=3.5 µm. The interfaces from the side closer to the main substrate 2a to the side closer to the opposite substrate 2b are illustrated in the order of (A) to (C) and the plan view in (B) illustrates a position in the center of the interfaces of the main substrate 2a and the opposite substrate 2b. In the drawing, a dark-colored portion indicates a negative polarity while a light-colored portion indicates a positive polarity.

As illustrates in FIG. 17, when attention is paid to an electric field component in the X-Y plane, a fringe electric field 81 in a subpixel is highest in the region closer to the interface of the side of the main substrate 2a and is decreased with increasing a distance from the interface of the side closer to the opposite substrate 2b, i.e., the main substrate side. Further, a lateral electric field E2 between subpixels adjacent to each other in the X direction is lower in the side of the main substrate 2a and is higher in the side closer to the opposite substrate 2b from the center of the cell gap.

The electric field distribution in the X-Y plane in the liquid crystal layer illustrated in FIG. 17 indicates that the lateral electric field component E1 due to the fringe electric field formed between the common electrode 4COM and the pixel electrodes 4PIX is high in the side closer to the main substrate 2a while the lateral electric field E2 due to the pixel electrodes in the same layer is high in the side closer to the opposite substrate 2b.

The first reason why the orientation of the liquid crystal molecules on the common electrode 4COM in the line segment B-B' is transformed to improve the transmittance of the meandering wiring line section is in that the strong lateral electric field layer is formed on the upper layer of the common electrode 4COM. The origin of the electric field layer is not the fringe electric field generated between the common electrode 4COM and the pixel electrodes 4PIX but is the lateral electric field induced by the potential difference between the pixel electrodes with the different polarities disposed adjacently in the same plane. In other words, the lateral electric field is an electric field generated between the electrodes in the same plane and is composed of lateral electric field components substantially parallel to the substrate surface, unlike the fringe electric field. In the fringe electric field composed of electric field components in a diagonal direction, the liquid crystal molecules slightly stand up in the direction of the normal to the substrate. In contrast, in the lateral electric field generated between the electrodes in the same plane, torque parallel to the substrate surface can be made to efficiently act on the liquid crystal molecules 51, which do not stand up in the direction of the normal to the substrate. Further, the lateral electric field is a potential difference generated between the positive electrode and the negative electrode and is therefore a sufficiently strong electric field in comparison with the fringe electric field generated in a slit electrode portion in the line segment A-A'.

Such a lateral electric field is substantially composed only of a lateral electric field, unlike the fringe electric field including the electric field components in the diagonal direction, and is in a liquid crystal orientation state that is substantially similar to an IPS mode.

The second reason is in that the above-mentioned lateral electric field component E2 is in a direction generally parallel to that of the lateral electric field component E3 or E3' of the fringe electric field in the line segment B-B', the liquid crystal molecules 51 moved by the lateral electric field component E2 and the liquid crystal molecules 51 moved by the fringe electric field E3 or E3' are rotated in a common direction, and the orientation thereof is transformed while following each other. As illustrated in FIG. 17, the lateral electric field component E3 or E3' of the fringe electric field is strong in the side closer to the main substrate 2a, and the lateral electric field E2 and the lateral electric field component E3 or E3' of the fringe electric field mutually coexist in the same plane in the central portion of the cell gap. In other words, it is indicated that the orientation of the liquid crystal molecules 51 moved by the lateral electric field E2 and the liquid crystal molecules 51 moved by the fringe electric field in the side closer to the main substrate side 2a is easily transformed while following each other in the same direction. The liquid crystal molecules 51 of which the orientation is transformed in such a manner are in an energetically stable orientation state and form a domain region that is larger than the electrode width. The domain region is not unstably transformed by static electricity or stress applied to the display panel but can provide high reliability.

The liquid crystal molecules 51 are driven by a very strong lateral electric field which is generated by the potential difference between the positive electrode and the negative electrode. The strength of the lateral electric field can be adjusted by the width W4 of the common electrode disposed between the pixel electrodes. Such torque that the liquid crystal molecules 51 are sufficiently moved is generated by the strong lateral electric field and the dielectric anisotropy $\Delta\in$ of the liquid crystal molecules 51. Further, the common electrode has the effect of shielding an electric field leaked from the gate wiring lines and is capable of stably forming the lateral electric field E2.

The torque acting on the liquid crystal molecules 51 depends mainly on the dielectric anisotropy $\Delta n$ of the liquid crystal molecules 51, the direction and strength of the electric field component E in the in-plane direction, and the initial orientation direction $\theta$ of the liquid crystal molecules 51. The direction of the electric field components between the pixel electrodes in the oblique side section of the trapezoid is set by the tilt angles $\phi$ of the meandering direction A and the meandering direction B. A voltage-transmittance characteristic in the line segment B-B' can be appropriately adjusted by changing the tilt angles $\phi$ of the meandering direction A and the meandering direction B.

Since free energy during twist transformation can be decreased by making the twist elastic constant K22 of the liquid crystal molecules lower than the bend elastic constant K33 as in the case of the positive liquid crystal molecules 51 according to the present embodiment, the liquid crystal molecules on the electrodes follow the liquid crystal molecules between the electrodes and are more easily twisted and transformed. As a result, the transmittance of the liquid crystal layer on the electrodes can be more efficiently improved.

In contrast, the state of the orientation of the liquid crystals on the electrodes remains initial orientation in the vicinity of the interface of the opposite substrate 2b similarly to the case of the orientation between the electrodes but the orientation in the Y-axis direction is achieved similarly to the case of the orientation between the electrodes with increasing a distance from the opposite substrate 2b.

Figure 18:
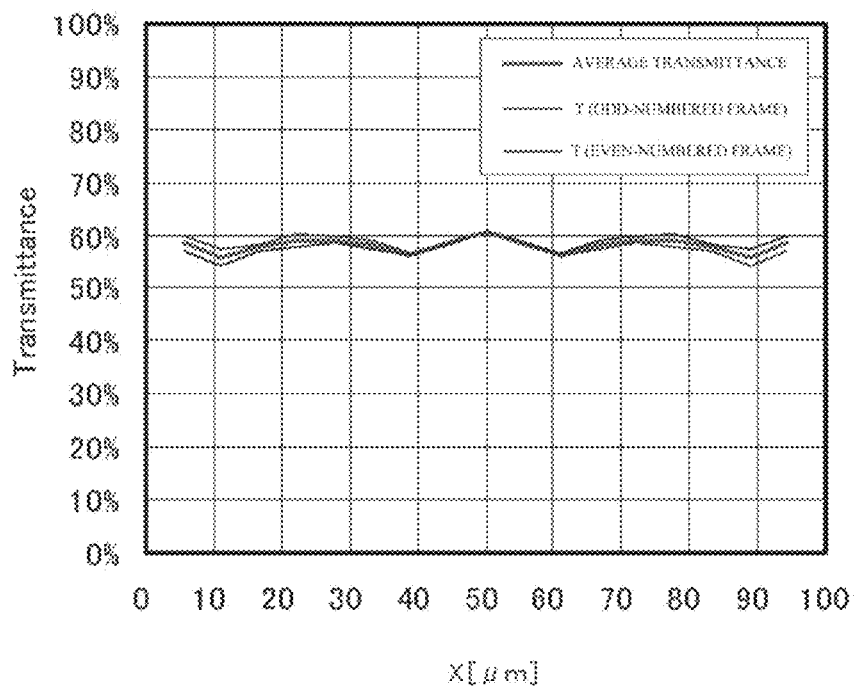
FIG. 18 is a simulation result that indicates transmittance fluctuations in the X direction with respect to an average transmittance in the Y direction.

FIG. 18 is a distribution diagram that indicates transmittance fluctuations in the X-direction with respect an average transmittance in the Y-axis direction.

An average transmittance in the Y-axis direction in a domain region in a cross section taken along the line segment B-B' substantially becomes equal to an average transmittance in the first optical principal axis 33 and the second optical principal axis 34 in the Y-axis direction by being averaged with an average transmittance in the Y-axis direction in a domain region in a cross section taken along the line segment C-C'. By making the domain region in the cross section taken along the line segment B-B' and the domain region in the cross section taken along the line segment C-C' compensate for each other in such a manner, the transmittance of the image separation boundary can be improved to reduce 3D moire to the extent that is subjectively permitted.

Figure 19:
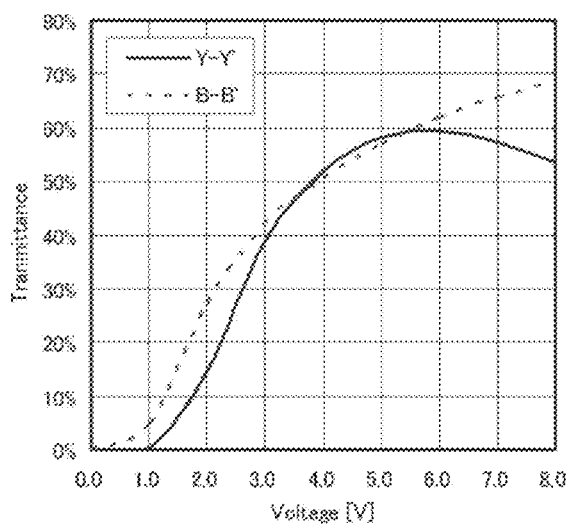
FIG. 19 is a simulation result that indicates the voltage characteristic of an average transmittance in a cross section taken along the line segment Y-Y' or a cross section taken along the line segment B-B'.

FIG. 19 is a simulation result that indicates the voltage-transmittance characteristic of an average transmittance in each line segment direction in a domain region in a cross section taken along the line segment Y-Y' or a cross section taken along the line segment B-B'. In the line segment Y-Y', a transmittance distribution in the X-Y plane was calculated at a certain voltage, and the average transmittance was determined by integrating transmittance at each Y-axis position in the range of a certain Y-axis distance at a certain X position and dividing the integrated transmittance by the range of the Y-axis distance, as in the case of the above-mentioned average transmittance in the Y-axis direction. The voltage-transmittance characteristic can be determined by calculating the average transmittance at each voltage. Further, in the line segment B-B', the same calculation was conducted in the domain region produced in the central portion of the line segment B-B' to calculate the voltage-transmittance characteristic.

Rising at a low voltage in the domain region in the line segment Y-Y' is lower than that in the domain region in the line segment B-B', and the voltage-transmittance characteristic in the line segment Y-Y' indicates the maximum peak at around 5.5 [V]. In contrast, the transmittance in the line segment B-B' sharply rises at lower voltages and is monotonically increased. The voltage-transmittance characteristics in the domain regions in the line segment Y-Y' and the line segment B-B' cross each other at 3.6 V and 5.5 V and each have similar values in the voltage range (3.6 V to 5.5 V) although having different characteristics at lower voltages.

Figure 20:
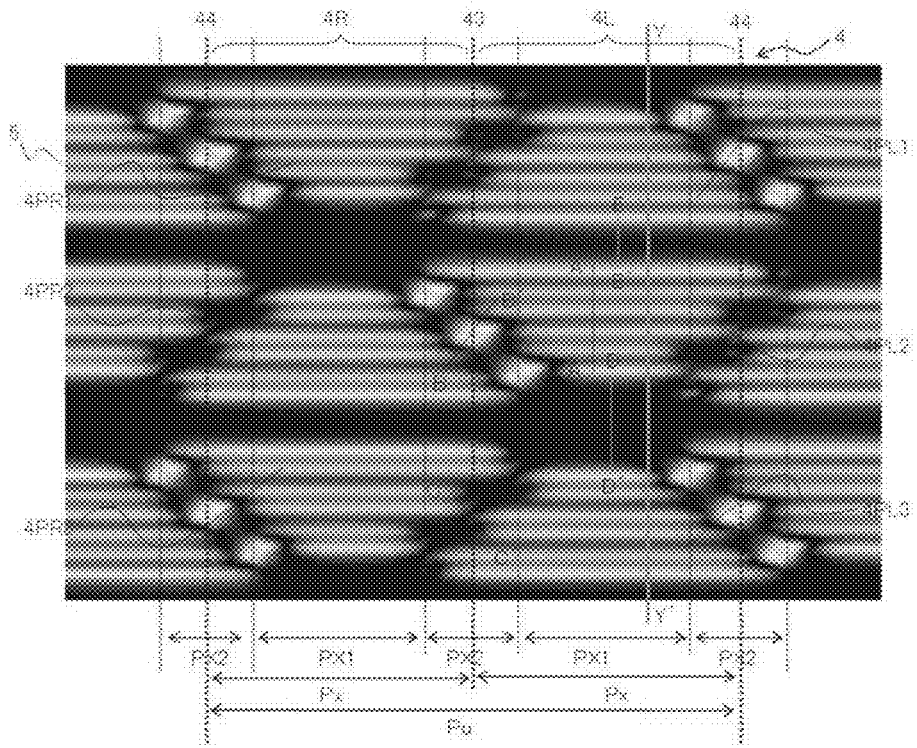
FIG. 20 is an example of a transmittance distribution in the X-Y plane in the case of applying a half-tone potential to pixel electrodes.

FIG. 20 is an example of a transmittance distribution diagram in the X-Y plane in the case of applying a half-tone potential to pixel electrodes. The example is a calculation result in the case of setting a voltage Vp=±2.5 [V] of the pixel electrodes. It is found that the transmittances in both domain regions in the line segment Y-Y' and the line segment B-B' are high in the transmittance distribution diagram in the X-Y plane illustrated in FIG. 10 whereas the transmittance in the domain region in the line segment B-B' is locally higher than that in the domain region in the line segment A-A' in the transmittance distribution diagram in the X-Y plane illustrated in FIG. 20. A transmittance difference between the domain region in the line segment B-B' and the domain region in the line segment C-C' is large at intermediate voltages. Therefore, the ratio of the transmittance in the domain region in the line segment B-B' to the average transmittance in the Y-axis direction in each boundary between subpixels adjacent to each other in the X direction is high.

As described above, the experimental results and the calculation results revealed that, since the pixel electrodes 4PIX and the common electrode 4COM are transparent electrodes, light is passed through the regions other than the slit openings of the common electrode, and a transmittance distribution due to each domain formation is further obtained in each slit end. Therefore, a 3D crosstalk at the time of passing light through the display panel 2 was found to be unable to be accurately represented by the non-overlapping regions X1 or the overlapping regions X2, specified only by the size of each opening, or the non-overlapping regions SX1 or the overlapping regions SX2 of the slit openings, as illustrated in FIG. 3 and FIG. 4. Accordingly, the relationship between the pixel structure and stereoptical characteristics of the display panel 2 can be definitely represented by specifying the non-overlapping regions PX1 and the overlapping regions PX2 in the liquid crystal layer transmittance distribution as illustrated in FIG. 10.

When the transmittance distribution in the X-Y plane is illustrated by contrast as illustrated in FIG. 10, a variation in contrast greatly fluctuates in the vicinity of the oblique sides of the trapezoidal pixels and is divided into several domain regions. The dark-colored (shady-colored) boundaries sandwiched between the light-colored (bright-colored) regions are the boundaries of the domain regions and the transmittance distribution of the liquid crystal layer is greatly changed in the vicinities of the boundaries. Assuming that a region of which the transmittance is relatively higher than the average transmittance in the whole X-Y plane in the light-colored regions is defined as a high-transmittance domain region, a high-transmittance domain region 54a in which the liquid crystal layer is oriented by a fringe electric field due to the pixel electrode of the pixel 4R for the right eye and the common electrode, a high-transmittance domain region 54b in which the liquid crystal layer is oriented by a fringe electric field due to the pixel electrode of the pixel 4L for the left eye and the common electrode, and a high-transmittance domain region 54c in which the liquid crystal layer is oriented by a lateral electric field generated between the pixel electrodes of the right and left pixels are mainly present in the display unit 4U. Further, the high-transmittance domain region 54a' and the high-transmittance domain region 54b' are present in the display unit 4U'.

Each high-transmittance domain region is a region in which liquid crystal directors oriented in substantially the same rotation direction are continuously distributed. Therefore, in a boundary between domain regions in which liquid crystal directors are oriented in rotation directions different from each other, the directions of the liquid crystal directors are discontinuous and the boundary is a dark region.

As an example, when an average transmittance obtained by averaging transmittances for several pixels in the whole X-Y plane is 50%, one of the regions of which the transmittances are continuously higher than 50% is a high-transmittance domain region. In the high-transmittance domain regions, a region in which the two regions of the high-transmittance domain region 54a and the high-transmittance domain region 54b overlap each other in the Y-axis direction is a transmittance overlapping region PX2 while a region in which the two regions do not overlap each other in the Y-axis direction is a transmittance non-overlapping region PX1. The high-transmittance domain region 54c is disposed between the two high-transmittance domain regions 54a and 54b depending on an electric field structure in each display unit. Further, similarly, the transmittance overlapping region PX2 is disposed on the region in which the two regions of the high-transmittance domain region 54a' and the high-transmittance domain region 54b' overlap each other in the Y-axis direction, and the high-transmittance domain region of the liquid crystal molecules oriented by a lateral electric field generated between the pixel electrodes of the right and left pixels is not present between the two high-transmittance domain regions 54a' and 54b'.

As a result, as for the pitch Px of a subpixel in the X axis direction, the following relational expression (4) is established.

[Expression 4]

$$Px=PX1+PX2 \qquad (4)$$

The electric field distribution of FIG. 17 indicates the electric field structure in the display unit formed by the electrode structure illustrated in FIG. 3 and the polarity distribution illustrated in FIG. 8, and the liquid crystal molecules of which the orientation is controlled by the electric field structure form each domain region in each display unit illustrated in FIG. 10. Furthermore, each domain region is disposed over a boundary line 43 between eyepoint pixels or a boundary line 44 between display units when looking an image plane in the face. The transmittance distribution of the liquid crystal layer of which the orientation is controlled by the electric field structure in the opening non-overlapping region X1 and the slit non-overlapping region SX1 corresponds to the transmittance non-overlapping region PX1, while the transmittance distribution of the liquid crystal layer of which the orientation is controlled by the electric field structure in the opening overlapping region X2 and the slit overlapping region SX2 corresponds to the transmittance non-overlapping region PX1. Accordingly, the opening non-overlapping region X1, the slit overlapping region SX1, the transmittance overlapping region PX1, the opening non-overlapping region X2, the slit non-overlapping region SX2, and the transmittance non-overlapping region PX2 are regions of which the phases are separated from each other, and the fluctuation of a longitudinal transmittance in the X-direction in the display unit can be suppressed by controlling each region.

Conditions on which the lenticular lens 3 functions as image distribution means are described in detail. In the present embodiment, the image distribution means preferably distributes light, emitted from each pixel along the first direction of arranging the pixels for the left eye and the pixels for the right eye, i.e., the X axis direction, in directions different from each other. First, the case of exerting an image distribution effect to the maximum is described with reference to FIG. 21.

A distance between the principal point, i.e., the vertex, of the lenticular lens 3 and a pixel is H, the refractive index of the lenticular lens 3 is n, and a lens pitch is L. The pitch of a subpixel corresponding to one eyepoint in an image separation direction is P. In other words, in the present embodiment, the pitch Px of each one of the pixel 4L for the left eye and the pixel 4R for the right eye in the X-axis direction is P while the arrangement pitch Pu of the display unit 4U in the image separation direction is 2P.

Further, a distance between the lenticular lens 3 and an observer is an optimal observation distance OD, while each cycle of the expansion projection images of the pixels at the distance OD, i.e., each cycle of the widths of the projection images of the pixels 4L for the left eye and the pixels 4R for the right eye on a virtual plane that is separated from the lens at the distance OD and is parallel to the lens is e. Furthermore, a distance between the center of a cylindrical lens 3a located at the center of the lenticular lens 3 and the center of a cylindrical lens 3a located in the end of the lenticular lens 3 in the X axis direction is WL, while a distance between the center of the display pixels including the pixels 4L for the left eye and the pixels 4R for the right eye located at the center of the display panel 2 and the center of the display pixel located at the end of the display panel 2 in the X-axis direction is WP. Furthermore, the incidence and output angles of light in the cylindrical lens 3a located at the center of the lenticular lens 3 are α and β, respectively, while the incidence and output angles of light in the cylindrical lens 3a located at the end of the lenticular lens 3 in the X-axis direction are γ and β, respectively. Furthermore, the difference between the distance WL and the distance WP is C, and the number of subpixels contained in the region of the distance WP is 2m.

Since the arrangement pitch L of the cylindrical lenses 3a and the arrangement pitch P of the subpixels are related to each other, one is determined in accordance with the other; however, since a lenticular lens is typically often designed in accordance with a display panel, the arrangement pitch P of the subpixels is used as a constant. Further, a refractive index n is determined by selecting the material of the lenticular lens 3. In contrast, the observation distance OD between the lens and the observer and the cycle e of the pixel expansion projection images at the observation distance OD are set at desired values. The distance H between the vertex of the lens and the pixel and the lens pitch L are determined using the values. The following expressions (5) to (13) are established from Snell's law and geometric relationships.

[Expression 5]
$$n \times \sin\alpha = \sin\beta \quad (5)$$

[Expression 6]
$$OD \times \tan\beta = e = eL = eR \quad (6)$$

[Expression 7]
$$H \times \tan\alpha = P \quad (7)$$

[Expression 8]
$$n \times \sin\gamma = \sin\delta \quad (8)$$

[Expression 9]
$$H \times \tan\gamma = C \quad (9)$$

[Expression 10]
$$OD \times \tan\delta = WL \quad (10)$$

[Expression 11]
$$WP - WL = C \quad (11)$$

[Expression 12]
$$WP = Pu \times m = 2 \times m \times P \quad (12)$$

[Expression 13]
$$WL = m \times L \quad (13)$$

First, there is examined the case of exerting the image distribution effect to the maximum as described above. This is the case in which the distance H between the vertex of the lenticular lens 3 and the pixel is set to be equal to the focal distance f of the lenticular lens. As a result, the following expression (14) is established. Assuming that the curvature radius of the lens is r, the curvature radius r is determined by the following expression (15).

[Expression 14]
$$f = H \quad (14)$$

[Expression 15]
$$r = H \times (n-1)/n \quad (15)$$

The above-described parameters are summarized as follows: the arrangement pitch P of the pixel is a value determined by the display panel; and the observation distance OD and the cycle e of the pixel enlarged projection images are values determined by the setting of the display apparatus. The refractive index n is determined by quality of material such as the lens. The arrangement pitch L of the lens and the distance H between the lens and the pixel, derived from them, are parameters for determining a position at which light from each pixel is projected on an observation surface. The parameter for changing the image distribution effect is the curvature radius r of the lens. In other words, when the distance H between the lens and the pixel is fixed, the images of the right and left pixels are blurred and are not definitely separated by changing the curvature radius of the lens from its ideal state. In other words, a curvature radius range in which the separation is effective is preferably determined.

First, the minimum value of the curvature radius range is calculated in a range in which the separation action of the lens is present. As illustrated in FIG. 22(A), similitude relations between a triangle of which the base is a lens pitch L and the height is a focal distance f and a triangle of which the base is a subpixel pitch P and the height is H-f are preferably established to determine the minimum value of the curvature radius range in the range in which the separation action is present. As a result, the following expression (16) is established and the minimum value fmin of the focal distance can be determined.

[Expression 16]
$$fmin = H \times L/(L+P) \quad (16)$$

Then, the curvature radius is calculated from the focal distance. Using the expression (15), the minimum value rmin of the curvature radius can be determined as in the following expression (17):

[Expression 17]
$$rmin = H \times L \times (n-1)/(L+P)/n \quad (17)$$

Then, the maximum value is calculated. As illustrated in FIG. 22(B), similitude relations between a triangle of which the base is a lens pitch L and the height is a focal distance f and a triangle of which the base is a subpixel pitch P and the height is f-H are preferably established to determine the maximum value in the range in which the separation action is present.

As a result, the following expression (18) is established and the maximum value fmax of the focal distance can be determined.

[Expression 18]

$$fmax = H \times L/(L-P) \quad (18)$$

Then, the curvature radius is calculated from the focal distance. Using the expression (15), the minimum value rmax of the curvature radius can be determined as in the following expression (20):

[Expression 19]

$$rmax = H \times L \times (n-1)/(L-P)/n \quad (19)$$

The above description is summarized as follows: the curvature radius of the lens in the range of the following expression (20) represented by the expression (17) and the expression (19) is needed for the lens exerting the image distribution effect.

[Expression 20]

$$H \times L \times (n-1)/(L+P)/n \leq r \leq H \times L \times (n-1)/(L-P)/n \quad (20)$$

In the above description, the two-view three-dimensional image display apparatus including the pixels for the left eye and the pixels for the right eye is described, but the present invention is not limited thereto. For example, the same can apply to a display apparatus in an N-view mode. In other words, in the N-view mode, a relationship of Pu=N×P is established in the display unit pitch Pu and the subpixel pitch P. In this case, in the above-described definition of the distance WP, the number of pixels contained in the region of the distance WP is preferably changed from 2m to N×m.

In the structure of the present embodiment, a completely constant longitudinal transmittance without depending on a position is preferred for realizing higher image quality. However, the accuracy of processing a light shielding section precludes a completely constant longitudinal opening ratio, particularly in the vicinity of the vertex in each oblique side section of a trapezoidal opening. Thus, in the present embodiment, the influence caused by the accuracy of processing the light shielding section can be reduced to enable higher image quality by moving and placing the focal point of the lens from the pixel surface as illustrated in FIG. 22. Hereinafter, the technology of setting a region to be blurred by moving and placing the focus of the lens from the pixel surface as described above to achieve higher image quality is referred to as "defocusing effect". Further, an effective region which can be blurred, i.e., a defocusing width, is referred to as "spot diameter SP". In the present embodiment, the defocusing width which can be effectively blurred in the image separation direction, i.e., the X-axis direction is a spot diameter SP. The size of the spot diameter is determined depending on the distance from the position of the focal point of the lens and can be therefore set by adjusting the thickness of the lenticular lens sheet or the polarizing plate 11 of the opposite substrate 2a.

The lenticular lens sheet 3 emits light emitted from the pixel displaying an image for the right eye to the right eye of an observer and emits light emitted from the pixel displaying an image for the left eye to the left eye of the observer to form a region allowing three-dimensional vision by the observer. A region allowing three-dimensional vision when the middle point between the right and left eyes of the observer is located in the predetermined region is a three-dimensional visible region, and a distance between a position with the longest length of lengths along the X-axis direction in the three-dimensional visible region and optical means is an optimal observation distance OD.

A subpixel pitch in the X-axis direction is P, and a distance between each cylindrical lens 3a and the display panel 2 (hereinafter referred to as a lens-to-pixel distance) is H. The observation surface is set at the position separated from the lens surface at the observation distance OD, the expansion projection width of one eyepoint pixel is e, and a spacing between both eyes of the observer is T.

The image display apparatus of the present embodiment includes regions in which mutual transmission sections are mixed in the Y-axis direction between subpixels adjacent to each other in the X-axis direction, in which the widths of the regions in the X-axis direction, i.e., the expansion projection widths corresponding the transmittance overlapping regions PK2, are TX2 and TX2'. TX2 is in the region in which the mutual transmission sections are mixed between the subpixels adjacent to each other in the display unit 4U, while TX2' is in the region in which the mutual transmission sections are mixed between display units 4U adjacent to each other in the X direction.

Since both eyes can observe a three-dimensional image when corresponding to the display units 4U, it is desirable to dispose TX2 in the spacing T between both eyes when three-dimensional display is observed. Further, the width, in the X-axis direction, of a region in which the transmission sections between the subpixels are not mixed in the Y-axis direction, i.e., an expansion projection width corresponding to a transmittance non-overlapping region PX1, is TX1. It is desirable to dispose each of the left eye and the right eye in the range of TX1 when the three-dimensional display is observed.

The average value of the spacings between both eyes of adult men is 65 mm with a standard deviation of ±3.7 mm, while the average of the spacings between both eyes of adult women is 62 mm with a standard deviation of ±3.6 mm (Neil A. Dodgson, "Variation and extrema of human interpupillary distance", Proc. SPIE Vol. 5291). Accordingly, when the image display apparatus according to the present embodiment is designed for general adults, it is appropriate to set a value of a spacing T between both eyes in the range of 62 to 65 mm, at 63 mm as an example. Further, the spacings T between both eyes of children of which the ages are less than those of adults are distributed in the range of 45 mm to 65 mm according to their ages ("Journal of Three Dimensional Images", Vol. 24, No. 4, 2010/December, Forum for Advancement of Stereoscopic Three Dimensional Image Technology and Arts, p. 12, or 3DC Safety Guidelines, Revised on Apr. 20, 2010 Conforms with international guidelines "ISO IWA3"). Therefore, it is desirable to set the value of the spacing T between both eyes in the range of 45 mm to 65 mm when the image display apparatus according to the present embodiment is applied to humans of which the ages are less than those of adults and to the adults.

FIG. 23 is a schematic view that illustrates the distribution of the polarities of an image observed by each of the right and left eyes in the image display apparatus according to the first embodiment of the present invention. FIG. 23(A) illustrates the distribution of polarities output to a pixel for the right eye in a certain frame timing, while FIG. 23(B) illustrates the distribution of polarities output to a pixel for the left eye in the same frame timing as that in FIG. 23(A). The polarity distribution illustrated in FIG. 8 is distributed in mutual different directions by the image separation means as described above and becomes in a reversion mode, which is substantially equivalent to 2H1V reversion driving, with respect to the right and left eyes. Therefore, in the image display apparatus according to the present embodiment, the effect of 2H1V reversion can be obtained to reduce the feeling of flickering by an observer.

A pixel structure and a lens action in accordance with the present embodiment are described in detail.

Figure 24:
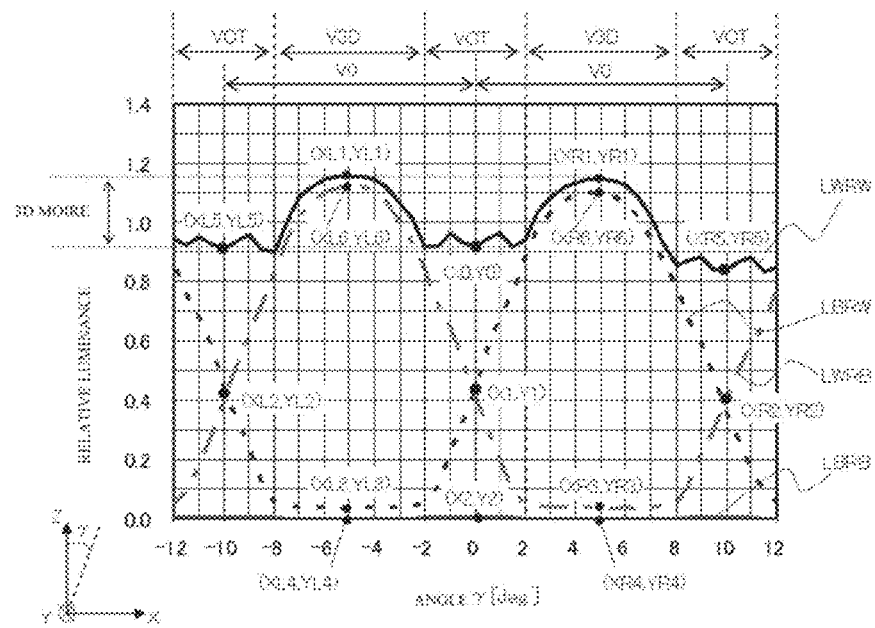
FIG. 24 is an example of a luminance distribution in the image display apparatus according to the first embodiment of the present invention.

First, the definition of 3D moire herein is described with reference to the graphs. FIG. 24 is a graph that illustrates a luminance distribution of the display apparatus according to the present invention. The horizontal axis indicates an angle γ indicating the image separation direction in the X-Z plane and indicates a direction perpendicular to the display surface, i.e., an angular direction in the X-Z plane assuming that the +Z-axis direction is 0 degree (see the bottom left-hand corner of FIG. 24). The luminance in the vertical axis indicates a relative luminance distribution assuming that an average value in the luminance distribution in the above-mentioned angular direction is 1. A certain point in the graph is indicated by the combination of an X-Y coordinate (X, Y) indicating the point, an angle, and a relative luminance.

The positive side of the angular direction is a luminance distribution corresponding to images output to a right eye side, while the negative side is a luminance distribution corresponding to images output to a left eye side. The dotted line and the alternate long and short dash line indicate luminance distributions in the case of outputting an image only to one pixel of the pixel 4R for the right eye and the pixel 4L for the left eye while the thick line indicates a luminance distribution in the case of displaying images on both pixels.

The luminance distribution measured in the display state in which the pixel for the left eye is in black view and the pixel for the right eye is in white view is LBRW, while the luminance distribution measured in the display state in which the pixel for the left eye is in white view and the pixel for the right eye is in black view is LWRB. Further, the luminance distribution measured in the display state in which the pixel for the left eye and the pixel for the right eye are in white view is LWRW, while the luminance distribution measured in the display state in which the pixel for the left eye and the pixel for the right eye are in black view is LBRB. The total sum of the luminance distributions LBRW and LWRB depending on each eyepoint indicated by the dotted line is generally equal to the luminance distribution LWRW of the thick line. In optical measurement of the graph illustrated in FIG. 24, incident light is generated using a flat surface source having a luminance distribution which is generally isotropic with respect to the angular direction and is uniform and, therefore, the distribution of relative luminances in a measured angle range can be substantially replaced with the transmittance distribution of the angular direction.

The pixels according to the present embodiment are designed so that the longitudinal transmittances in the image separation direction are generally constant, but the longitudinal transmittances do not become completely constant due to the accuracy of processing in a step including a TFT production process and a panel production process, and a luminance fluctuation may locally occur with respect to an observer position in the X direction. In particular, when overlapping of the main substrate 2a and the opposite substrate 2b greatly deviates in the Y-axis direction, a luminance fluctuation easily occurs under the influence of the light shielding section. Further, a luminance fluctuation occurring near (X0, Y0) occurs due to the transmittance of the liquid crystal layer in the overlapping region. The luminance fluctuation ΔYm is called 3D moire and is herein defined in the expressions (21) and (22) as follows:

[Expression 21]
$$Ym = (YL1 + YR1)/2 \quad (21)$$

[Expression 22]
$$\Delta Ym = (Ym - Y0)/Ym \quad (22)$$

Unless otherwise noted herein, ΔYm described above is applied as an evaluation index for 3D moire. However, since the subjective appearance of the 3D moire ΔYm depends on a fluctuation amount in the angular direction, the following index ΔYm/ΔXm is applied in consideration of the fluctuation amount of the 3D moire ΔYm with respect to the angular direction (γ-axis direction in FIG. 24).

[Expression 23]
$$\Delta Ym/\Delta Xm = \Delta Ym/(XR1 - XL1) \quad (23)$$

Figure 21:
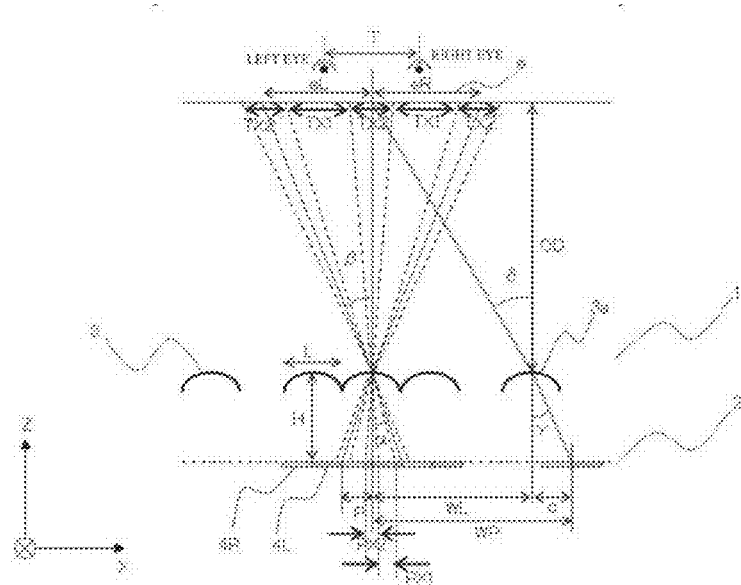
FIG. 21 is a cross-sectional view that indicates an optical model in the case of using a lenticular lens.

As illustrated in FIG. 21, the observation range eR of the right eye and the observation range eL of the left eye are defined as the following expressions (24) and (25):

[Expression 24]
$$eR = XR2 - X1 \quad (24)$$

[Expression 25]
$$eL = X1 - XL2 \quad (25)$$

A 3D crosstalk is defined in the expressions (26) and (27) as follows. 3DCT (R) is a 3D crosstalk in the right eye region while 3DCT (L) is a 3D crosstalk in the left eye region.

[Expression 26]
$$3DCT(R) = (LBRW - LBRB)/(LWRW - LBRB) \quad (26)$$

[Expression 27]
$$3DCT(L) = (LWRB - LBRB)/(LWRW - LBRB) \quad (27)$$

Further, the minimum values of the 3D crosstalks in the left eye and right eye regions are defined in the expressions (28) and (29) as follows:

[Expression 28]
$$3DCT(R)\min = (YR3 - YR4)/(YR6 - YR4) \quad (28)$$

[Expression 29]
$$3DCT(L)\min = (YL3 - YL4)/(YL6 - YL4) \quad (29)$$

As for the 3D crosstalks calculated from the above-mentioned expressions (26) to (29), a region that is not more than a predetermined 3D crosstalk and can be effectively three-dimensionally viewed is defined. In the optimal observation distance, a region which is not more than a predetermined 3D crosstalk and can be three-dimensionally viewed without any sense of incongruity is referred to as an effective three-dimensional visual angle V3D, while a region which has not less than a predetermined 3D crosstalk and influences three-dimensional visibility is referred to as a 3D crosstalk angle VCT.

As a result of subjective evaluation, it was found that a 3D crosstalk of 7.5% or more has an influence on three-dimensional visibility. In other words, it is desirable to set the effective three-dimensional visual angle V3D of the 3D crosstalk in the range in which the 3D crosstalk is 7.5% or less.

As a result of subjective evaluation, it was found that a 3D moire ΔYm of 30% or more has an influence on three-dimensional visibility. In other words, it is desirable to set the 3D moire ΔYm in the range of 0 or more and 30% or less.

It is desirable that the 3D moire ΔYm does not sharply fluctuate in the angular direction. This is because it becomes easy to subjectively observe the 3D moire and a sense of incongruity is given to an observer when the 3D moire ΔYm fluctuates generally rectangularly with respect to the angular direction. The fluctuation amount ΔYm/ΔXm of the 3D moire with respect to the angular direction can be lowered to reduce a subjective sense of incongruity due to the 3D moire by optimizing the operation and defocusing width of the above-mentioned lenticular lens.

The fluctuation amount of the longitudinal transmittance in the image separation direction is reduced by the effect of compensating the transmittance in the two display units 4U and 4U' adjacently arranged in the Y-axis direction as illustrated in FIG. 10, so that the 3D moire is reduced. In other words, the 3D moire can be compensated by subpixels in each data line arranged in the Y-axis direction. Further, a transmittance can be compensated in each of display units adjacent to each other in the Y-axis direction and a color tone can be compensated in each color in two pixels 4 and 4' adjacently arranged in the Y-axis direction.

Figure 25:
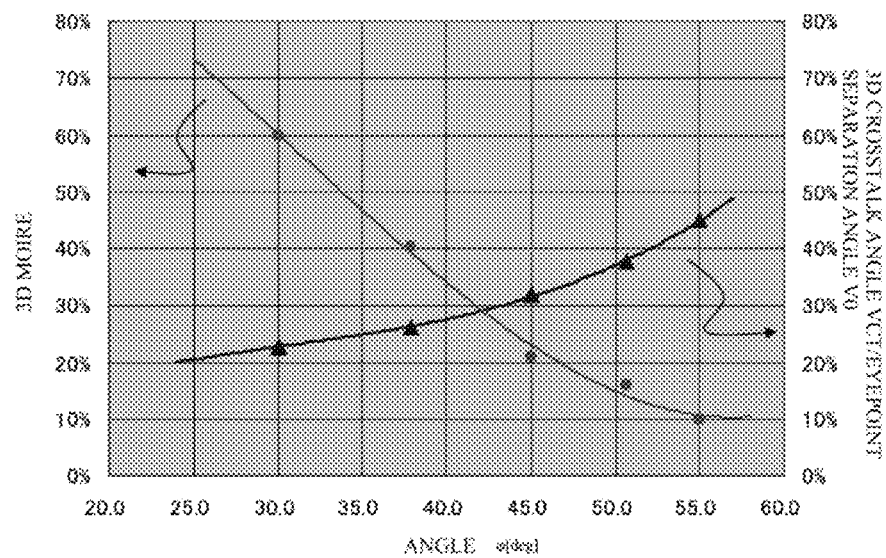
FIG. 25 is a graph that indicates the relationship of a meandering wiring line angle φ, 3D moire, and a 3D crosstalk width in the image display apparatus according to the first embodiment of the present invention.

FIG. 25 is a graph that indicates the relationship of a meandering wiring line angle φ, 3D moire, and a 3D crosstalk in the image display apparatus according to the first embodiment of the present invention. It is found that the 3D moire is decreased by increasing the wiring line angle φ. The ratio of a 3D crosstalk angle Vct to an eyepoint separation angle V0 is high but is around 46% at a wiring line angle φ=55 degrees. In other words, an angle range V3D in which 3D is well visible with respect to the eyepoint separation angle V0 is 54%, so that a three-dimensional vision region can be secured at the ratio of 50% or more.

As a result of subjective evaluation, as for the effective three-dimensional visual angle V3D and the 3D crosstalk angle VCT, it is found that a region in which three-dimensional image quality is visible can be obtained by establishing the following expression (30):

[Expression 30]

$$0.5 \times V0 < V3D \tag{30}$$

Since the aspect ratio of the subpixels according to the present embodiment is Px:Py=3:2, a structural tilt angle φ has a limitation of 56 degrees. Accordingly, the tilt angle φ of the meandering wiring line is desirably zero degree or more and 56 degrees or less. A layout design at φ=55 degrees had the limitation due to a wiring line rule. In other words, zero degree <φ<55 degrees is satisfied in a realizable layout, and the 3D moire has the minimum value at φ=55 degrees.

The applicable angle θ between the direction of drawing a slit electrode and the initial orientation of liquid crystals is zero degree or more and 90 degrees or less. In other words, as illustrated in FIG. 16(A), the initial orientation angle θLC of liquid crystals based on the Y-axis direction is (90-θ) degree(s). Further, the fringe electric field angle θE1 with respect to the Y-axis direction of the fringe electric field E1 is zero degree since the slits are arranged in the Y-axis direction. As a result, the angle between the initial orientation direction θLC and the fringe electric field direction φE1 is (90-θ) degree(s). Accordingly, the applicable angle between the initial orientation direction θLC and the fringe electric field direction φE1 is in the range of zero degree or more and 90 degrees or less.

The applicable meandering direction A of the meandering wiring line is at zero degree or more and 55 degrees or less. As illustrated in FIG. 16(B), the angle of the meandering direction A with respect to the Y-axis direction is φ, while the lateral electric field direction φE2 of the lateral electric field E2 with respect to the Y-axis direction in the meandering direction A is (90+φ). The angle between the initial orientation direction θLC and the lateral electric field direction φE2 in the meandering wiring line A is (θ+φ). Accordingly, the applicable angle between the initial orientation direction θLC and the lateral electric field direction φE2 in the meandering wiring line A is in the range of zero degree or more and 145 degrees or less.

The applicable meandering direction B of the meandering wiring line is at −55 degree or more and zero degree or less. As illustrated in FIG. 16(C), the angle of the meandering direction B with respect to the Y-axis direction is φ'=−φ, while the fringe electric field direction φE3 of the fringe electric field E3 in the meandering direction B is at (−90−φ). The angle between the initial orientation direction θLC and the fringe electric field direction φE3 in the meandering wiring line B is (φ−θ). Accordingly, the applicable angle between the initial orientation direction θLC and the fringe electric field φE3 in the meandering wiring line A is in the range of −90 degree or more and 55 degrees or less.

The connection relationships of the gate lines, the data lines, and the pixel transistor in accordance with the present embodiment can also be represented as follows. In other words, pixels connected to one data line through the pixel switch and pixels connected to the other data line through the pixel switch are alternately disposed in each pixel column sandwiched between any two of the plural data lines, while pixels connected to one gate line through the pixel switch and pixels connected to the other gate line through the pixel switch are alternately disposed in each pixel row sandwiched between any two of the plural gate lines. It is preferable to dispose the pixels so that the number of the data lines is more than that of pixel columns by one in order to dispose the pixels in such a manner. Similarly, it is preferable to dispose the pixels so that the number of the gate lines is more than that of pixel rows by one. Further, the connection relationships of the gate lines, the data lines and the pixel transistor are not limited thereto, but the driving polarity as illustrated in FIG. 8 and the controlling of the liquid crystal orientation as illustrated in FIG. 10 can be realized to provide an advantage, offered by the present invention, by setting the connection relationships of the gate lines, the data lines, and the pixel transistor depending on the polarity driving of an input signal.

Further, the present embodiment provides the structure in which the direction of drawing each data line coincides with the image separation direction is provided, but is not limited thereto, and the structure in which the direction of drawing each gate line coincides with the image separation direction is also acceptable.

Further, the subpixels may also be composed in a square. The case in which the subpixels are composed in the square means that the pitch Px in the X-axis direction in the subpixels is equal to the pitch Py in the Y-axis direction. In other words, there is the structure in which the pixel pitch in the X direction and the pixel pitch in the Y direction are different from each other in the direction of repeatedly arranging the pixel pitches. In the case of pixels having two-eyepoint pixels, the pixel pitch in the X direction is twice as long as the pixel pitch in the Y direction.

In the present embodiment, it was explained that each pixel composing the vertically adjacent pixel pair is disposed in the relationship of being symmetric with respect to the center point of the vertical pixel pair. In other words, this means that the position in the X-axis direction of the thin film transistor of each pixel composing the vertically adjacent pixel pair is symmetric with respect to the central line of the vertically adjacent pixel pair in the X-axis direction. The present embodiment is not limited thereto, but the position in the X-axis direction of the thin film transistor of each pixel composing the vertically adjacent pixel pair may be disposed to become asymmetrical by changing the layout structure of the light shielding section. As a result, the position of the thin film transistor can be changed in each pixel, the redundancy of the influences of a plurality of thin film transistors can be suppressed on the same position of the observation surface, and higher image quality is therefore enabled.

The above-mentioned explanation is for a mode in which a plurality of eyepoints are set on the observation surface and light of each pixel for each eyepoint is emitted from all the display units on the display surface to each of the set eyepoints. This mode is also referred to as a light concentrating mode since light for an applicable eyepoint is concentrated on a certain predetermined eyepoint. The light concentrating mode is classified into the above-mentioned three-dimensional display apparatus in the two-eyepoint mode and the three-dimensional display apparatuses in a multi-view mode, of which the number of eyepoints is further increased. A plane containing the central axis of the image separation by the cylindrical lens is a plane containing the line segment from the cylindrical lens to an observer and the line segment parallel to the Y-axis. Accordingly, as illustrated in FIG. 27(A), when attention is paid to each line 17 indicating the central axis of the image separation in a cross section (X-Z plane) at a certain position on the Y axis, each line 17 indicating the central axis of the pixel separation is composed to concentrate light toward the eyepoints in the observer side, so that mutually independent images can be observed by the right and left eyes. The light concentrating mode is characterized in that light rays incident on the eyes of the observer are reproduced and displayed. The image display apparatus 1 according to the present embodiment can be effectively applied to such a light concentrating mode.

As illustrated in FIG. 27(A), the direction of a light ray emitted from each cylindrical lens 3a disposed on the lenticular lens 3 is set depending on the positions of the eyepoints of the observer. The direction of each line 17 indicating the central axis of the image separation is directed at the observer side, and an image for the right eye and an image for the left eye with respect to the central axis of the image separation are distributed to the left eye 55L and the right eye 55R, respectively. The surface of each cylindrical lens 3a is convexly curved, and the highest point in the Z-axis direction is the vertex.

A virtual line segment extending in the longitudinal direction of a lens convex section along the vertex of each cylindrical lens 3a can be a first principal axis 33 when the pitches of each cylindrical lens 3a and each display unit 4U completely coincide with each other. However, when each cylindrical lens 3a and each display unit 4U, which overlap each other, are observed from the direction vertical to the display surface, the pitch L of each cylindrical lens 3a is different from the pitch Pu of each display unit 4U in the present embodiment and, therefore, the vertex of each cylindrical lens 3a does not always coincide with an eyepoint pixel boundary line 43 which is the central line of each display unit 4U. This is because each line 17 indicating the central axis of the image separation is concentrated on one point in the observer side and the central axis of the image separation observed from the observation point therefore becomes an apparent optical principal axis. In the light concentrating mode, it is desirable to observe the boundary of the pixel separation to be the central axis 43 of each display unit even when any display unit disposed in the display is observed by an observer at a certain position. In other words, in the light concentrating mode, the central axis of the image separation observed from the position of the observer is defined as a first principal axis 33. The line 17 indicating the principal axis of the image separation is in a direction generally vertical to the display surface in the center of the display of the display panel 2 while, except the center of the display, each line 17 indicating the principal axis of the pixel separation is in the direction of tilting from the direction vertical to the display surface to the observer side.

Furthermore, there are proposed modes called a space image mode, a space image reconstruction mode, a space image reproduction mode, a space image formation mode, and the like. FIG. 27(B) illustrates a conception diagram. In the space image mode, a specific eyepoint is not placed, unlike the light concentrating mode. In addition, its difference point is in that light emitted from an article in the space is displayed to be reproduced. Such a space image mode is classified into three-dimensional display apparatuses in an integral photography mode, an integral videography mode, and an integral imaging mode. In the space image mode, only pixels for the same eyepoint on the whole display surface are not observed by an observer who is located at any location. However, there are several regions with a predetermined width formed by the pixels for the same eyepoint. Since the present invention can exert the same effect as in the above-mentioned light concentrating mode in each region, the present invention can also be effectively applied in the space image mode.

As used herein, "eyepoint" does not mean "a certain point on a display region that is closely viewed by a user (viewing point)" but means "position at which a display apparatus is observed (observation position)" or "a point or a region where each eye of a user should be located".

Further, the polarizing plate 11 is not affixed to the display panel 2 carried by the display apparatus of the present embodiment but the polarizing plate 11 may be disposed on the non-processed surface of the lenticular lens 3. The non-processed surface of the lenticular lens is a flat surface, so that the polarizing plate 11 can be closely fixed on the lenticular lens. The polarizing plate 11 may also be placed in an observer side with respect to the lenticular lens 3. The distance H between the vertex of the lens and each pixel can be easily adjusted by changing the placement of the polarizing plate 11. As a result, design freedom can be improved.

As for the lenticular lens 3 according to the present embodiment, the structure in which a lens surface is disposed on a surface in the +Z direction which is the direction of the user side was explained, without limitation thereto, the lens surface may also be disposed on a surface in the −Z direction which is the direction of the display panel side. This case is advantageous for higher resolution since the distance between the lens and each pixel can be reduced.

As for the lenticular lens 3 according to the present embodiment, i.e., image separation means for controlling the direction of a light ray, the structure in the case of being disposed on a surface in the +Z direction which is the direction of the user side of the display panel 2, without limitation thereto, the lens may also be disposed on a surface in the −Z direction which is the direction of the backlight side. In this case, a sense of incongruity in which a display plane is felt to be far can be reduced since a lens surface is not directly observed by an observer.

An advantage offered by the present invention can also be obtained in the structure in which the image separation means is disposed on the backlight to separate a light ray in a predetermined direction. As the image separation means, there can be applied optical means capable of controlling the direction of the light ray by switching of a light source disposed on the backlight. A crosstalk between eyepoint images can be reduced to further obtain an advantage offered by the present invention using the light ray of which the direction is divided by the switching in terms of time.

As the image separation means carried by the display apparatus according to the present invention, a parallax barrier in which transparent regions and opaque regions are alternately arranged may also be applied. As the parallax barrier, an electro-optical element capable of switching the transparent regions and the opaque regions by liquid crystal molecules or an MEMS shutter may also be used. As for the image separation means, an advantage offered by the present invention can also be obtained using a GRIN (Gradient Index) lens as the electro-optical element in which liquid crystals are used.

Figure 26:
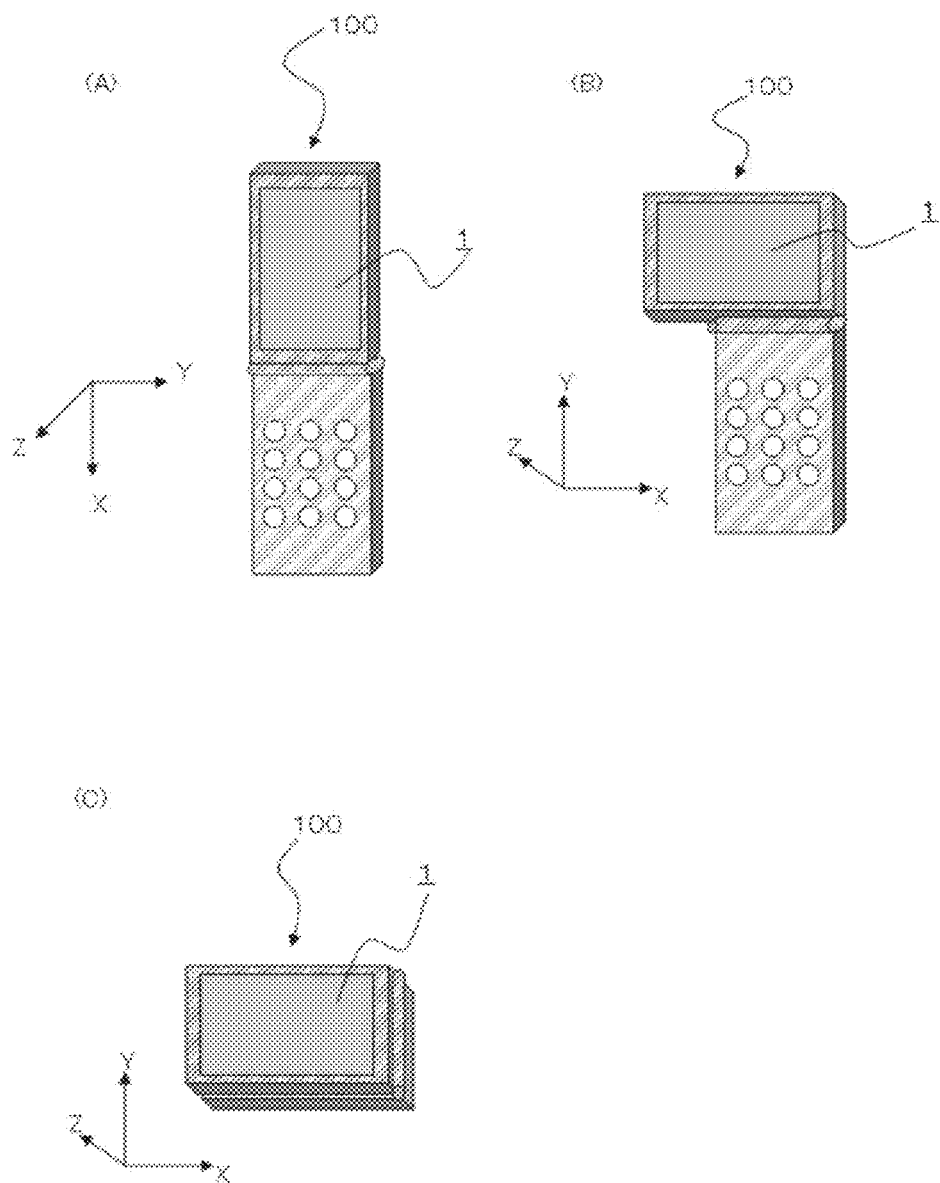
FIG. 26 is an example of a portable device carrying the image display apparatus according to the first embodiment of the present invention, in which (A) illustrates an opened image plane in a portrait mode; (B) illustrates an opened image plane in a landscape mode; and (C) illustrates a folding image plane in a landscape mode.

FIG. 26 illustrates a portable device carrying the image display apparatus according to the present embodiment. In the present embodiment, an explanation in which the pixel for the first eyepoint is the pixel 4L for the left eye and the pixel for the second eyepoint is the pixel 4R for the right eye is given, but, without limitation thereto, the pixel for the first eyepoint and the pixel for the second eyepoint may be the pixel 4R for the right eye and the pixel 4L for the left eye, respectively. As a result, the three-dimensional display can be observed in the same way as the original state by sorting image data even in the state in which the display panel is rotated at 180 degrees. In particular, the operability of the portable device as illustrated the drawing is improved by rotating its display image plane, and it is necessary to provide information without depending on the direction of the display panel at the time of holding the device by a hand.

Further, without limitation to a liquid crystal driving mode of an FFS mode, another liquid crystal driving mode can be applied to the liquid crystal display panel carried by the display apparatus according to the present embodiment. Examples of the liquid crystal driving mode include IPS (In-Plane Switching) mode, AFFS (Advanced Fringe Field Switching) mode, and the like in lateral electric field modes.

Further, liquid crystal molecules can be driven by controlling an electric field in the side closer to the main substrate 2a even in a vertical orientation mode, and an advantage offered by the present invention can be obtained by applying the structure in which the longitudinal transmittance is made to be constant in the image separation direction. Examples of vertical orientation modes include MVA (Multi-domain Vertical Alignment) mode in which multi-domains are achieved and viewing angle dependency is reduced, PVA (Patterned Vertical Alignment) mode, ASV (Advanced Super V) mode, and the like. Furthermore, a liquid crystal display panel to which OCB (Optically Compensated Bend) mode is applied can also be preferably used.

The explanation about the display panel according to the present embodiment was given as a liquid crystal display panel in which liquid crystal molecules are used for an electro-optical element. The liquid crystal display panel can be applied not only to a transmissive liquid crystal display panel but also to a reflective liquid crystal display panel, a semi-transmissive liquid crystal display panel, a slight reflective liquid crystal display panel in which the ratio of a transmissive region is higher than that of a reflective region, a slight transmissive liquid crystal display panel in which the ratio of a reflective region is higher than that of a transmissive region, or the like. Further, a method for driving the display panel can be preferably applied to a TFT mode. A thin film transistor in the TFT mode can be preferably applied not only to those using amorphous silicon, low-temperature polysilicon, high-temperature polysilicon, and single crystal silicon but also to those using organic substances such as pentacene, metal oxides such as zinc oxide, oxide semiconductors such as IGZO, and carbon nanotubes. Further, the present invention does not depend on the structure of the thin film transistor. Known technologies such as a bottom gate type, a top gate type, a staggered type, and an inversely staggered type can be preferably used.

Although a mobile phone is exemplified as the terminal apparatus in the present embodiment, the present invention is not limited thereto but can be applied to various portable terminal apparatuses such as PDAs, personal TVs, gaming machines, digital cameras, digital video cameras, and notebook type personal computers. The present invention can also be applied not only to the portable terminal apparatuses but also to various fixed type terminal apparatuses such as cash dispensers, vending machines, monitors, and television receivers.

Although the explanation is given about the structure in which the pixel for the first eyepoint is the pixel 4L for the left eye and the pixel for the second eyepoint is the pixel 4R for the right eye in the present embodiment, the present invention is not limited thereto but may be applied to a three-dimensional display panel having eyepoints, of which the number is N, in a display unit. In the three-dimensional display panel including the eyepoints of which the number is N, optimal three-dimensional information can be applied to display a three-dimensional image in each eyepoint, and the range in which the three-dimensional image can be well observed can be therefore enlarged. Since three-dimensional feeling depending on an eyepoint position can be applied, a three-dimensional image with a sense of reality can be provided.

Although the liquid crystal display device according to the present embodiment is described to have the oriented film on the substrate side interface of the liquid crystal molecules, the present invention is not limited thereto, but the oriented film becomes needless if the liquid crystal molecules are treated to be oriented in the predetermined direction, and, therefore, is not the essential constituent feature of the present invention.

Although an explanation is given about the pixel transistor 4TFT having a pixel structure having a singing gate in the present embodiment, without limitation thereto, the pixel transistor 4TFT may have a double gate structure or a triple gate structure. By applying a multi-gate structure such as the double gate or triple gate structure, a light leakage current is reduced in the OFF state of a thin film transistor and the deterioration of TFT characteristics due to light irradiated from the outside of the backlight or the image display apparatus can be suppressed. As a result, a flicker, a noise, and a crosstalk can be reduced, and the image display apparatus of high quality can be provided. It is very effective to make the above-mentioned multi-gate structure since a thin film transistor prepared by using polysilicon particularly has low resistance between a source and a drain in comparison with a thin film transistor prepared by using amorphous silicon. Further, it is effective when the luminance of the backlight is enhanced to obtain brightness in high-resolution pixels.

Although an explanation is given about the driving polarities in the image for the left eye and the image for the right eye as 2H1V dot reversion driving in the present embodiment, without limitation thereto, a polarity as 1H1V dot reversion driving may also be presented in each eye. Such a polarity as mentioned above can be appropriately treated by changing the input polarity of a data signal. An advantage offered by the present invention can be obtained by composing a plurality of domain regions having different liquid crystal orientation states on the principal axis of the image separation means depending on the presented driving polarity and placing and mixing the respective domain regions on the optical principal axis of the image separation means. As a result, the local reduction in transmission in the image separation direction can be compensated, the 3D moire can be reduced, and higher Transmittance can be achieved.

Although an explanation is given about the plural domain regions in the different liquid crystal orientation states, which are alternately disposed and compensated on the principal axis of the image separation means every one subpixel in the present embodiment, without limitation thereto, the regions may also be compensated every plural pixels arranged on the principal axis.

[First Variation of First Embodiment]Rectangular Slit End

Figure 28:
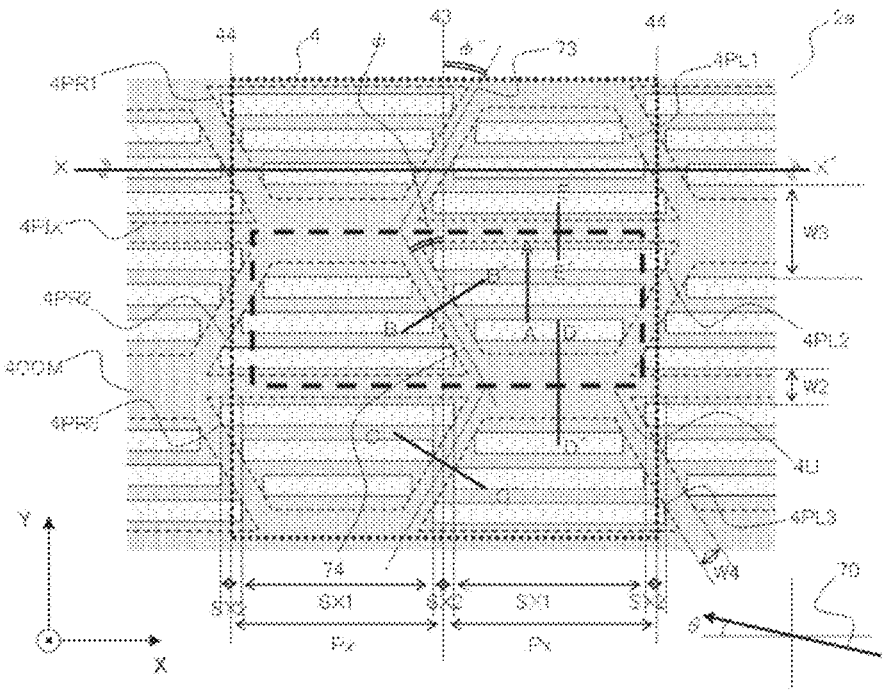
FIG. 28 is an enlarged view of pixels in a display panel in an image display apparatus according to a first variation of the first embodiment of the present invention.

FIG. 28 is a first variation of the display panel according to the first embodiment of the present invention. Each slit end disposed in the common electrode 4COM is formed in a rectangular shape. The end in the narrow side of the slit is in parallel to the direction perpendicular to the image separation direction and is in the direction which is different from the meandering direction A or the meandering direction B.

The slits in the subpixels have structures in which their sizes in the X-axis direction are different depending on the meandering direction A or the meandering direction B, and the end of the narrow side of each slit is disposed along the meandering wiring line direction. Each slit has the structure of being shifted and disposed in the X direction and the Y direction between subpixels adjacent to each other in the X-axis direction.

The structures other than the above in the present embodiment are the same as those in the above-mentioned first embodiment.

It is difficult to process and form a slit end in an acute angle shape with high accuracy in a general finishing process, and yield is decreased when the finishing with high accuracy is intended. Further, a slit with an acute angle shape requires use of a photomask having a high-resolution grid and thus leads to increase in cost. In the present variation, easy finishing is enabled since a slit end is rectangular, and a lower cost can be achieved since the minimum grid of a photomask can be set to be large. Furthermore, even when the corner of the rectangular slit end forms a circle and has a curved shape under the influence of the finishing process, a similar effect can be obtained. As a result, a production process margin can be made to be large to achieve a lower cost.

[Second Embodiment]

Figure 29:
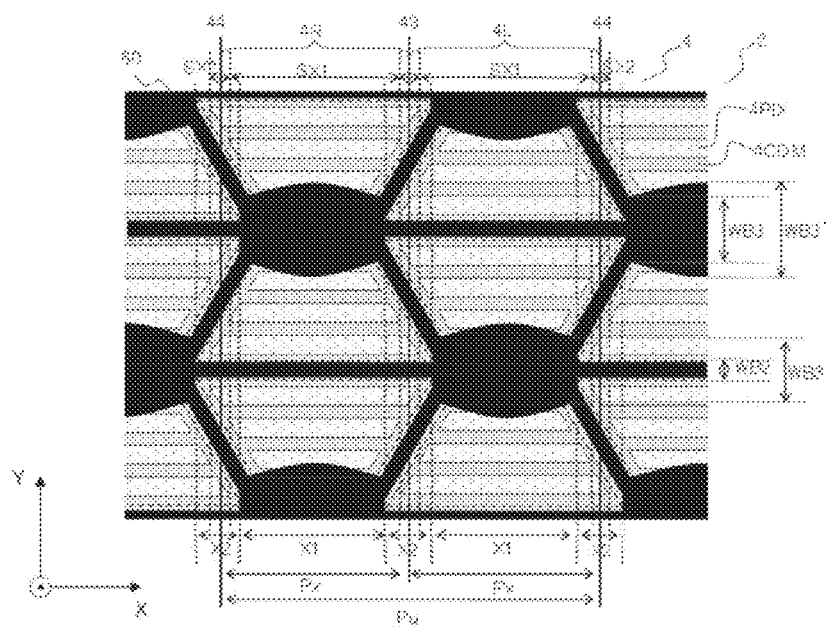
FIG. 29 is an enlarged view of pixels in a display panel in an image display apparatus according to a second embodiment of the present invention.

FIG. 29 is an enlarged view that illustrates pixels in a display panel carried by an image display apparatus according to a second embodiment of the present invention. The width of a light shielding section is set depending on the transmittance distribution in the X-Y plane of a liquid crystal layer. Further, the width of the light shielding section in the Y-axis direction fluctuates in the X-axis direction in the central sections of the subpixels to suppress the fluctuation of longitudinal transmittance due to the unevenness of the accuracy of processing the oblique side sections of trapezoids.

As illustrated in FIG. 29, the width of a black matrix 60 in the Y-axis direction is disposed to increase toward the opening center region of each subpixel. The black matrix 60 curved to the opening regions of the subpixels depending on the transmittance of the liquid crystal layer is disposed on the upper base section of each trapezoidal pixel, and the width of the black matrix 60 is largest in the center of the upper base section.

The width WE3 of the black matrix 60 in the Y-axis direction in the region in which the upper base and oblique side sections of each trapezoidal pixel are connected is smaller than the width WE3' of the black matrix 60 in the Y-axis direction in the center of the upper base section.

The structures other than the above in the present embodiment are the same as those in the above-mentioned first embodiment.

As indicated in an example of the luminance distribution of FIG. 24, the fluctuation of luminance occurs due to the accuracy of processing a wiring line rule even when the transmittance of the liquid crystal layer is set to be generally constant. Since the fluctuation of the luminance more easily influence the 3D crosstalk angle VCT than the effective three-dimensional visual angle V3D, the fluctuation of the luminance is suppressed by disposing a light-shielding layer corresponding to the fluctuation of luminance in the region of the 3D viewing angle V3D. In other words, the light-shielding width of the section in which luminance is increased as in the case of (XR1, YR1) in FIG. 24 is increased to WB3' to suppress luminance.

Since the light shielding section can be set depending on the transmittance distribution of the liquid crystal layer, the three-dimensional image display apparatus with reduced 3D moire and good three-dimensional image quality can be provided. Further, a production process margin can be set to be large to improve yield.

[Third Embodiment]

Figure 30:
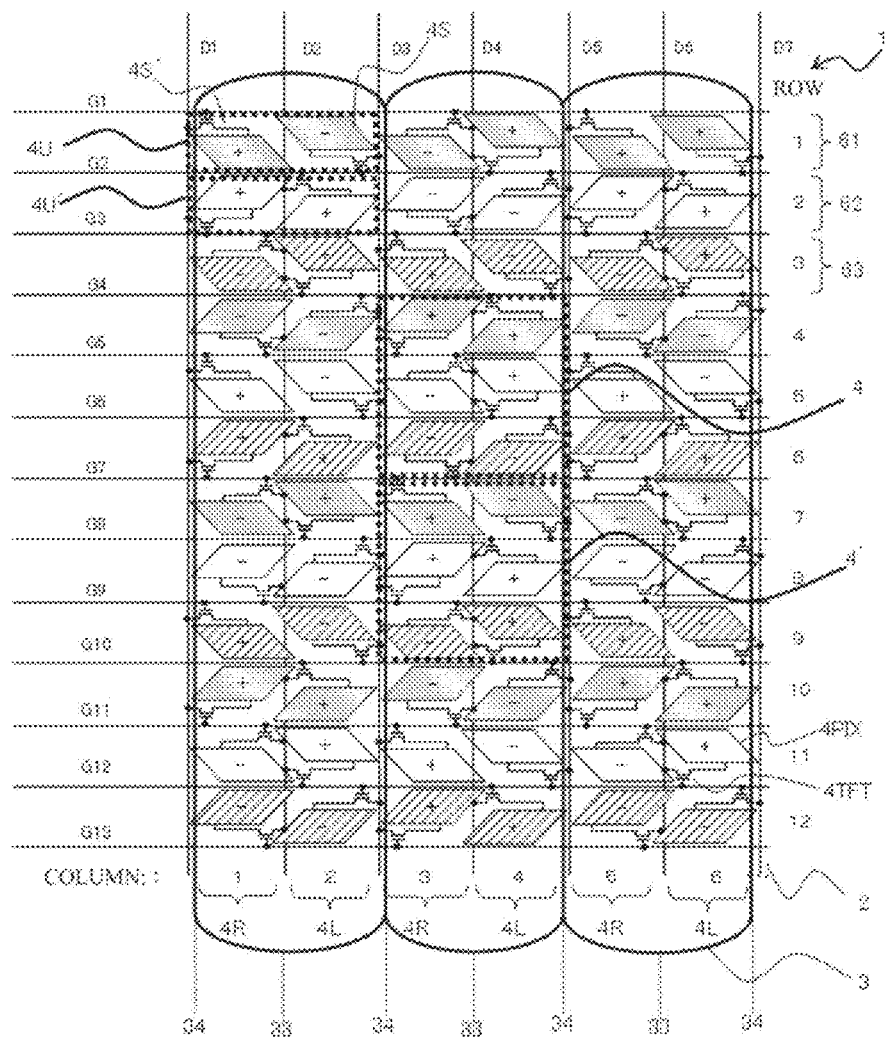
FIG. 30 is a plan view that illustrates an image display apparatus according to a third embodiment of the present invention.

FIG. 30 is a plan view that illustrates a display panel carried by an image display apparatus according to a third embodiment of the present invention and is a schematic view that particularly illustrates the connection relationships of subpixels, data lines, and gate lines and a polarity distribution during driving. FIG. 31(A) is a plan view of enlarged pixels in a display panel according to the third embodiment of the present invention. FIG. 31(B) is a plan view of enlarged pixels in a display panel according to a first variation of the third embodiment of the present invention.

As illustrated in FIG. 31, a pixel 4 according to the present embodiment is composed of a square including subpixels of 3 rows×2 columns, and each subpixel is composed of a parallelogram shape.

As illustrated in FIG. 30, subpixels 4S and 4S' are composed of a pixel transistor 4TFT connected to a pixel electrode 4PIX, a gate line for controlling the pixel transistor 4TFT, and a data line for inputting an image signal to the pixel electrode through the pixel transistor 4TFT and are composed of the two subpixels disposed across one gate line and arranged in the Y-axis direction. In the present embodiment, a pair of the two subpixels is referred to as a vertical adjacent pixel pair. Respective switching means included in the two subpixels composing the vertical adjacent pixel pair are commonly controlled by the gate line sandwiched between the two subpixels and image signals are input to the switching means through different data lines.

As illustrated in FIG. 31(A), a plurality of slits extended in the X-axis direction in each subpixel are formed in the common electrode 4COM. The opening width of each slit in the X-axis direction is larger than that in the Y-axis direction, and the opening width in the X-axis direction is composed to have the same shape in each slit in each subpixel.

The slit end formed in the common electrode 4COM is composed in a non-rectangular shape along the meandering direction, and each slit in each subpixel is shifted and disposed in the X-axis direction and the Y-axis direction. A slit overlapping width SX2 in an eyepoint pixel boundary 43 is set to be larger than a slit overlapping width SX2' in a display unit boundary 44.

The structures other than the above in the present embodiment are the same as those in the above-mentioned first embodiment.

A spot diameter can be adjusted to obtain a defocusing effect by changing a distance between each pixel and the lens as described above. However, in general, a technology such as molding processing using a die, photolithography, or inkjet can be used when the lenticular lens 3 is produced. Even when any technology is used, a predetermined shape is more easily secured in the lens convex section 31 of each cylindrical lens 3a than in the lens concave section 32 of cylindrical lenses 3a adjacent to each other, and optical performance is higher in the lens convex section 31. Further, it is difficult to remove a residue that is unable to be peeled from and remains on the lens concave section 32 or a foreign substance adhering thereto in comparison with the lens convex section 31, and it is the factor of deteriorating the optical separability of the lens concave section 32. Therefore, the spot diameters SP are different between the lens convex and lens concave sections of the lenticular lens, and the difference is the factor of generating a distribution in the defocusing effect even in the same plane.

When the spot diameter SP2 of the lens concave section is larger than the spot diameter SP1 of the lens convex section, a fluctuation of luminance in the angular direction, i.e., a 3D moire can be reduced by applying the region with the larger spot diameter to the region with the small slit overlapping width SX2'. Further, three-dimensional display of high quality in which a 3D moire is compatible with a 3D crosstalk can be obtained since a 3D crosstalk can be reduced in the region in which the slit overlapping width SX2 is applied to SP1 with a small spot diameter.

The effects other than the above in the present embodiment are the same as those in the above-mentioned first embodiment.

FIG. 31(B) is a pixel plan view that illustrates a first variation of the third embodiment. A subpixel shape is composed of a parallelogram shape. Each slit end disposed on the common electrode 4COM is composed of a rectangular shape, and each slit is shifted and disposed in the X direction. The width in which the slits of subpixels adjacent to each other in a display unit boundary 44 overlap each other in the Y-axis direction is set to be small. In the present variation, the slit overlapping width SX2' is substantially zero.

The structures other than the above in the present embodiment are the same as those in the above-mentioned first embodiment.

Since the slit ends formed to be rectangular in subpixels adjacent to each other are mutually shifted and disposed in the Y-axis direction, an electric field generated between pixel electrodes adjacent to each other can be increased in a direction different from the X-axis direction. Liquid crystal molecules between subpixels adjacent to each other can be easily moved.

The effects other than the above in the present embodiment are the same as those in the above-mentioned second embodiment.

The rectangular shape of each slit end is not limited to the structure of a corner at 90 degrees but may have a structure in which a part of a corner is curved. Since a process is more easily controlled than in the case of formation in a rectangular shape and a production margin can be made to be large, yield can be improved.

[Fourth Embodiment]

Figure 32:
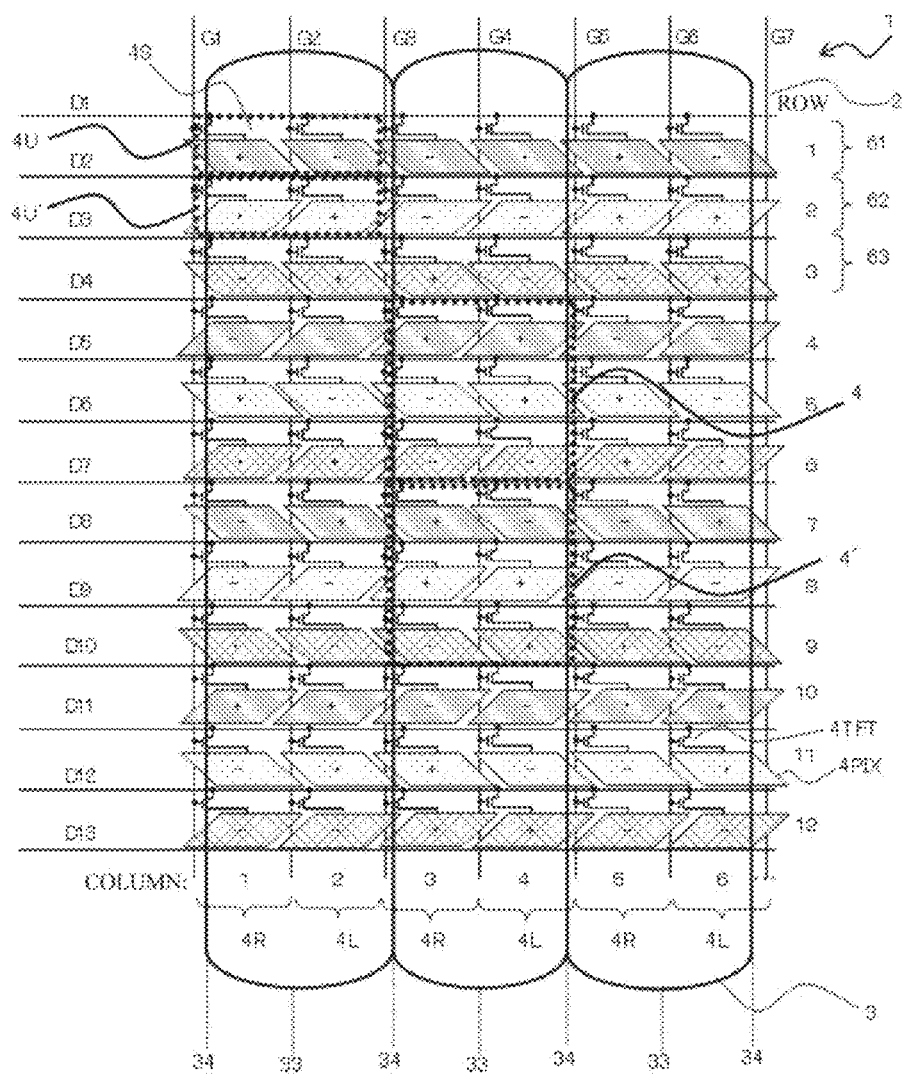
FIG. 32 is a plan view that illustrates an image display apparatus according to a fourth embodiment of the present invention.

FIG. 32 is a plan view that illustrates a display panel carried by an image display apparatus according to a fourth embodiment of the present invention and is a schematic view that particularly illustrates the connection relationships of subpixels, data lines, and gate lines and a polarity distribution during driving.

Figure 33:
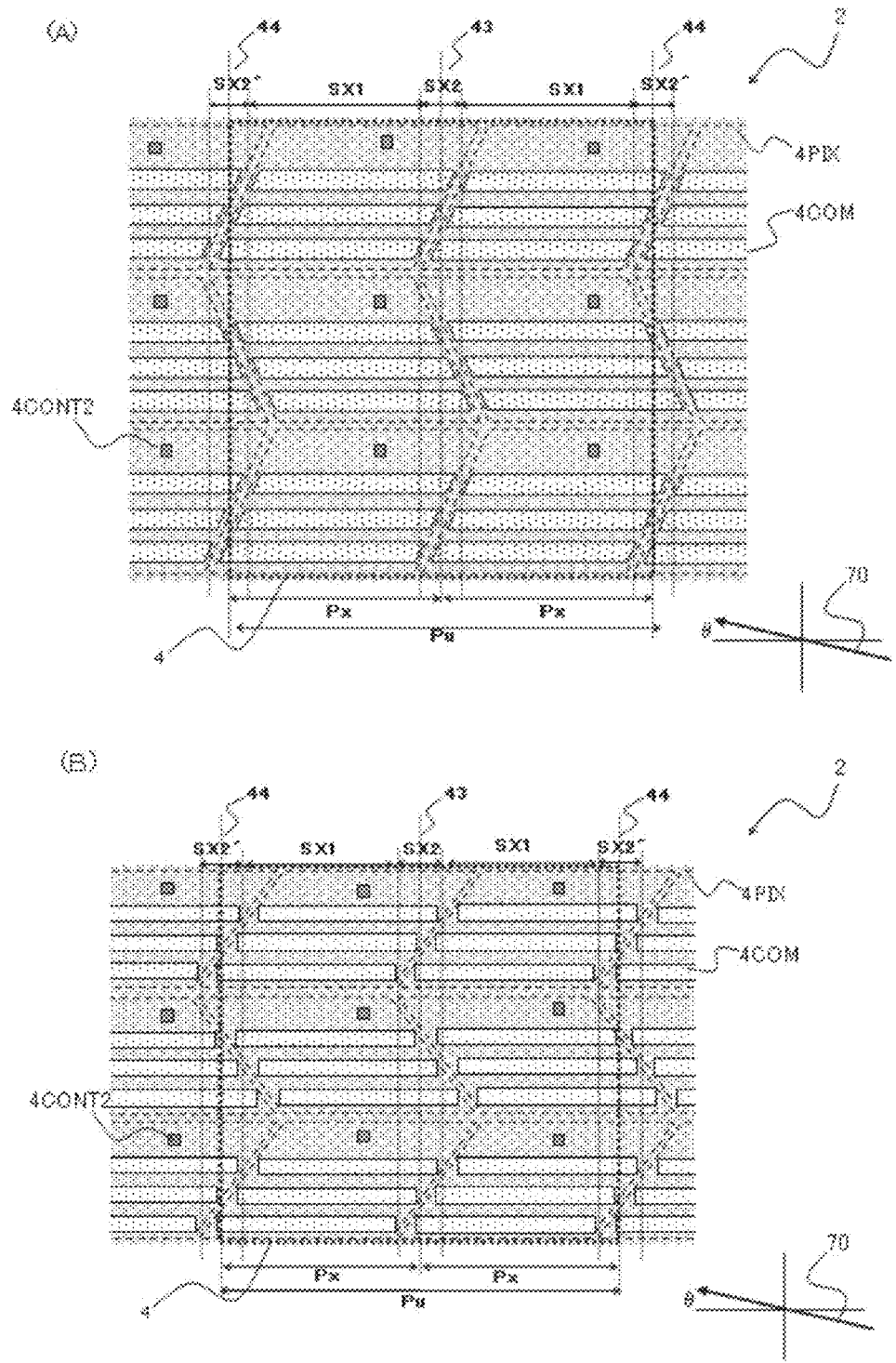
FIG. 33 is a plan view of enlarged pixels in a display panel according to the fourth embodiment of the present invention, in which (A) is a plan view of enlarged pixels in a display panel according to the fourth embodiment of the present invention; and (B) is a plan view of enlarged pixels in a display panel according to a first variation of the fourth embodiment of the present invention.

FIG. 33(A) is a plan view of enlarged pixels in a display panel according to the fourth embodiment of the present invention. Further, FIG. 33(B) is a plan view of enlarged pixels in a display panel according to a first variation of the fourth embodiment of the present invention.

As illustrated in FIG. 33(A), a pixel 4 according to the present embodiment is composed of a square including subpixels of 3 rows×2 columns, and each subpixel is composed of a parallelogram shape.

As illustrated in FIG. 32, a data line is extended in the X-axis direction which is an image separation direction, a gate line which crosses the data line is extended and disposed in the Y-axis direction. The connection relations of a subpixel, a pixel transistor 4TFT, a data line D, and a gate line G has the same structure in each subpixel 4S.

A plurality of slits extended in the X-axis direction in each subpixel are formed in the common electrode 4COM. The opening width of each slit in the X-axis direction is larger than that in the Y-axis direction, and the plural slits having the same shape are disposed in each subpixel. The slit ends of the common electrode 4COM are not rectangular, and the slits arranged in the Y-axis direction are shifted in the X-axis direction and are disposed along the meandering direction. A slit overlapping width SX1 in an eyepoint pixel boundary 43 is equivalent to a slit overlapping width SX2' in a display unit boundary 44.

The slits shifted in the X direction are repeatedly disposed in the Y-axis direction every line. In other words, the slits are alternately disposed in the image separation direction in a slit disposing pattern and can be compensated between pixels adjacent to each other in the image separation direction.

The structures other than the above in the present embodiment are the same as those in the above-mentioned first embodiment.

The present embodiment is different from the third embodiment in that the structures of the eyepoint pixel boundary 43 and the display unit boundary 44 are the same. As a result, placement is enabled without depending on the optical separation performance of the lenticular lens 3 to allow the improvement of design freedom.

The effects in the present embodiment are the same as those in the above-mentioned first embodiment.

The display panel according to the first variation of the fourth embodiment will now be described.

As illustrated in FIG. 33(B), each slit end is formed in a rectangular shape in the first variation.

The structures other than the above in the present variation are the same as those in the above-mentioned fourth embodiment.

The effect in the present variation are the same as those in the above-mentioned fourth embodiment.

[Fifth Embodiment]

Figure 34:
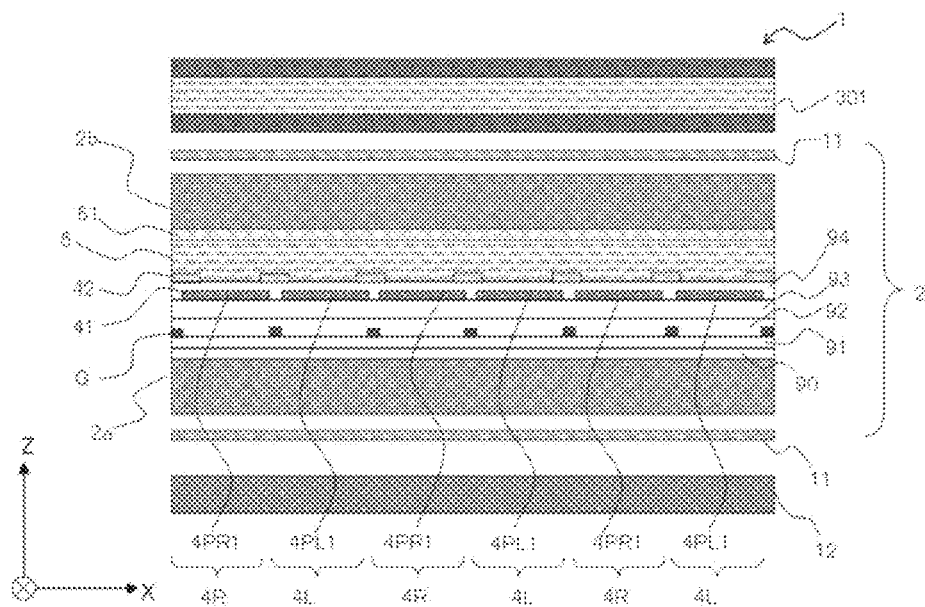
FIG. 34 is a schematic view that illustrates an image display apparatus according to a fifth embodiment of the present invention.
Figure 35:
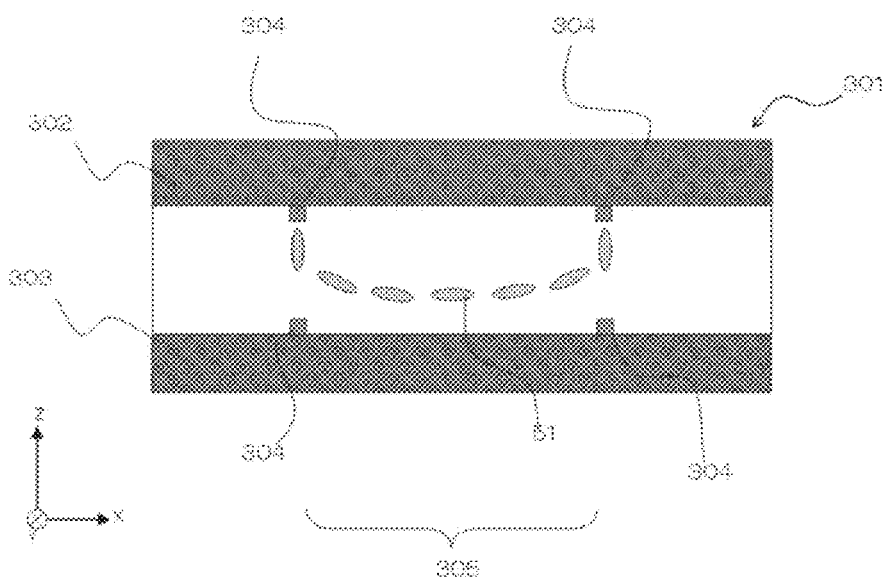
FIG. 35 is a cross-sectional view of a liquid crystal lens carried by an image display apparatus according to the fifth embodiment of the present invention.
Figure 36:
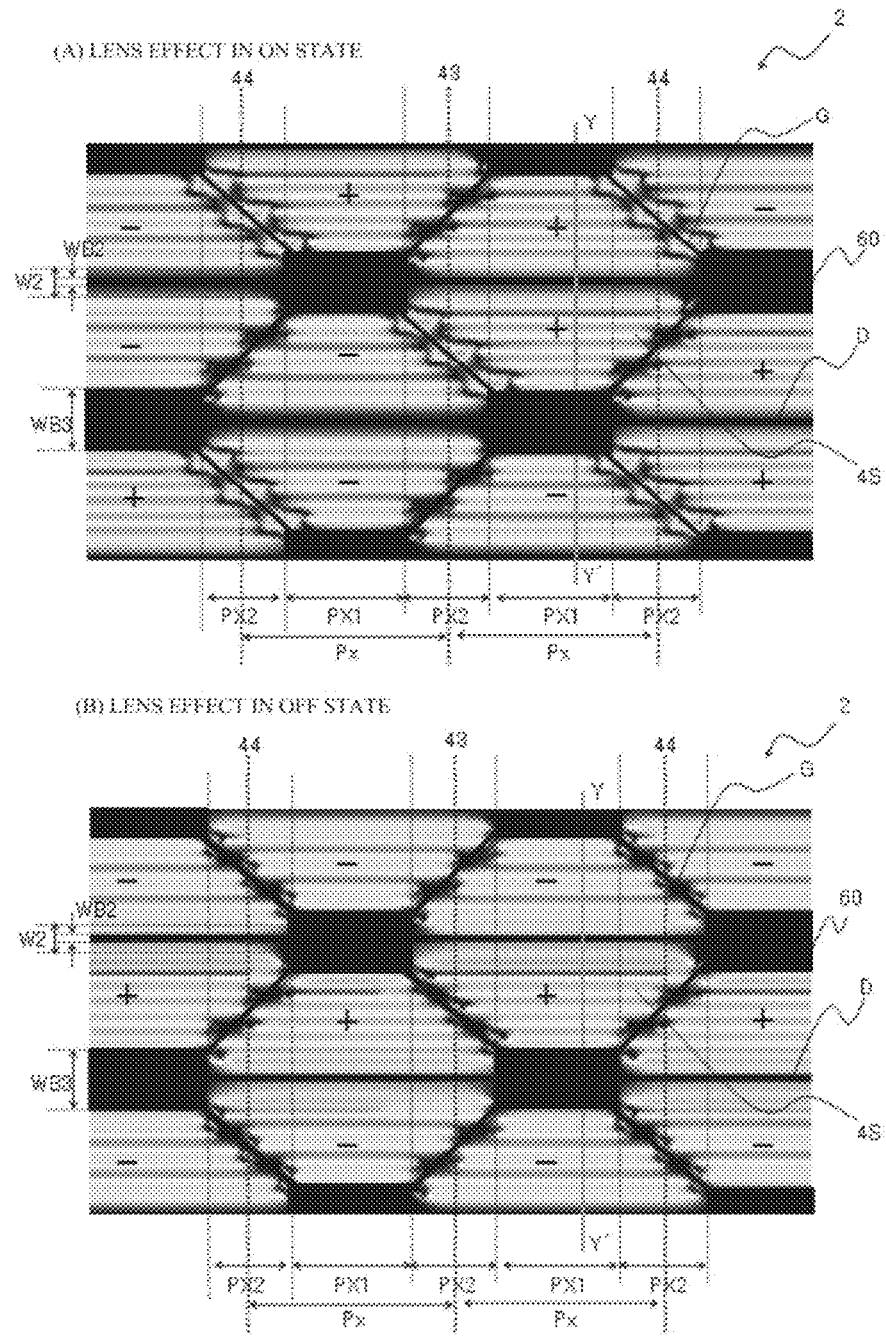
FIG. 36 is a schematic view that illustrates operation of pixels in the image display apparatus according to the fifth embodiment of the present invention, in which (A) is a schematic view that illustrates the state of driving the image display apparatus in the case in which a liquid crystal GRIN lens is in an ON state; and (B) is a schematic view that illustrates the state of driving the image display apparatus in the case in which the liquid crystal GRIN lens is in an OFF state.
Figure 37:
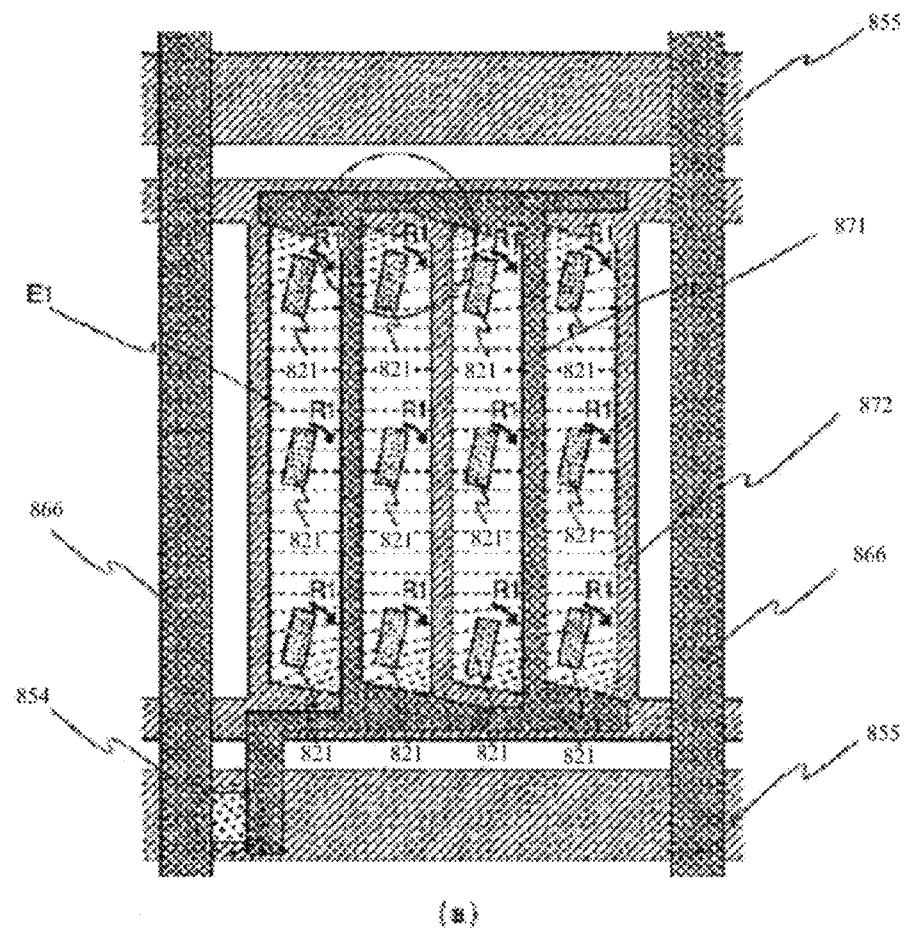
FIG. 37 is a plan view that illustrates pixels in a display panel in an image display apparatus in the related art.
Figure 38:
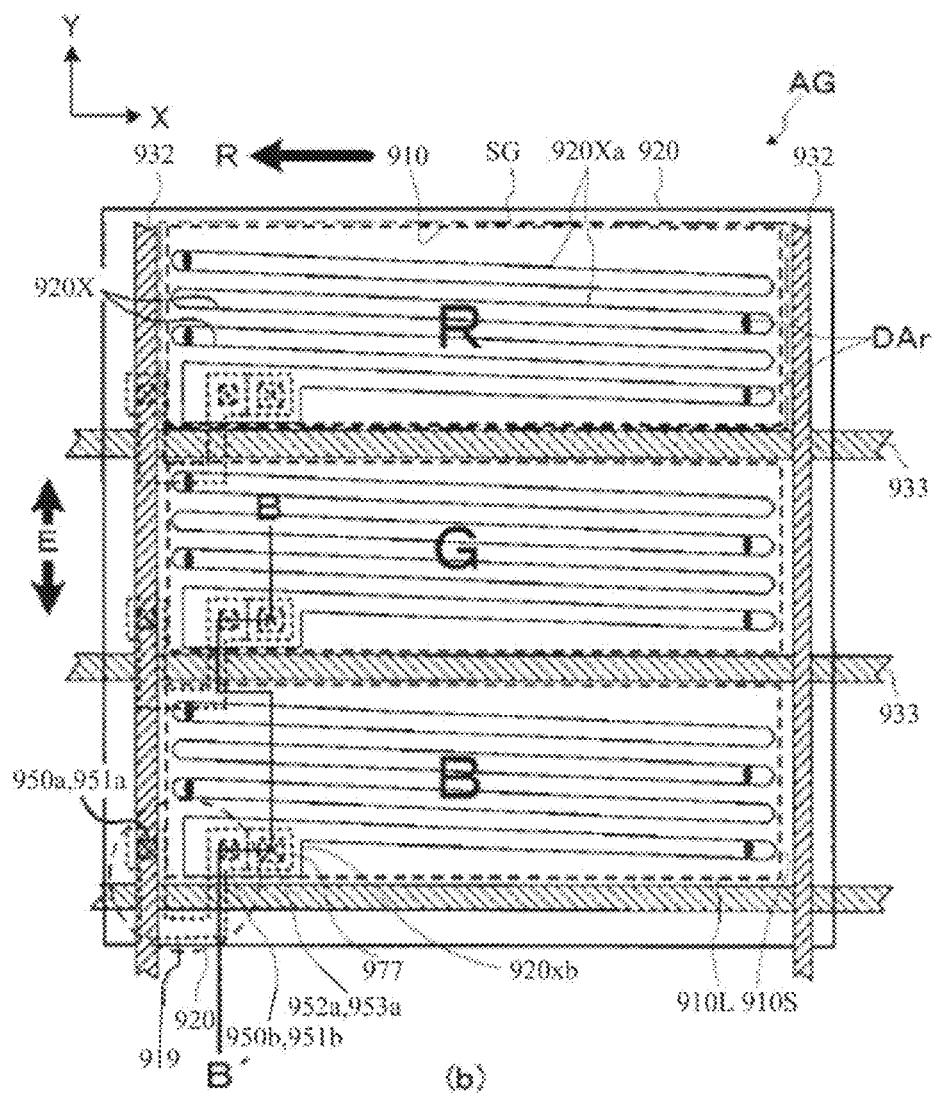
FIG. 38 is a plan view that illustrates pixels in a display panel in an image display apparatus in the related art.
Figure 39:
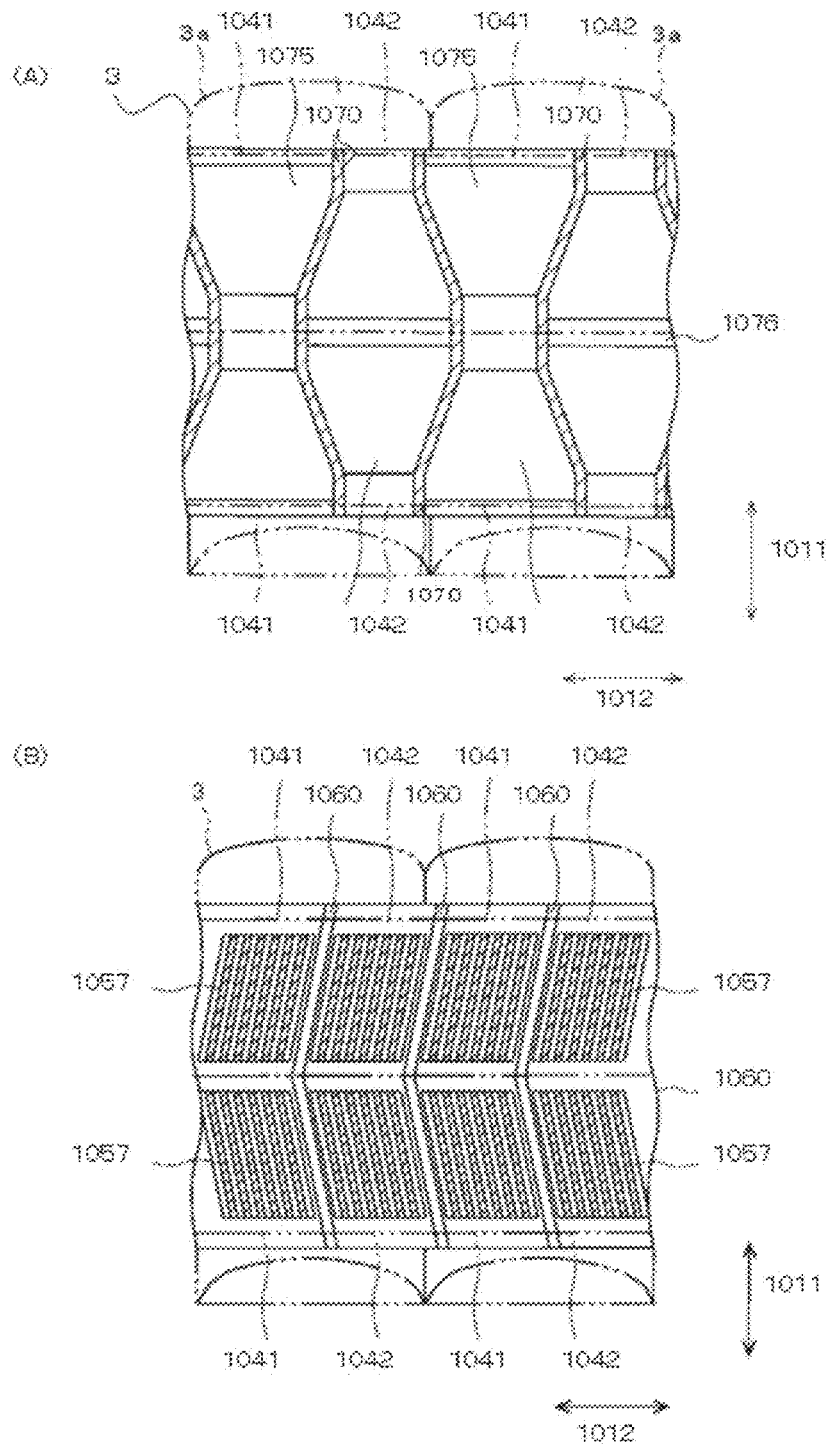
FIG. 39 is a plan view that illustrates pixels in a display panel in an image display apparatus in the related art, in which (A) illustrates an example in which a subpixel has a trapezoid shape.
Figure 40:
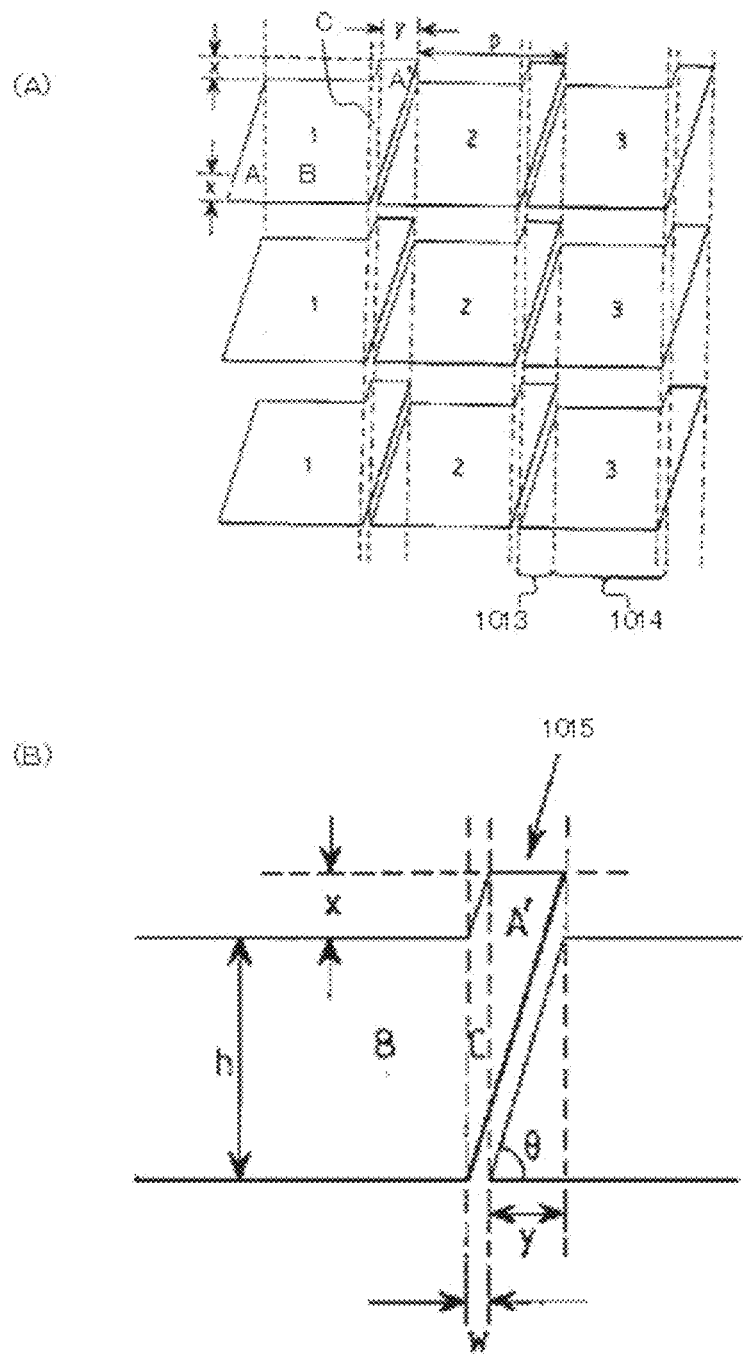
FIG. 40 is a plan view that illustrates pixels in a display panel in an image display apparatus in the related art, in which (A) is a plan view that illustrates pixel arrangement in a three-dimensional image display apparatus described in Japanese Patent Laid-Open No. 10-186294 (U.S. Pat. No. 3,525, 995) (Patent Literature 4); and (B) is an enlarged view of the pixels.

FIG. 34 is a cross-sectional view that illustrates an image display apparatus according to the present fifth embodiment, while FIG. 35 is a cross-sectional view that illustrates a liquid crystal GRIN lens carried by the image display apparatus according to the present embodiment. FIG. 36(A) is a schematic view that illustrates the state of driving the image display apparatus in the case in which the liquid crystal GRIN lens is in an ON state, while FIG. 36(B) is a schematic view that illustrates the state of driving the image display apparatus in the case in which the liquid crystal GRIN lens is in an OFF state.

As illustrated in FIG. 34, image separation means carried by the image display apparatus 1 is composed of an optical element including the liquid crystal GRIN (gradient index) lens 301.

As illustrated in FIG. 35, the refractive index of the liquid crystal GRIN lens 301 can be varied by controlling an electric field in liquid crystal molecules 51 sandwiched between a control substrate 302 and an opposite substrate 303 by control electrodes 304, so that an effect similar to that in the lens can be obtained. The refractive index of the liquid crystal GRIN lens 301 is not changed in the OFF state, and the lens just transmits light. In the ON state, the liquid crystal molecules are radially oriented along the electrodes placed in stripe form in the longitudinal direction of the panel and play the same role as that of the lenticular lens 3. One lens element is composed by a pair of the control electrodes 304, and lens elements 305 are arranged in array form in the plane of the liquid crystal GRIN lens 301. The lens elements 305 are disposed to correspond to display units 4U.

In the display panel 2 according to the present embodiment, the thickness of the liquid crystal layer was set to 4 μm. In contrast, the thickness of the liquid crystal layer was set to 50 μm in the optical element including the liquid crystal GRIN lens to achieve predetermined optical conditions.

The liquid crystal GRIN lens 301, in the ON state, exerts a lens effect and functions as the image separation means. Further, in the OFF state, an image output from each eyepoint pixel in each display unit is just displayed without being separated. Accordingly, 2D image and 3D image can be switched depending on a predetermined signal.

Furthermore, the liquid crystal GRIN lens 301 can have the structure of being ON-OFF-controlled at an element level in matrix form, and a partial lens effect can be controlled in the display plane in this case, so that 3D image and 2D image can be displayed simultaneously in the same picture.

In the image display apparatus illustrated in FIG. 34, the polarity of an input signal can be varied depending on the ON-OFF signal of the liquid crystal GRIN lens. A driving mode capable of displaying a 2H1V reversion polarity on each eye, mentioned in the first embodiment, is applied as illustrated in FIG. 36(A) when the liquid crystal GRIN lens in the ON state, i.e., in the state of exerting the lens effect, while a line reversion driving mode illustrated in FIG. 36(B) is applied when the liquid crystal GRIN lens is in the OFF state.

The structures other than the above in the present embodiment are the same as those in the above-mentioned first embodiment.

As illustrated in FIG. 36(B), the display panel 2 is driven in the line reversion driving mode when the liquid crystal GRIN lens is in the OFF state. In the trapezoid base section of each subpixel 4S, the transmittance of the base section can be improved by utilizing a lateral electric field generated between pixel electrodes adjacent to each other in a vertical direction. As a result, the transmittance of the display panel 2 can be increased, and backlight luminance can be therefore suppressed to save an electric power. Use as in the case of a usual liquid crystal display panel is enabled by inputting a common image to the pixel 4R for the right eye and the pixel 4L for the left eye to perform 2D image when the liquid crystal GRIN lens is in the OFF state.

Furthermore, when the liquid crystalline GRIN lens 301 is in the OFF state, any 3D moire is not generated due to the absence of image separation performance, and the sense of incongruity in which the image separation means is present at the front of the display panel 2 can be eliminated. When a pitch is increased in usual lenticular lenses and parallax barriers, it is easy to observe unevenness caused by a structure, a sense of incongruity may occur even in 2D image, and display quality can be therefore improved by the present structure.

When the liquid crystal GRIN lens is in the ON state in the above-mentioned line reversion driving mode, the transmittance of a trapezoid base section in each subpixel is improved and, as a result, the difference between longitudinal transmittances in a non-overlapping region PX1 and an overlapping region PX2 is increased to increase a 3D moire. In the present embodiment, when the liquid crystal GRIN lens is made to be in the ON state to exert a lens effect as illustrated in FIG. 36(A), the same effect as that in the first embodiment can be obtained by applying a 2H1V reversion driving mode to the display panel 2. In other words, when the liquid crystalline GRIN lens is in the ON state, the local decrease in transmission in the image separation direction can be compensated to reduce a 3D moire by composing a plurality of domain regions in different liquid crystal orientation states on the principal axis of the image separation means and placing and mixing the respective domain regions on the optical principal axis of the image separation means as mentioned in the first embodiment.

In the present embodiment, a lens effect in each lens element can be individually controlled in the plane of the liquid crystal GRIN lens 301 and, as a result, 3D image and 2D image can be displayed simultaneously in the same picture. However, since the thickness of the liquid crystal layer of the liquid crystal GRIN lens is 10 times or more the thickness of the liquid crystal layer of the display panel 2, a response speed becomes considerably low. Therefore, an afterimage or a crosstalk is generated to deteriorate display quality in video contents in which 3D image and 2D image are frequently switched on the same image plane. In other words, there is a limitation for the display operation of 3D image and 2D image only by the switching operation of the lens effect of the liquid crystal GRIN lens 301.

In the present embodiment, when the liquid crystal GRIN lens is in the ON state, there can also be made the structure in which a pixel 4L for the left eye and a pixel 4R for the right eye disposed on a display unit 4U corresponding to one lens element are independently operated. In this structure, 3D image and 2D image with the same resolution can be displayed simultaneously in the same picture. The display operation of the pixel 4L for the left eye and the pixel 4R for the right eye depends on the cell gap of the display panel 2, is therefore at a sufficiently higher speed than in the liquid crystal GRIN lens, and exerts excellent display performance in video contents in which 3D image and 2D image are frequently switched. In addition, 2D image of high quality, which is not affected by a refractive index, can be provided when the liquid crystal GRIN lens 301 is in the OFF state. When the liquid crystal GRIN lens is in the OFF state, there is no image separation performance; therefore, it is not necessary to apply a driving method for suppressing the flicker or 3D moire of a separated image and an electric power can be saved by selecting a driving method with higher transmittance.

The image separation means according to the present embodiment can provide the same effect as long as the means is an optical element in which the state of having an image separation function and the state of having no image separation function can be switched. For example, a liquid crystal shutter-type parallax barrier in which ON and OFF of a barrier section can be switched by liquid crystal switching can be preferably applied.

An electrode that prevents electrostatic charge may also be disposed on the control substrate 302 or opposite substrate 303 of the liquid crystal GRIN lens 301. The electrostatic charge of the display panel 2 and the liquid crystal GRIN lens 301 can be suppressed to reduce the disorientation of the liquid crystal molecular layers of both by grounding the electrode at a constant potential. As a result, reliability and display quality can be improved.

Some or all of the above-described embodiments can also be described as in the following additional notes without limitation thereto.

(Additional Note 1)

A liquid crystal display element in which a plurality of display units including at least a pixel that displays an image for a first eyepoint and a pixel that displays an image for a second eyepoint are arranged in a matrix shape; optical means which distributes light emitted from the pixel that displays the image for the first eyepoint and light emitted from the pixel that displays the image for the second eyepoint in mutually different directions; a first control electrode and a second control electrode disposed on each pixel in the display units; and a plurality of domain regions of which the orientation is controlled by a diagonal electric field or a lateral electric field formed by the first control electrode and the second control electrode and which have different liquid crystal molecule orientation states, wherein, assuming that a direction of the light distributed by the optical means is a first direction and a direction orthogonal to the first direction is a second direction, the optical principal axis of the optical means effectively passes through the center points of the display units and extends in the second direction; each pixel in the display units is disposed along the first direction; overlapping regions which overlap each other in the second direction are formed on each pixel adjacent to the first direction; and the display units arranged in the second direction in the overlapping regions comprise different electric field structures which are formed depending on the display units, and respective domain regions disposed according to the electric field structures are disposed along the optical principal axis.

(Additional Note 2)

The second control electrode disposed on an upper layer of the first control electrode via an insulating film comprises a plurality of slits extending in the first direction; any one of the control electrodes is composed of a pixel electrode which can be independently driven in each of the pixels; and a section between the pixel electrodes adjacent to each other in the first direction tilts in a direction different from the second direction in the overlapping region and is repeatedly disposed across the optical principal axis in each of the display units arranged in the second direction.

(Additional Note 3)

The first control electrode is a pixel electrode which can be controlled in each of the pixels;

the second control electrode is a common electrode in which a plurality of slits arranged in the second direction are disposed on an upper layer of the first control electrode depending on the pixel electrode;

the common electrode has a common potential in each pixel;

orientation of the liquid crystal molecules is controlled by a potential of the pixel electrode disposed on each pixel; and some of the slits are disposed across the optical principal axis in the overlapping region.

(Additional Note 4)

A control wiring line disposed across the optical principal axis in the overlapping region is disposed without overlapping the first control electrode.

(Additional Note 5)

The second control electrode is disposed to cover the control wiring line.

(Additional Note 6)

A first row in which the display units comprising pixels displaying a data signal with same polarity of a positive polarity or a negative polarity are alternately repeatedly disposed in the first direction and a second row in which the display units comprising pixels with different polarities are repeated in the first direction are alternately disposed in the second direction.

(Additional Note 7)

Assuming that a region in which respective pixels in the display units do not overlap each other in the second direction is a non-overlapping region, a domain region composed of the same electric field structure is disposed in each display unit arranged in the second direction in the non-overlapping region; and the width, in the first direction, of the domain region in the non-overlapping region is set to be larger than the widths, in the first direction, of the plurality of the domain regions disposed in the overlapping region.

(Additional Note 8)

The ends of the slits disposed in the second control electrode are shifted and disposed in the first direction and the second direction in a boundary between pixels adjacent to each other in the first direction.

(Additional Note 9)

The ends of the slits are formed in a non-rectangular shape and are disposed along the overlapping region.

(Additional Note 10)

The ends of the slits are formed in a rectangular shape.

(Additional Note 11)

The ends of the slits are curved.

(Additional Note 12)

Each of the pixels has an opening with a trapezoidal shape and is disposed to be symmetric with respect to the center points of the display units.

(Additional Note 13)

Each of the pixels has an opening with a parallelogram shape.

(Additional Note 14)

The expanded width, in an image separation direction, of the overlapping region enlarged by the optical means is set to be equal or smaller than a width between both eyes of an observer at an observation distance where a three-dimensional vision range is maximum.

(Additional Note 15)

A tilt angle between the pixel electrodes adjacent to each other in the first direction is a tilt angle $\phi$ or $-\phi$ with respect to the second direction; and a range of the tilt angle $\phi$ is set at zero degree or more and 55 degrees or less.

(Additional Note 16)

The pixel includes switching means connected to the first control electrode; a gate line for controlling the switching means; and a data line for inputting an image signal into the first control electrode through the switching means; an adjacent pixel pair including two pixels disposed across one gate line and arranged in the second direction is composed as a base unit for driving; and the respective switching means included in the two pixels are controlled by the common gate line sandwiched between the two pixels and are connected to different data lines.

(Additional Note 17)

The pixel includes switching means connected to the first control electrode; a gate line for controlling the switching means; and a data line for inputting an image signal into the first control electrode through the switching means; an adjacent pixel pair including two pixels disposed across one data line and arranged in the second direction is composed as a base unit for driving; and the respective switching means included in the two pixels are connected to the common data line sandwiched between the two pixels and are controlled by different gate lines.

(Additional Note 18)

The gate lines are scanned every two gate lines; the voltage polarity of each pixel is reversed every one gate line; and the polarity of each transmitted display data is reversed every one data line.

(Additional Note 19)

Assuming that an angle between the second direction and a liquid crystal initial orientation direction $\theta LC$ is $(90-\theta)$ degree(s) and an angle between the second direction and a tilt direction between the pixel electrodes is $\phi$, a first region in which an angle between a liquid crystal initial orientation direction $\theta LC$ and a liquid crystal driving electric field direction $\phi E$ satisfies $(90-\theta)$ degree(s), a second region in which an angle between a liquid crystal initial orientation direction $\theta LC$ and a liquid crystal driving electric field direction $\phi E$ satisfies $(\phi+\theta)$ degree(s), and a third region in which an angle between a liquid crystal initial orientation direction $\theta LC$ and a liquid crystal driving electric field direction $\phi E$ satisfies $(\phi-\theta)$ degree(s) are disposed on at least the optical principal axis and are periodically disposed along the second direction.

(Additional Note 20)

Assuming that a region in which respective pixels in the display units do not overlap each other in the second direction is a non-overlapping region, the width, in the second direction, of a light shielding section in the non-overlapping region is set depending on the average transmittance of a liquid crystal layer in the overlapping region.

(Additional Note 21)

The light shielding section is curved in the non-overlapping region; and the width of the light shielding section in the second direction is largest in the center of the pixels.

(Additional Note 22)

A liquid crystal display element in which a plurality of display units including at least a pixel that displays an image for a first eyepoint and a pixel that displays an image for a second eyepoint are arranged in a matrix shape; optical means which distributes light emitted from the pixel that displays the image for the first eyepoint and light emitted from the pixel that displays the image for the second eyepoint in mutually different directions depending on a predetermined signal; a first control electrode and a second control electrode disposed on each pixel in the display units; and a plurality of domain regions of which the orientation is controlled by a diagonal electric field or a lateral electric field formed by the first control electrode and the second control electrode and which have different liquid crystal molecule orientation states, wherein, assuming that a direction of the light distributed by the optical means is a first direction and a direction orthogonal to the first direction is a second direction, a region in which respective pixels in the display units overlap each other in the second direction is an overlapping region, a case in which a predetermined signal is input into the optical means is a 3D mode, and the other case is a 2D mode, the optical means includes an optical principal axis that effectively passes through a center point of the display units and extends in the second direction; the control electrodes in the overlapping region are disposed in a direction different from the second direction; the overlapping region is repeatedly bent and disposed to be across the optical principal axis in each of the display units arranged in the second direction; each of the regions in different liquid crystal molecule orientation states is disposed in each of the display units arranged in the second direction along the overlapping region; the regions in different liquid crystal molecule orientation states are disposed effectively periodically disposed along the optical principal axis; and the driving polarity of a pixel is different between the 3D mode and the 2D mode.

(Additional Note 23)

A display state in the 2D mode leads to a driving polarity in which display units including pixels with the same polarity are arranged in the second direction; and a display state in the 3D mode leads to a driving polarity in which display units including pixels with different polarities and display units including pixels with the same polarity are alternately arranged in the second direction.

(Additional Note 24)

In a liquid crystal display element in which a plurality of square pixels which includes at least two subpixels and in which a plurality of display units including subpixels having the same color are arranged are arranged in a matrix shape, a control electrode pair including a first control electrode and a second control electrode disposed in each pixel in the display units and a plurality of domain regions in different liquid crystal molecule orientation states, of which the orientation is controlled by a diagonal electric field or a lateral electric field formed by the first control electrode and the second control electrode are included; assuming that a direction in which the subpixels are arranged is a first direction, a direction orthogonal to the first direction is a second direction, and a region in which respective subpixels in the display units overlap each other in the second direction is an overlapping region, the control electrodes in the overlapping region are disposed in a direction different from the second direction; the overlapping region is bent and repeatedly disposed in each of the display units arranged in the second direction; and each of the regions in different liquid crystal molecule orientation states is disposed in each display unit arranged in the second direction in the overlapping region.

(Additional Note 25)

A portable device includes the image display apparatuses according to additional note 1 to additional note 24.

Reference Signs List

1 Image display apparatus
2 Display panel
2a Main substrate
2b Opposite substrate
3 Lenticular lens
3a Cylindrical lens
4COM Common electrode
4L Pixel for left eye
4U Display unit
4S Subpixel
4R Pixel for right eye
4TFT Pixel transistor
4PIX, 4PR1, 4PR2, 4PR3, 4PL1, 4PL2, 4PL3 Pixel electrode
5 Liquid crystal layer
12 Backlight
20 Display image plane
21 Polarizing plate
22 Data driver
23 Gate driver
24 Connection substrate
30 Fly-eye lens
31 Lens convex section
32 Lens concave section
33 First optical principal axis
34 Second optical principal axis
40 Pixel 41 First control electrode layer
42 Second control electrode layer
43 Boundary line between eyepoint pixels
44 Boundary line between display units, boundary line between pixels
51 Liquid crystal molecule
52 Liquid crystal director
53 Line indicating transmittance distribution
54a, 54b, 54c Broken line indicating an example of high-transmittance domain region
55R Right eye of observer
55L Left eye of observer
57 Comb electrode
60 Black matrix
61 Red
62 Green
63 Blue
70 Initial orientation direction
71 Main substrate polarizing plate absorption axis
72 Opposite substrate polarizing plate absorption axis
73 Meandering direction A
74 Meandering direction B
81 Fringe electric field
82 Lateral electric field
83 Equipotential line
90 Undercoat film
91 First interlayer film
92 Second interlayer film
93 Third interlayer film
94 Fourth interlayer film
100 Terminal apparatus
1003a Cylindrical lens
1011 Longitudinal direction
1012 Lateral direction
1013 Overlapping region
1014 Non-overlapping region
1015 Tab section
1041, 1042 Subpixel
1070 Wiring line
1075 Opening
1076 Light shielding section
D, D1-D13 Data line
G, G1-G7 Gate line

What is claimed is:

1. An image display apparatus comprising:
a liquid crystal display element in which a plurality of display units including at least a pixel that displays an image for a first eyepoint and a pixel that displays an image for a second eyepoint are arranged in a matrix shape;
optical means which distributes light emitted from the pixel that displays the image for the first eyepoint and light emitted from the pixel that displays the image for the second eyepoint in mutually different directions;
a first control electrode and a second control electrode disposed on each pixel in the display units; and
a plurality of domain regions of which an orientation of liquid crystal molecules is controlled by a diagonal electric field or a lateral electric field formed by the first control electrode and the second control electrode and which have different liquid crystal molecule orientation states,
wherein, assuming that a direction of the light distributed by the optical means is a first direction and a direction orthogonal to the first direction is a second direction, the optical principal axis of the optical means effectively passes through the center points of the display units and extends in the second direction;
each pixel in the display units is disposed along the first direction;
overlapping regions which overlap each other in the second direction are formed on each pixel adjacent to the first direction; and
the display units arranged in the second direction in the overlapping regions comprise different electric field structures which are formed depending on the display units, and respective domain regions disposed according to the electric field structures are disposed along the optical principal axis, and
wherein
the second control electrode disposed on an upper layer of the first control electrode via an insulating film comprises a plurality of slits extending in the first direction;
any one of the control electrodes is composed of a pixel electrode which can be independently driven in each of the pixels; and
a section between the pixel electrodes adjacent to each other in the first direction tilts in a direction different from the second direction in the overlapping region and is repeatedly disposed across the optical principal axis in each of the display units arranged in the second direction,
wherein
assuming that an angle between the second direction and a liquid crystal initial orientation direction θLC is (90-θ) degree(s) and an angle between the second direction and a tilt direction between the pixel electrodes is φ, a first region in which an angle between a liquid crystal initial orientation direction θLC and a liquid crystal driving electric field direction φE satisfies (90-θ) degree(s), a second region in which an angle between a liquid crystal initial orientation direction θLC and a liquid crystal driving electric field direction φE satisfies (φ+θ) degree(s), and a third region in which an angle between a liquid crystal initial orientation direction θLC and a liquid crystal driving electric field direction φE satisfies (φ-θ) degree(s) are disposed on at least the optical principal axis and are periodically disposed along the second direction.

2. The image display apparatus according to claim 1, wherein
the first control electrode is a pixel electrode which can be controlled in each of the pixels;
the second control electrode is a common electrode in which a plurality of slits arranged in the second direction are disposed on an upper layer of the first control electrode depending on the pixel electrode;
the common electrode has a common potential in each pixel;
the orientation of the liquid crystal molecules is controlled by a potential of the pixel electrode disposed on each pixel; and
some of the slits are disposed across the optical principal axis in the overlapping region.

3. The image display apparatus according to claim 1, wherein
a control wiring line disposed across the optical principal axis in the overlapping region is disposed without overlapping the first control electrode.

4. The image display apparatus according to claim 3, wherein
the second control electrode is disposed to cover the control wiring line.

5. The image display apparatus according to claim 1, further comprising
a first row in which the display units comprising pixels displaying a data signal with same polarity of a positive polarity or a negative polarity are alternately repeatedly disposed in the first direction, and
a second row in which the display units comprising pixels with different polarities are repeated in the first direction,
wherein the first row and the second row are alternately disposed in the second direction.

6. The image display apparatus according to claim 1, wherein
assuming that a region in which respective pixels in the display units do not overlap each other in the second direction is a non-overlapping region, a domain region composed of the same electric field structure is disposed in each display unit arranged in the second direction in the non-overlapping region; and
a width, in the first direction, of the domain region in the non-overlapping region is set to be larger than widths, in the first direction, of the plurality of the domain regions disposed in the overlapping region.

7. The image display apparatus according to claim 1, wherein the ends of the slits disposed in the second control electrode are shifted and disposed in the first direction and the second direction in a boundary between pixels adjacent to each other in the first direction.

8. The image display apparatus according to claim 1, wherein the ends of the slits are formed in a non-rectangular shape and are disposed along the overlapping region.

9. The image display apparatus according to claim 1, wherein the ends of the slits are formed in a rectangular shape.

10. The image display apparatus according to claim 1, wherein the ends of the slits are curved.

11. The image display apparatus according to claim 1, wherein each of the pixels has an opening with a trapezoidal shape and is disposed to be symmetric with respect to the center points of the display units.

12. The image display apparatus according to claim 1, wherein each of the pixels has an opening with a parallelogram shape.

13. The image display apparatus according to claim 1, wherein an expanded width, in an image separation direction, of the overlapping region enlarged by the optical means is set to be equal or smaller than a width between both eyes of an observer at an observation distance where a three-dimensional vision range is maximum.

14. The image display apparatus according to claim 1, wherein a tilt angle between the pixel electrodes adjacent to each other in the first direction is a tilt angle $\phi$ or $-\phi$ with respect to the second direction; and
a range of the tilt angle $\phi$ is set at zero degree or more and 55 degrees or less.

15. The image display apparatus according to claim 1, wherein
the pixel comprises switching means connected to the first control electrode; a gate line for controlling the switching means; and a data line for inputting an image signal into the first control electrode through the switching means;
an adjacent pixel pair comprising two pixels disposed across one gate line and arranged in the second direction is composed as a base unit for driving; and
the respective switching means included in the two pixels are controlled by the common gate line sandwiched between the two pixels and are connected to different data lines.

16. The image display apparatus according to claim 1, wherein
the pixel comprises switching means connected to the first control electrode; a gate line for controlling the switching means; and a data line for inputting an image signal into the first control electrode through the switching means;
an adjacent pixel pair comprising two pixels disposed across one data line and arranged in the second direction is composed as a base unit for driving; and
the respective switching means included in the two pixels are connected to the common data line sandwiched between the two pixels and are controlled by different gate lines.

17. A method for driving the image display apparatus according to claim 15, comprising:
scanning the gate lines every two gate lines;
reversing the voltage polarity of each pixel every one gate line; and
reversing the polarity of each transmitted display data every one data line.

18. A method for driving the image display apparatus according to claim 16, comprising:
scanning the gate lines every two gate lines;
reversing the voltage polarity of each pixel every one gate line; and
reversing the polarity of each transmitted display data every one data line.

19. The image display apparatus according to claim 1, wherein
assuming that a region in which respective pixels in the display units do not overlap each other in the second direction is a non-overlapping region, a width, in the second direction, of a light shielding section in the non-overlapping region is set depending on the average transmittance of a liquid crystal layer in the overlapping region.

20. The image display apparatus according to claim 19, wherein
the light shielding section is curved in the non-overlapping region; and
the width of the light shielding section in the second direction is largest in the center of the pixels.

21. An image display apparatus comprising:
a liquid crystal display element in which a plurality of display units including at least a pixel that displays an image for a first eyepoint and a pixel that displays an image for a second eyepoint are arranged in a matrix shape;
optical means which distributes light emitted from the pixel that displays the image for the first eyepoint and light emitted from the pixel that displays the image for the second eyepoint in mutually different directions depending on a predetermined signal;
a first control electrode and a second control electrode disposed on each pixel in the display units; and
a plurality of domain regions of which an orientation of liquid crystal molecules is controlled by a diagonal electric field or a lateral electric field formed by the first control electrode and the second control electrode and which have different liquid crystal molecule orientation states, wherein, assuming that a direction of the light distributed by the optical means is a first direction and a direction orthogonal to the first direction is a second direction, a region in which respective pixels in the display units overlap each other in the second direction is an overlapping region, a case in which a predetermined signal is input into the optical means is a 3D mode, and the other case is a 2D mode, the optical means comprises an optical principal axis that effectively passes through a center point of the display units and extends in the second direction;

the control electrodes in the overlapping region are disposed in a direction different from the second direction;

the overlapping region is repeatedly bent and disposed to be across the optical principal axis in each of the display units arranged in the second direction;

each of the regions in different liquid crystal molecule orientation states is disposed in each of the display units arranged in the second direction along the overlapping region;

the regions in different liquid crystal molecule orientation states are disposed effectively periodically disposed along the optical principal axis; and the driving polarity of a pixel is different between the 3D mode and the 2D mode, wherein the second control electrode disposed on an upper layer of the first control electrode via an insulating film comprises a plurality of slits extending in the first direction;

any one of the control electrodes is composed of a pixel electrode which can be independently driven in each of the pixels; and a section between the pixel electrodes adjacent to each other in the first direction tilts in a direction different from the second direction in the overlapping region and is repeatedly disposed across the optical principal axis in each of the display units arranged in the second direction, wherein assuming that an angle between the second direction and a liquid crystal initial orientation direction θLC is (90-θ) degree(s) and an angle between the second direction and a tilt direction between the pixel electrodes is φ, a first region in which an angle between a liquid crystal initial orientation direction θLC and a liquid crystal driving electric field direction φE satisfies (90-θ) degree(s), a second region in which an angle between a liquid crystal initial orientation direction θLC and a liquid crystal driving electric field direction φE satisfies (φ+θ) degree(s), and a third region in which an angle between a liquid crystal initial orientation direction θLC and a liquid crystal driving electric field direction φE satisfies (φ-θ) degree(s) are disposed on at least the optical principal axis and are periodically disposed along the second direction.

22. The image display apparatus according to claim 21, wherein a display state in the 2D mode leads to a driving polarity in which display units comprising pixels with the same polarity are arranged in the second direction; and a display state in the 3D mode leads to a driving polarity in which display units comprising pixels with different polarities and display units comprising pixels with the same polarity are alternately arranged in the second direction.

23. A liquid crystal display element in which a plurality of square pixels, which comprises at least two subpixels and in which a plurality of display units comprising subpixels having the same color are arranged, are arranged in a matrix shape, wherein a control electrode pair comprising a first control electrode and a second control electrode disposed in each pixel in the display units and a plurality of domain regions in different liquid crystal molecule orientation states, of which an orientation of liquid crystal molecules is controlled by a diagonal electric field or a lateral electric field formed by the first control electrode and the second control electrode are included;

assuming that a direction in which the subpixels are arranged is a first direction, a direction orthogonal to the first direction is a second direction, and a region in which respective subpixels in the display units overlap each other in the second direction is an overlapping region, the control electrodes in the overlapping region are disposed in a direction different from the second direction;

the overlapping region is bent and repeatedly disposed in each of the display units arranged in the second direction; and each of the regions in different liquid crystal molecule orientation states is disposed in each display unit arranged in the second direction in the overlapping region, wherein the second control electrode disposed on an upper layer of the first control electrode via an insulating film comprises a plurality of slits extending in the first direction;

any one of the control electrodes is composed of a pixel electrode which can be independently driven in each of the pixels; and a section between the pixel electrodes adjacent to each other in the first direction tilts in a direction different from the second direction in the overlapping region and is repeatedly disposed across the optical principal axis in each of the display units arranged in the second direction, wherein assuming that an angle between the second direction and a liquid crystal initial orientation direction θLC is (90-θ) degree(s) and an angle between the second direction and a tilt direction between the pixel electrodes is φ, a first region in which an angle between a liquid crystal initial orientation direction θLC and a liquid crystal driving electric field direction φE satisfies (90-θ) degree(s), a second region in which an angle between a liquid crystal initial orientation direction θLC and a liquid crystal driving electric field direction φE satisfies (φ+θ) degree(s), and a third region in which an angle between a liquid crystal initial orientation direction θLC and a liquid crystal driving electric field direction φE satisfies (φ-θ) degree(s) are disposed on at least the optical principal axis and are periodically disposed along the second direction.

24. A portable device comprising the image display apparatus according to claim 1.

25. A portable device comprising the image display apparatus according to claim 21.

* * * * *